March 20, 1951 — C. B. HALL — 2,545,460
KEY OPERATED ELAPSED TIME AND EARNINGS
COMPUTING AND RECORDING MACHINE Filed June 29, 1948 — 17 Sheets-Sheet 1

INVENTOR.
CHARLES B. HALL
BY Ferd Bing
ATTORNEY

March 20, 1951

C. B. HALL 2,545,460

KEY OPERATED ELAPSED TIME AND EARNINGS
COMPUTING AND RECORDING MACHINE

Filed June 29, 1948

INVENTOR.
CHARLES B. HALL
BY Ferd Bing
ATTORNEY

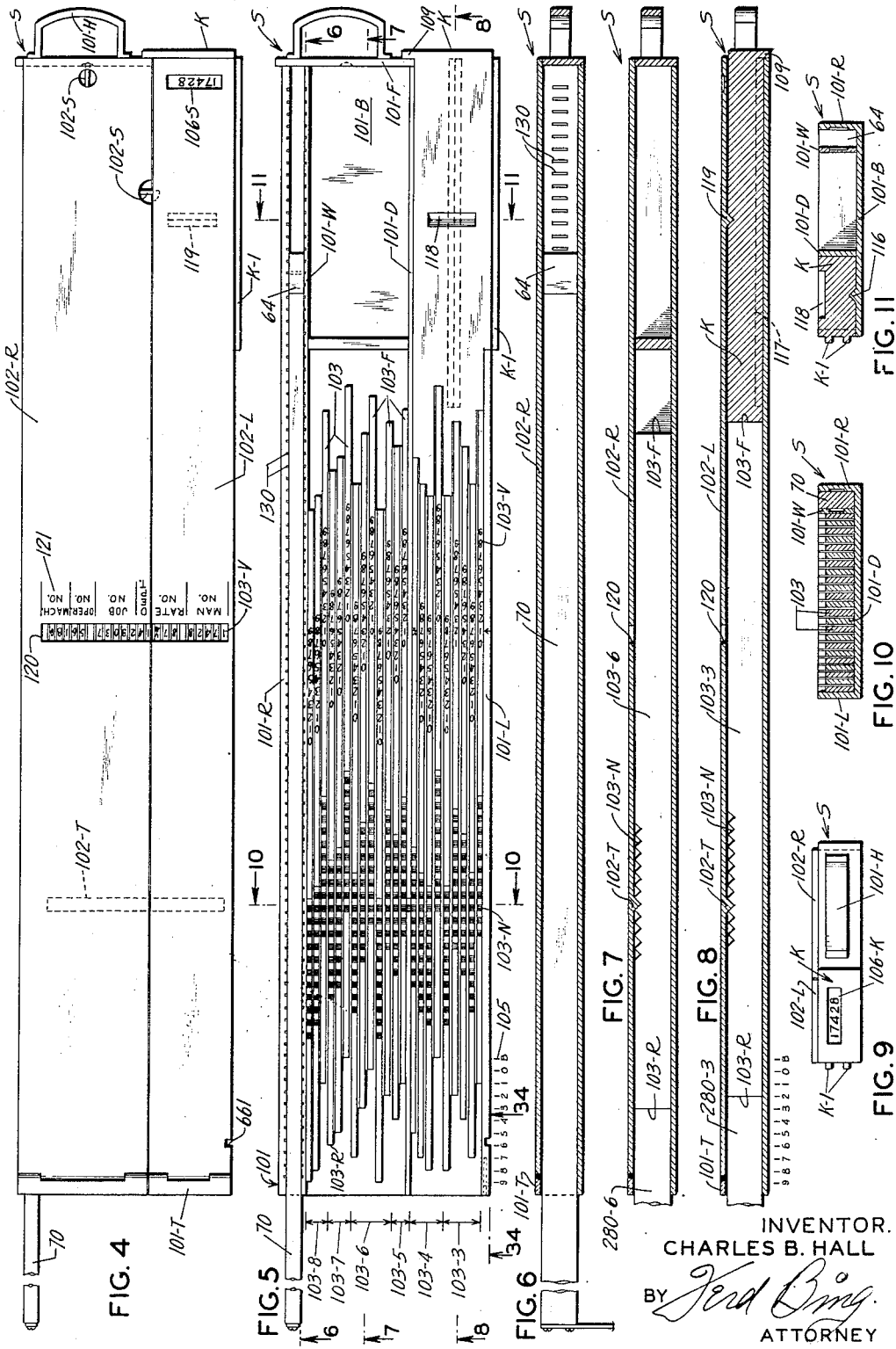

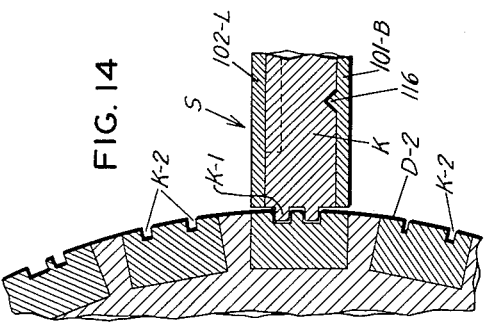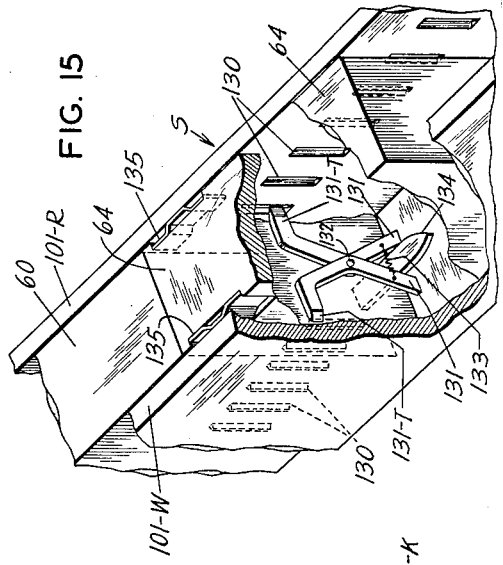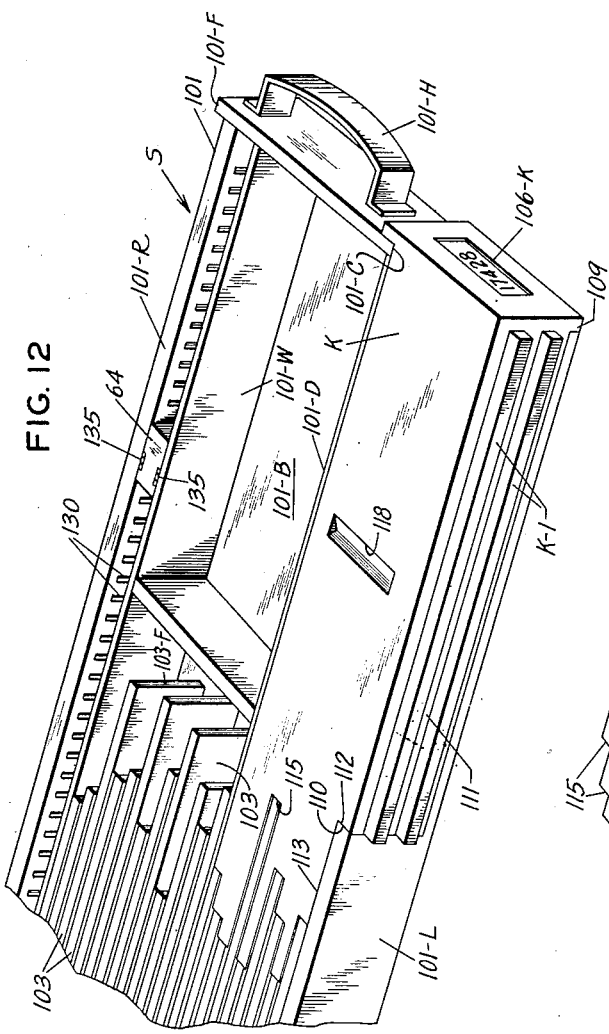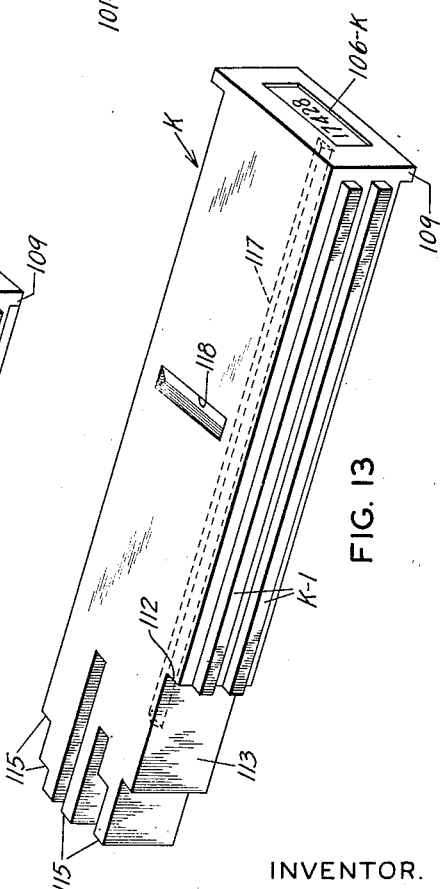

March 20, 1951

C. B. HALL 2,545,460

KEY OPERATED ELAPSED TIME AND EARNINGS
COMPUTING AND RECORDING MACHINE

Filed June 29, 1948

INVENTOR.
CHARLES B. HALL
BY Ferd Bing
ATTORNEY

March 20, 1951

C. B. HALL 2,545,460

KEY OPERATED ELAPSED TIME AND EARNINGS
COMPUTING AND RECORDING MACHINE

Filed June 29, 1948

INVENTOR.
CHARLES B. HALL
BY Ferd Bing.
ATTORNEY

March 20, 1951  
C. B. HALL  
2,545,460  
KEY OPERATED ELAPSED TIME AND EARNINGS COMPUTING AND RECORDING MACHINE  
Filed June 29, 1948  
17 Sheets-Sheet 7
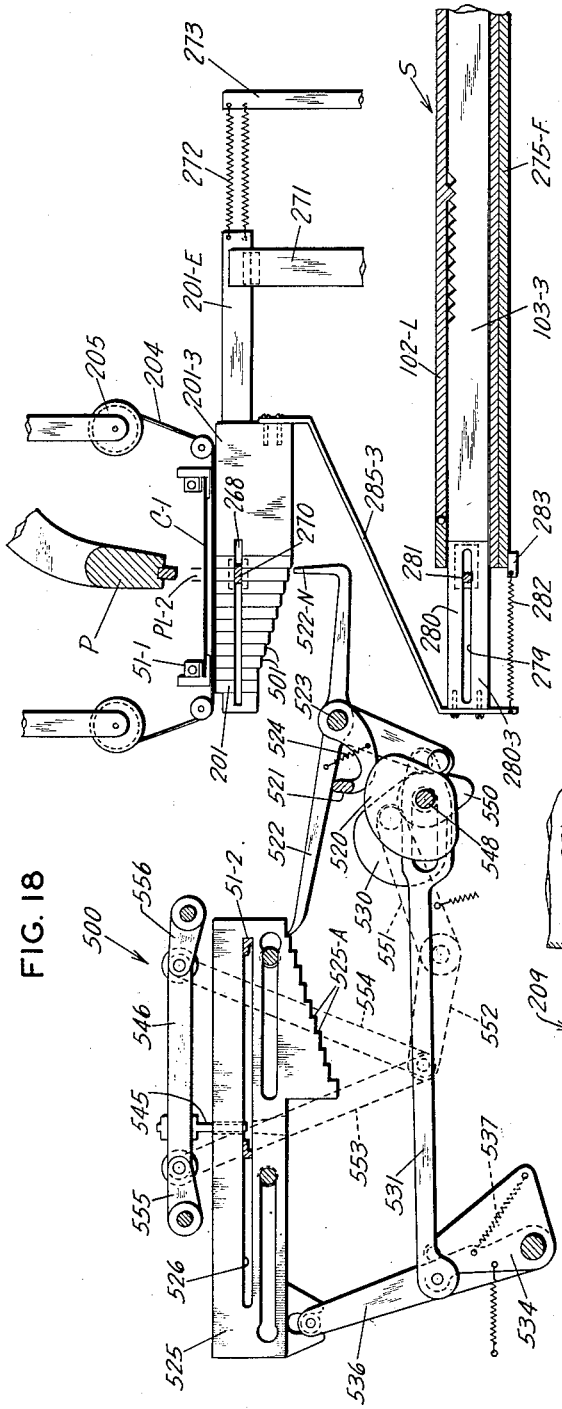
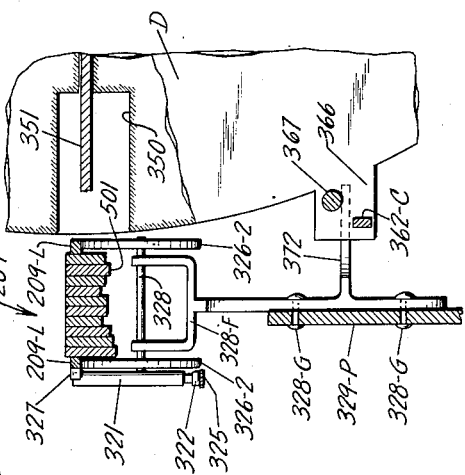
FIG. 18
FIG. 18A
INVENTOR.  
CHARLES B. HALL  
BY Fred Bing  
ATTORNEY March 20, 1951  C. B. HALL  2,545,460
KEY OPERATED ELAPSED TIME AND EARNINGS
COMPUTING AND RECORDING MACHINE
Filed June 29, 1948  17 Sheets-Sheet 8

INVENTOR.
CHARLES B. HALL
BY Fred Bing
ATTORNEY

March 20, 1951

C. B. HALL 2,545,460

KEY OPERATED ELAPSED TIME AND EARNINGS
COMPUTING AND RECORDING MACHINE

Filed June 29, 1948

INVENTOR.
CHARLES B. HALL
BY Fred Bing
ATTORNEY

INVENTOR
CHARLES B. HALL
BY Fred Bing.
ATTORNEY

March 20, 1951

C. B. HALL 2,545,460

KEY OPERATED ELAPSED TIME AND EARNINGS
COMPUTING AND RECORDING MACHINE

Filed June 29, 1948

INVENTOR.
CHARLES B. HALL
BY Ferd Bing
ATTORNEY

March 20, 1951

C. B. HALL 2,545,460

KEY OPERATED ELAPSED TIME AND EARNINGS
COMPUTING AND RECORDING MACHINE

Filed June 29, 1948

INVENTOR.
CHARLES B. HALL
BY Fred Bing
ATTORNEY

INVENTOR.
CHARLES B. HALL
BY Ted Bing
ATTORNEY

INVENTOR.
CHARLES B. HALL
BY Ferd Bing
ATTORNEY

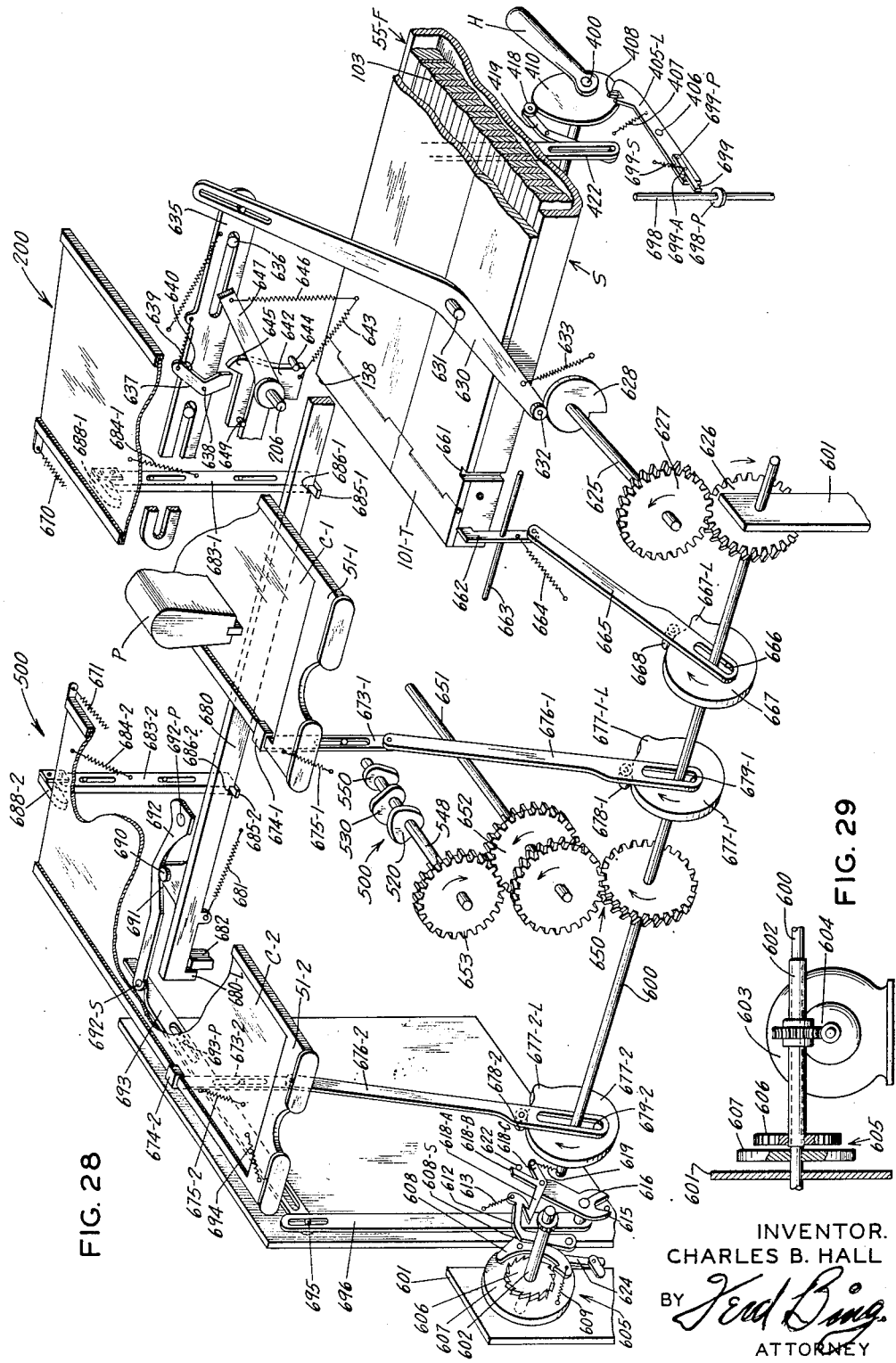

March 20, 1951

C. B. HALL 2,545,460

KEY OPERATED ELAPSED TIME AND EARNINGS
COMPUTING AND RECORDING MACHINE

Filed June 29, 1948

INVENTOR.
CHARLES B. HALL
BY Fred Bing
ATTORNEY

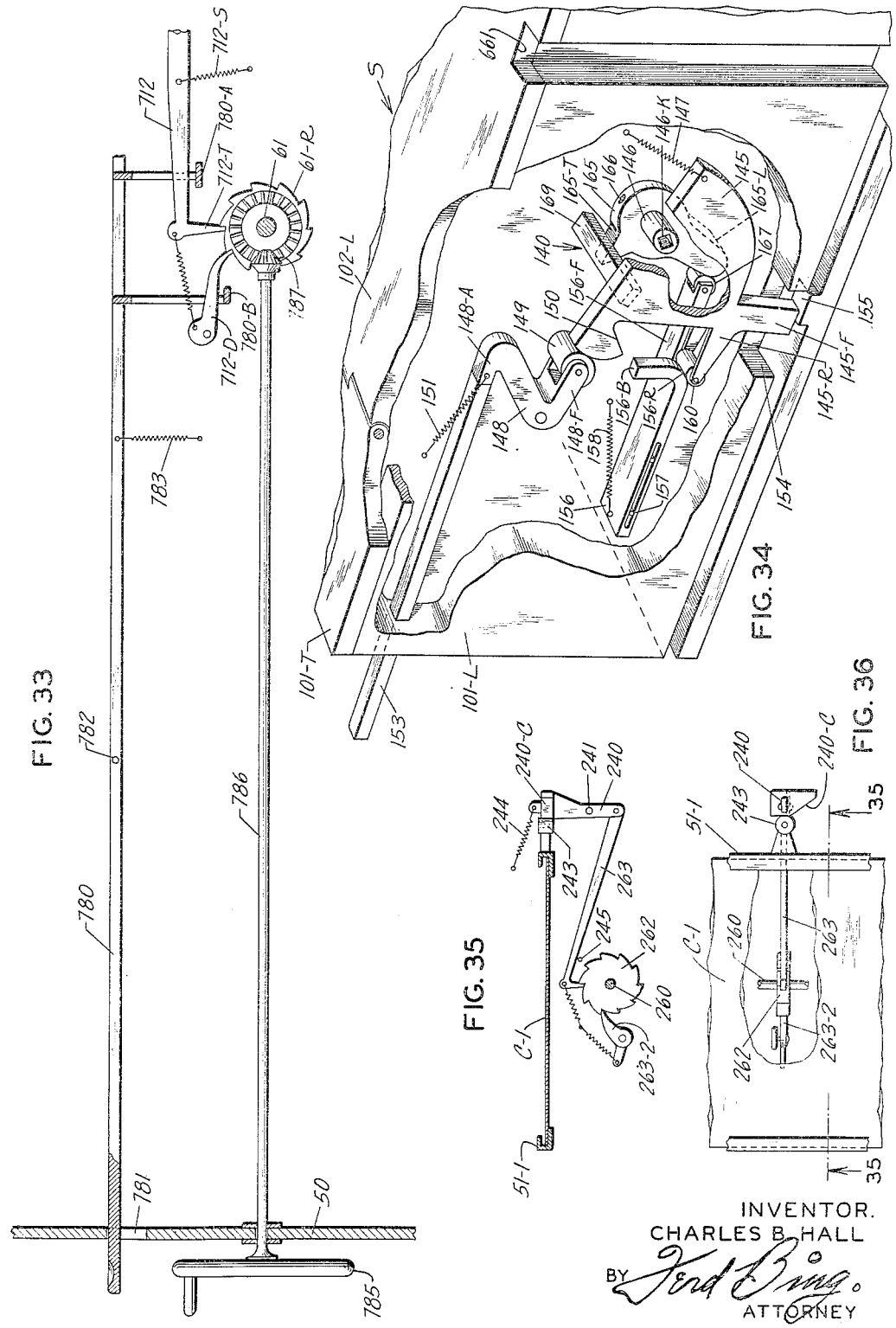

Patented Mar. 20, 1951

2,545,460

UNITED STATES PATENT OFFICE 2,545,460

KEY OPERATED ELAPSED TIME AND EARNINGS COMPUTING AND RECORDING MACHINE

Charles B. Hall, Chicago, Ill.

Application June 29, 1948, Serial No. 35,786

35 Claims. (Cl. 346—94)

This invention relates to elapsed time and earnings computing and recording machines and particularly to such mechanisms wherein the elapsed time and earnings amounts are computed and digitally recorded so as to be immediately available upon completion of the recording operation.

As a basis for various accounting and control operations in business management, one of the fundamental records is the job time card or time record, which according to past practice has been assigned to each worker, or individual job, or order, so that the worker may record start and finish time thereon in respect to each job, order, or work period. Desirably such time cards should of course bear such identifying data as may be necessary or convenient for accounting or control purposes, such as man number, job or order number, date, the man's pay rate, department, operation number and machine number, and the like, but according to past practice the preparation of these cards prior to issuance to the worker has in most instances included but a part of such information.

Even where such time cards have embodied all of the various items of data hereinabove listed, such cards after recording of the start and finish time thereon, have usually constituted nothing more than intermediate or partially completed records which merely afforded a basis upon which further calculating and recording operations were to be based. Thus, after the start time and finish time were recorded on the card at the usual departmental time clock, such card was stored in a suitable collecting means so that at a later time, such as the end of the work period, all of the collected time cards might be taken to the time clerk or auditing department for the performance of the required computing and recording operations, and for recording of related information or data that may have been omitted in the original preparation of the cards. Thus, assuming that at least the man number and the man's rate have been originally placed on the card, the auditing department must, from the recorded start and finish times, determine and record the elapsed time and the earnings, and usually in addition, a burden amount must be calculated and recorded in accordance with a burden rate which may vary with the department, job number or other circumstances. Such calculations and the recording and verification or checking thereof require considerable time so that the completed time cards are not available for accounting or control uses for a considerable time after the time recording operations have been completed. Where it is the practice to use punched card equipment for payroll and accounting purposes, further time is required for the perforation and verification of the punched cards. Apart from the objectionable cost factors involved in such prior procedure, the delay in the availability of the completed time cards minimizes the value of such records to the management, and it is therefore an important object to enable such delay to be eliminated; and objects related to the foregoing are to enable completely computed time cards to be produced as an incident to the recording of the finish time thereon; to extend the field of data recorded on such cards so as to enable greater and more extended and valuable uses thereof; to enable punched time records containing all pertinent reference and computed data to be produced when the finish time is recorded so as to thereby eliminate the usual cost and delay incident to the subsequent computing and key punching of such records.

Efforts have of course been made heretobefore to simplify the problem of producing the final elapsed time and computed earnings records, but in such prior efforts the problem has been but partially met, and as a result such prior efforts have not received any appreciable degree of commercial acceptance. One such prior approach to this relatively old and well recognized problem has been through graphic representation of elapsed time on an elongated record strip so that elapsed time is represented by the length of a line or by the space between two marks representative, by their position, of start and finish time. This of course serves merely to change the character of the first one of the secondary operations from one of computation to one of measurement, and does not in fact eliminate any delay or save any appreciable time insofar as final completion of the time and earnings record is concerned. Similar means have been applied to the earnings amount, in some cases, and further improvement of this approach has been the association of readable scales with the marks upon the record strip or sheet.

In other efforts to accomplish the obviously desirable simplification of the preparation of time and earnings records, it has been proposed to furnish an individual time clock to each workman, and to include computing means in each such clock operable to compute earnings at the proper rate for the man to whom the clock was allocated. Usually such individual time clocks were re-set to zero at the start of each job, and in some instances were controlled from a master clock. Such duplication of equipment obviously was objectionable from the standpoint of original cost, space requirements, maintenance and for other reasons.

In other instances efforts have been made to employ in one machine, a plurality of time controlled computing and recording units each controlled at a different pay rate, or to employ a single clock and recording unit but with a plurality of internal and cooperating computing means for computing elapsed time and for extending earnings at any one of several different rates, but in such instances, the number of regular and overtime rates in use in a department has limited the application of this approach. Likewise, these efforts have greatly limited the amount of detail available, usually confined to computed elapsed time, computed earnings, or both, for the period, in addition to a man or machine number indication.

The manner of comparing the start time and the finish time to compute the elapsed time, and means to compute the period earnings, have taken many forms, such as manual insertion of the start time by the worker, at the time of the "Out" registration, or of the insertion, incident to the "Out" registration, of such start time, or of cumulative earnings, or of an arbitrary, time-controlled earnings position, by means of holes punched in the record card at the time of the prior "In" registration.

In instances where efforts have been made to compute earnings at multiple rates, recourse has been had to a plurality of time-controlled computing units within the machine, and the storage of the start time or other factor indicating a time or money status at the beginning of the period, has been either internal in the machine, or associated with the card or record sheet upon which the final recording is to be made. The limitations of these approaches have been conclusively proven by the very limited use which has been made of such means commercially, though the problem is one which has challenged the ingenuity of inventors for decades.

Documents for recording data have taken the form of printed records, of notched or punched card records, and of combinations thereof, but not of two separate, identical records, one punched and one printed. It may be stated generally that methods and means afforded to date have been unsuccessful for one or more of several reasons, such as, excessive original cost, mechanical or capacity limitations, incomplete or inadequate data record, maintenance problems, or because the disclosed mechanisms were impractical of production or in operation.

In view of the foregoing deficiencies of prior efforts to simplify the production of elapsed time and earnings records, it is a further and more specific object of the present invention to enable a single machine to produce such records at any one of a large number of regular or overtime pay rates and with respect to a relatively large number of workmen. A related object is to enable this to be accomplished in such a way that the earnings amount and any related money amounts invariably will be computed at the proper rate.

Other important objects are to enable start time and other data related to a job and to the man performing the job to be stored in a supplemental device in respect to each such job, thereby to avoid storage of such data in the machine per se, and by this mode of procedure to extend the range of usefulness of the machine.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 4 is a top plan view of one of the data-storage slides employed as auxiliary and supplemental devices in the use of the computing and recording machine;

Fig. 5 is a plan view of the storage slide with the cover removed to disclose internal structure;

Fig. 6 is a vertical sectional view of the storage slide taken along the line 6—6 of Fig. 5 and showing the means for storing a representation of a start time;

Fig. 7 is a vertical sectional view of the storage slide taken along the line 7—7 of Fig. 5 and showing the means for setting up and storing representations of reference data;

Fig. 8 is a vertical sectional view of the storage slide taken along the line 8—8 of Fig. 5 and showing the means for setting up and storing representations of the man's number and rate by use of a man's rate key;

Fig. 9 is a front elevational view of the storage slide;

Fig. 10 is a vertical cross sectional view of the storage slide taken along the line 10—10 of Fig. 5;

Fig. 11 is a vertical cross sectional view of the storage slide taken along the line 11—11 of Fig. 5;

Fig. 12 is a fragmentary perspective view of a storage slide showing a man's rate key inserted, and the start time block in a set position in the storage slide;

Fig. 13 is a perspective view of the man's rate key;

Fig. 14 is a diagrammatic cross sectional view taken along the line 14—14 of Fig. 27 and showing the engagement of the ribs of the man's rate key with the grooves of the rate verification drum;

Fig. 15 is a fragmentary perspective view of a storage slide showing the start time block locking means and showing parts of the start time block and its guideway in the storage slide;

Fig. 18 is a longitudinal vertical section taken along the line 18—18 of Fig. 27 and showing the relationship of the elements in the setting up of the punching and printing means;

Fig. 18A is a vertical cross sectional view taken along the line 18A—18A of Fig. 17 and showing the support assembly for certain of the type elements when such elements are in a shifted position;

Fig. 28 is a schematic perspective view taken from the left front of the machine and showing the main drive mechanism and the one revolution drive means of the machine;

Fig. 29 is a longitudinal vertical sectional view showing the main drive motor and a portion of the driving means;

Fig. 33 is a vertical sectional view taken along the line 33—33 of Fig. 27 and showing the mechanism for restoring all time-controlled means to a normal zero position;

Fig. 34 is an enlarged and slightly exaggerated perspective view taken along the line 34—34 of Fig. 5 and showing the single-use safety mechanism of the storage slides;

Fig. 35 is a vertical sectional view taken along the line 35—35 of Fig. 36 and showing the consecutive number machine actuating mechanism; and Fig. 36 is a fragmentary plan view taken approximately along the line 36—36 of Fig. 35 and showing further detail of the consecutive number machine actuating mechanism.

The machine generally

Figures 2, 3:
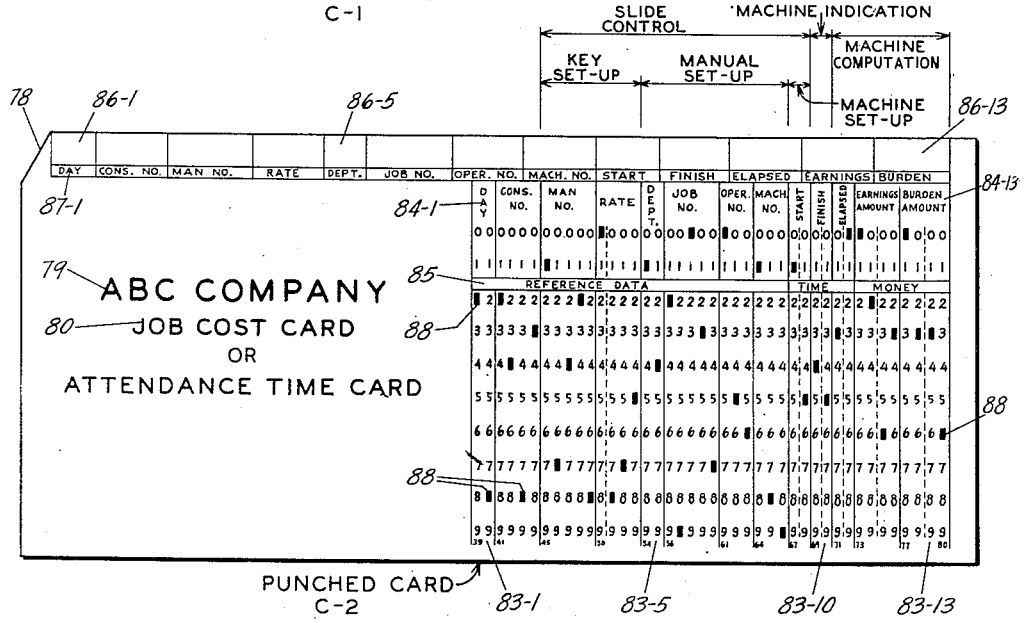
Fig. 2 is a face view of a printed record produced by the machine.
Fig. 3 is a face view of a punched record produced by the machine.

For purposes of disclosure the invention is herein illustrated as embodied in an elapsed time and earnings computing and recording machine R that is adapted for floor mounting and through the use of which one or more complete records of original entry, such as a printed record card C—1, Fig. 2, and a punched record card C—2, Fig. 3, may be produced in respect to any worker of a large group of workers who may be working at any one of a large number of different regular or overtime rates. Such records under the present invention are complete to the extent that many different identifying facts are recorded as well as the computed elapsed time and related earnings, burden and similar money amounts, and these records are produced as an incident to the recording of the finish or "Out" time with respect to any particular job or working period, so that these complete records are immediately available for accounting and related purposes.

Figure 1:
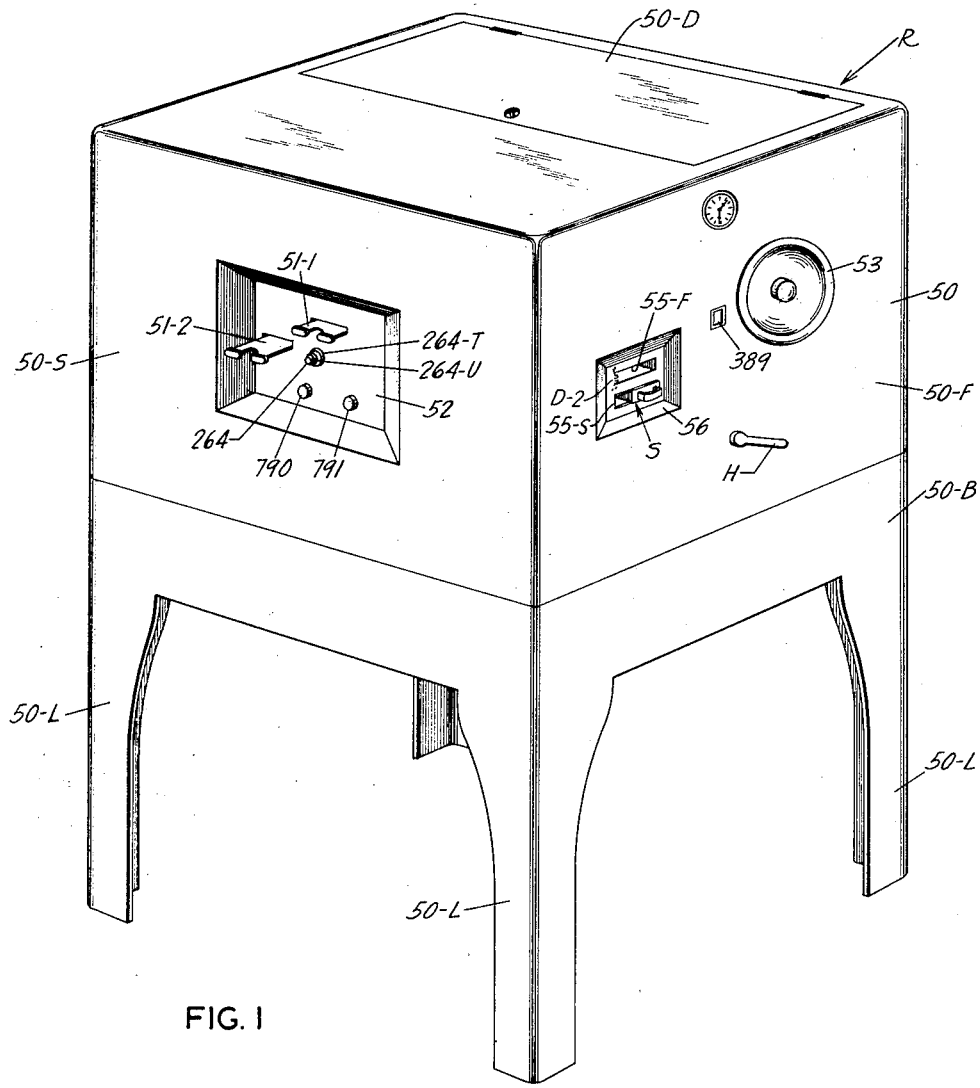
Fig. 1 is a perspective view of an elapsed time and earnings computing and recording machine embodying the features of the invention.

The computer and recorder R is housed within a rectangular casing 50 that is supported in an elevated position as shown in Fig. 1 by means such as a base 50—B having legs 50—L. Within the casing 50 there is provided computing and recording mechanism that is controlled in part by time operated means and in part by mechanically stored data-representations embodied in and carried by a separately formed, and separately stored, storage slide S, one of which is allocated jointly to each man and each job or working period, and in response to such control the computing means are operated and the recording means are set up and operated to produce one or the other, or both, of the records C—1 and C—2. When a computing and recording operation is to be performed, the blank cards C—1 and C—2 are inserted respectively into card receivers 51—1 and 51—2 that are located in a clearance panel or recess 52 afforded in one side wall 50—S of the casing 50, so that the card C—1 is in an operative relation to a printing position 200 in the machine, and the card C—2 is in an operative relation to a punching mechanism 500 mounted within the casing 50.

As a further preliminary to a computing and recording operation, a type carrier D, mounted within the casing 50, and shown in Figs. 16 and 23 through 27 as embodied in the form of a drum, is set by means of an external operating wheel 53, Fig. 1, to correspond with the pay rate upon which the computation is to be based. After the related type elements carried on the drum D have been brought into an operative location at the printing position 200, as will hereinafter be described in detail, by means of a setting handle H, Figs. 1 and 24, located on the forward wall 50—F of the casing 50, the related storage slide S is inserted into what may be termed an "Out" or finish time slot 55—F that opens rearwardly through a recessed panel 56 formed in the forward wall 50—F of the casing 50, Figs. 1, 17 and 24. When this is done, the computation is made as an incident to such insertion of the storage slide S, Figs. 4 to 11, and the recording operations are performed with respect to the record cards C—1 and C—2 as will hereinafter be described in detail. It should be noted that certain of the data representations carried by a slide S are set, for example, by the timekeeper at the time that a slide S is assigned to a particular worker and to a particular job or time period, but that a representation of the start time is set up in the slide S, as will hereinafter appear, through the use of the machine R by inserting the slide S initially into the home position shown in Figs. 1, 17 and 24, in an "In" or start time slot 55—S that is afforded in the panel 56 just below the slot 55—F.

As will hereinafter be described in detail, the type carrier or drum D has a time controlled movement imparted thereto, in a rear to front direction, along its supporting shaft 58, while a start time set-up bar 60 mounted within the casing 50 and in alignment with the start time slot 55—S, is moved along a horizontal path in the opposite direction, or from front to rear, by the same time controlled means such as a time controlled shaft 61, Fig. 23. The time-controlled movement of the shaft 61 is in fact a step-by-step movement in which the shaft is advanced through a predetermined increment every six minutes or every one-tenth of an hour, as will be hereinafter explained.

Figure 17:
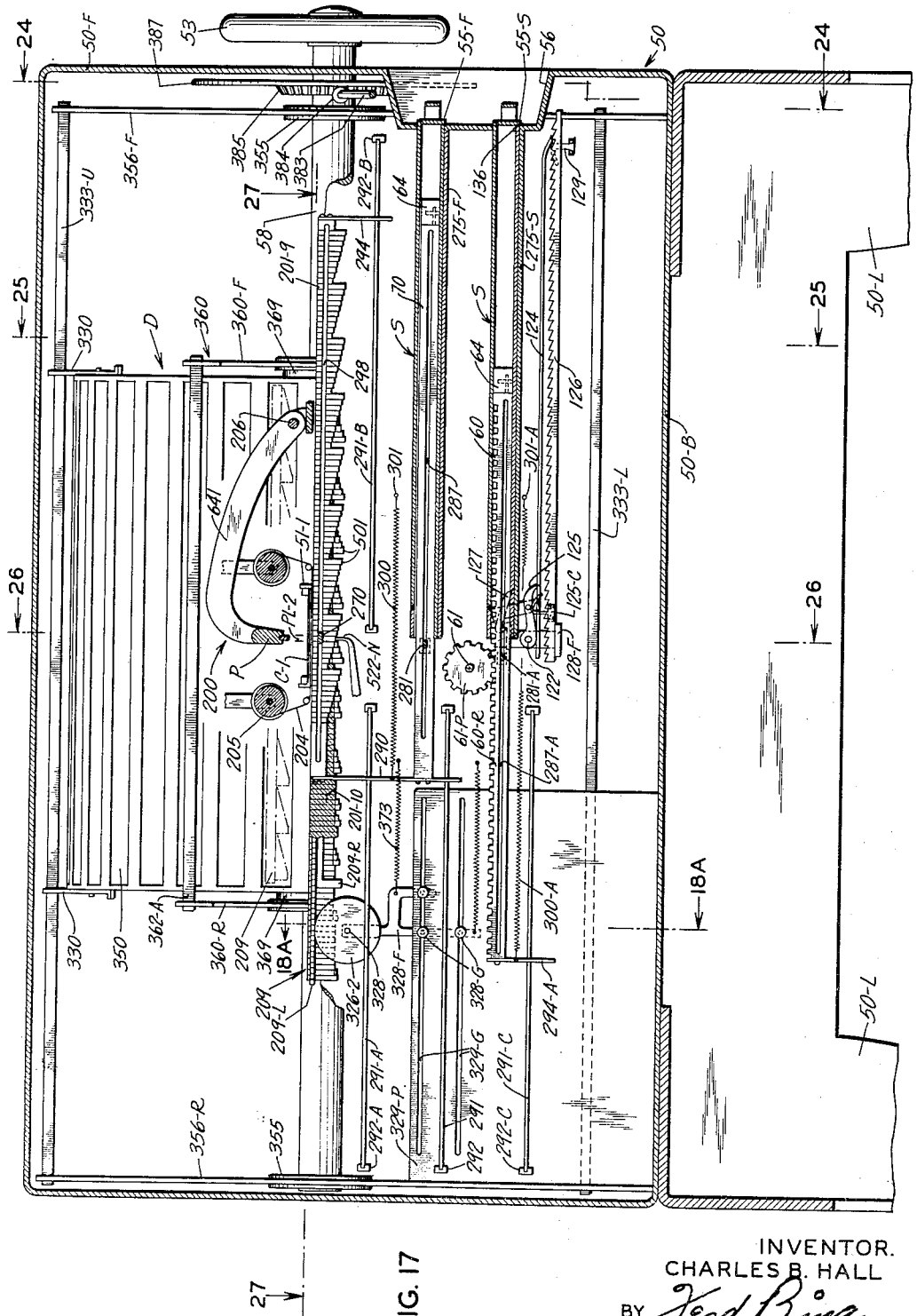
Fig. 17 is a longitudinal vertical section taken along the line 17—17 of Fig. 27 and showing the means for setting up, storage and recording of the start time.
Figure 23:
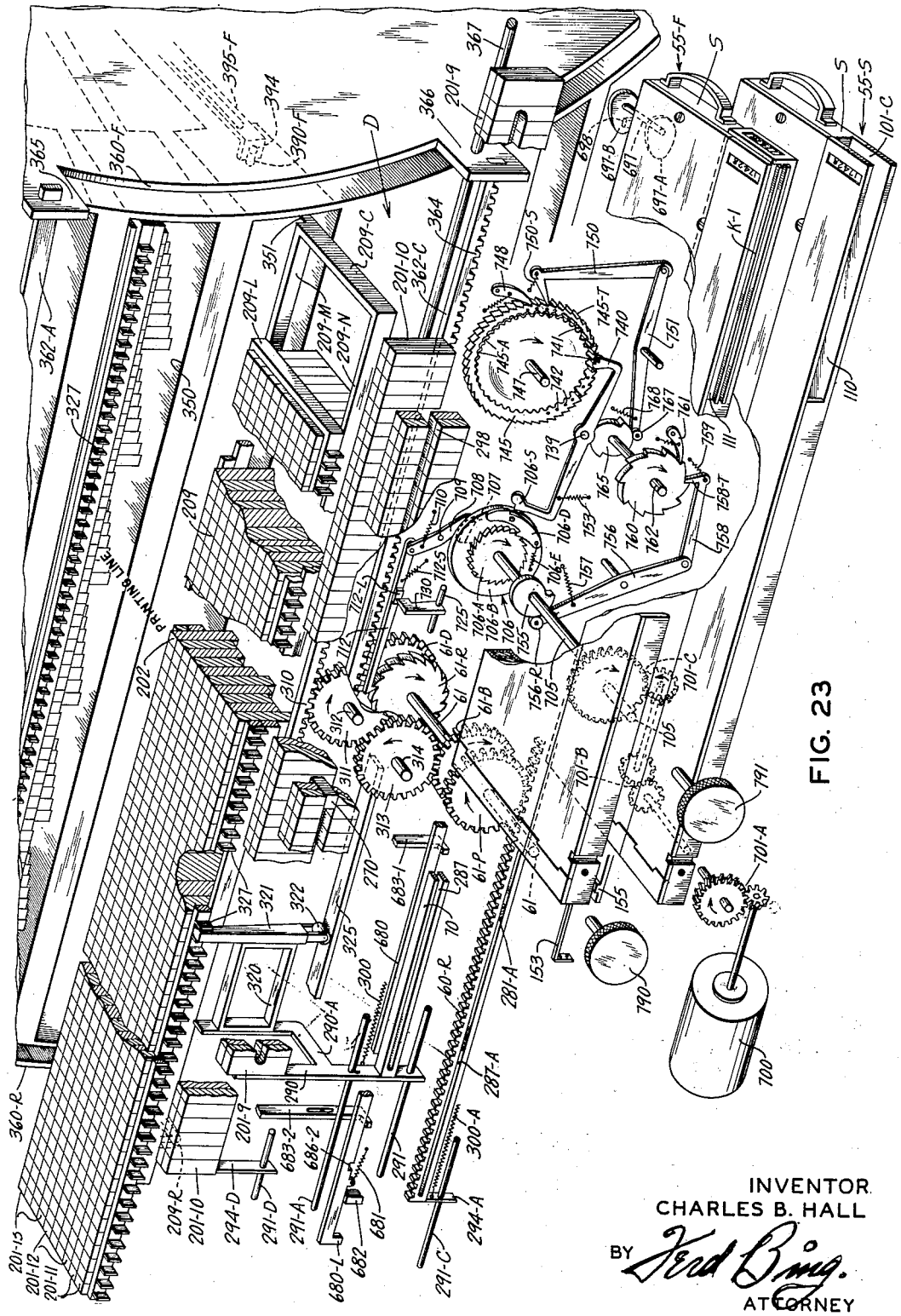
Fig. 23 is a perspective view taken from the left front of the computing and recording machine and showing in a schematic way the time drive means and the substracting means of the machine.

Thus the type elements or sets carried by the drum D, as well as the start time set-up bar 60, are at all times in positions representative of present time, and are ready for cooperation with a settable start time abutment or block 64, as shown in Figs. 17 and 23, afforded in each storage slide S, Fig. 5. The start time set-up bar 60 serves, when a slide S is inserted to its home position in the "In" or start time slot 55—S, to set the start time block 64 to a position in the slide S representing instant time, while the time position of the drum D is effective to cooperate with the previously set start time block 64 of a slide S through means including a control or computing bar 70 that is aligned with the "Out" or finish time slot 55—F, to compute the elapsed time, earnings and other related data, as such a slide S is inserted into the "Out" or finish time slit 55—F.

The records produced

The printed record C—1 and the punched record C—2 are shown in detail in Figs. 2 and 3 respectively of the drawings, and it is to be emphasized that under the present invention the machine R may be arranged to produce either one, or both, of such records, although in most instances it is contemplated that both records will be produced so that by giving the printed record C—1 to the worker immediately after it is produced, the added benefit of immediate checking or verification of the record by the worker will be attained, while at the same time affording the punched record C—2 for immediate use for accounting and related control purposes by the company. However, if only a printed record is produced, that record becomes the document of original entry for company use in the preparation of payroll and accounting records.

The printed record card

The two records C—1 and C—2 are arranged to bear identical data in most respects, although certain kinds or classes of information may be deleted in some instances from the printed record where this is desirable, as will hereinafter appear. Thus, as shown in Fig. 2, the printed record C—1 is in the form of a rectangular card bearing the usual printed company identification 71, the printed record identification 72, and a plurality of ruled item spaces 73, having printed identifying titles 74, to receive printed impressions of the numerical data 75 allocated to the respective spaces 73. Thus, as shown herein, the card or record C—1 has twelve item spaces 73—1 to 73—12 defined thereon by solid lines, and one additional space 73—13, shown in dotted outline, indicating a space that may be used only in some instances.

Within the respective spaces 73, the related numerical data 75 is printed along a longitudinal printing line designated at PL in Fig. 2, and such items of printed data 75 represent the vital information that is desired for accounting, control and other like purposes. Thus the date upon which the card is produced is printed at 75—1, the consecutive number of the card at 75—2, the man number at 75—3, the man's rate at 75—4, the department at 75—5, the job number at 75—6, the operation number at 75—7, the machine number at 75—8, the start time at 75—9, the finish time at 75—10, the computed elapsed time at 75—11 and the computed earnings amount at 75—12. In the space 73—13, the computed burden amount may be printed at 75—13, although this is not always essential, and will in many instances be avoided as a matter of company policy.

The punched record card

The punched record C—2, Fig. 3, is similarly in the form of a rectangular card, having the usual cut corner 78 for positioning purposes, and this card has a printed company identification 79 and a printed record identification 80 thereon. The card C—2 is of the usual 80-column size and type, and since the data that are to be recorded in the present illustrative example require only the use of columns 39 to 80, the left hand portion of the card face is utilized for the company and record identifications 79 and 80. The columns from 39 to 80 are allocated to the same items of data that are printed in the spaces 73—1 to 73—13, and for convenience, the card has printed ruled lines thereon dividing the column areas into spaces or fields 83—1 to 83—13 in which corresponding titles 84—1 to 84—13 are printed. Further group titles 85 are printed on the card in a transverse unprinted or unruled line, to additionally identify the character of the data representations in adjacent groups of columns. Along the upper edge of the card, a plurality of similarly arranged spaces 86—1 to 86—13 are defined by appropriate ruled lines, and identifying titles 87—1 to 87—13 are printed in these spaces. The fields 83—1 to 83—13 have the related data recorded therein by perforations 88 formed in accordance with the usual 10-element positional code, and the spaces 86—1 to 86—13 are adapted to have interpretations of the punched data printed therein in a known manner.

It will be noted in the foregoing description that the various items of recorded data, as well as the related spaces or fields and the related identifying titles, have been identified by reference characters having similar suffixes from 1 to 13, and this identity of suffix will be maintained where possible in the following description of the printing and punching means and the data storage means of the storage slides S.

The storage slides S and related mechanisms

The storage slides S are shown in detail in Figs. 4 to 12, and each such slide comprises an elongated rectangular holder 101 that may be termed generally drawer-like in form in that it has a bottom wall 101—B, side walls 101—R and 101—L, and a front wall 101—F upon which a handle 101—H is afforded. Thus, the holder 101 is open at its rear, or left hand end, as viewed in Fig. 5, thereby to expose the rear edge or end faces of a plurality of settable data-representing abutments that are mounted within the holder so as to face rearwardly of the holder. At the rear end of the holder 101, the upper edges of the side walls 101—R and 101—L are connected by a narrow top wall section 101—T which serves as a hinge element for hingedly supporting the rear end edges of a pair of cover plates 102—R and 102—L, which extend side by side in a forward direction to the front wall 101—F so that the holder 101 is completely covered and closed thereby. Locking devices 102—S are provided near the forward ends of the cover plates 102—R and 102—L for individually locking the same in their closed positions.

When the covers 102—R and 102—L are opened, a plurality of elongated abutment plates 103, that are disposed in a parallel relation longitudinally within the holder 101, may be set to different longitudinal positions so as to be representative of certain of the data 75, while the start time block 64 is similarly exposed for setting movement to its base or normal position wherein its left hand face, Fig. 5, is disposed in approximate alignment with the rear or left end edge of the slide S. The start time block 64 is mounted near the wall 101—R of the holder 101, for longitudinal setting movement in a channel or guideway defined between the side wall 101—R and an intermediate wall 101—W; and the abutment plates 103 are disposed between the walls 101—W and 101—L.

The abutment bars or plates 103 are of identical size and shape, and as shown in Fig. 5, each such plate has a front end edge 103—F and a rear or abutment edge 103—R which is faced toward, and accessible through, the open rear end of the holder 101. The respective abutment plates 103 are adapted to be set in any one of eleven longitudinal positions, as indicated by the scale 105 associated with Figs. 5 and 8, and in the most forward or right hand position, the abutment end 103—R of the bar or plate 103 is in what may be termed a "blank" position wherein it will be effective to cause the related order of the printing or other recording means to be ineffective and leave a space in which no record is formed. The next position to the left is termed the "zero" position, while the next nine positions rearwardly or to the left in Figs. 5 and 8, are representative of the successive digits from 1 to 9. Means are afforded for locking the several plates or bars 103 in the desired set positions, and for this purpose each bar 103 has a series of eleven notches 103—N former in its upper edge surface so that one of these notches may be engaged by downwardly facing locking teeth 102—T, Figs. 7 and 8, formed on the lower faces of the covers 102—R and 102—L.

The several abutment plates or set-up bars 103 are allocated in groups to the respective data classifications 75—3 to 75—8 the number of bars 103 included in each group being determined by the maximum number of digits that may appear in each data classification, and in Fig. 5, these groups of bars 103 are indicated at 103—3 to 103—8. Such grouping of the bars 103 is of course flexible and may be varied to meet different problems that may be encountered.

In practice, all of the bars 103—5 to 103—8 are set up by the timekeeper and are locked in position by closure and locking of the cover 102—R, and to simplify this work and avoid loss of time between jobs, two storage slides S are provided for each man, one to be used for its data storage purposes while the man is at work on a particular job, while the other slide S is available to be set up by the timekeeper for the next job that is to be assigned to the man.

Storage racks

Figure 31:
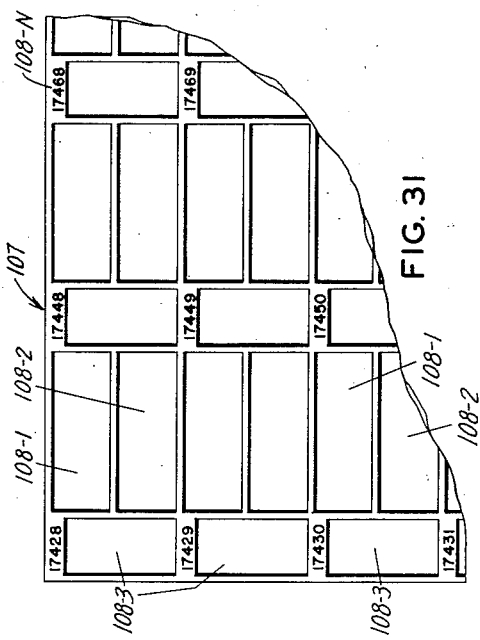
Fig. 31 is a fragmentary front elevational view of a rack for storing the storage slides.

Thus in the timekeeper's office and preferably adjacent to the machine R, a rack 107 is afforded, Fig. 31, and in this rack a plurality of similar storage spaces 108 are provided. The spaces 108 are allocated to the respective workmen, and may bear the man's number as at 108—N to facilitate location of any particular slide S, and each space 108 includes three openings, 108—1, 108—2 and 108—3. The two openings 108—1 and 108—2 are of identical shape and size and are adapted to receive the two storage slides S that are assigned to the particular worker, while the opening 108—3 is adapted to receive and store an identifying key K that is assigned to the man, and which embodies means not only to facilitate the set up of certain of the bars 103 but also to control the set up of the computing means of the machine R.

The man's rate key

The key K is shown in detail in Fig. 13 independently of the holder 101, and as will be evident in Figs. 5, 8 and 12, this key K is adapted, when the cover 102—L is open, to be put in position in the forward left hand portion of the holder 101 to determine the set positions of the bars 103 that are included in groups 103—3 and 103—4 which are the data classifications that are related only to the particular worker to which the key K is assigned. Thus the key K is in the form of a generally rectangular body or block that has a flange 109 extending laterally and downwardly at its front edge, and the front wall 101—F of the holder 101 is cut away at 101—C so that the block may be disposed in the left front corner of the holder 101 with the flange 109 disposed in abutment with the outer face of the front wall 101—F. The right hand edge of the block or key K is then disposed against a narrow division wall 101—D that is afforded in the holder 101 parallel to the side walls 101—R and 101—L.

The left hand side portion of the block that forms the key K is arranged to project laterally out of the holder 101; Figs. 5 and 12, throughout a portion of its length, and for this purpose the front portion of the side wall 101—L is cut away at 110, so that the projecting portion 111 may so extend. At the rear end of the projecting portion 111, a shoulder 112, Fig. 12, is formed which bears against the forward end of the wall 101—L, and rearwardly of the shoulder 112, a side surface 113 of the key K bears against the side wall 101—L. The projecting portion 111 of the key K carries one or more longitudinal ribs K—1 which by their lateral spacing, position or dimensions, serve to afford a mechanical representation or key which represents the pay rate of the man to whom the key is assigned, and such mechanical representations serve as a safety means, in cooperation with means to be hereinafter described, to insure setting of the drum D to the proper pay rate when the elapsed time and earnings amount are being computed and recorded.

The rear end of the block that affords the key K is formed with abutment shoulders 115 which are aligned with the respective bars 103 in the groups 103—3 and 103—4, and these shoulders 115 are so positioned that when they are engaged by the forward ends 103—F of the related bars 103, these bars will be disposed in set positions representing the man number and the pay rate of the man to whom the key K is assigned. To assure accurate positioning of the key K, a longitudinal rib 116, Fig. 11, is formed on the bottom wall 101—B for engagement with a complemental groove 117, Fig. 13, in the bottom of the key K, and a transverse groove 118, Fig. 13, in the top of the block or key K is adapted to be engaged by a transverse rib 119, Fig. 8, on the inner face of the cover 102—L.

The bars 103 included in the groups 103—5 to 103—8 are disposed between the walls 101—W and 101—D, Figs. 5 to 12, and are set up and locked in position independently of the bars in groups 103—3 and 103—4. In this connection it will be noted that the division line between the covers 102—R and 102—L is located at the wall 101—D, Figs. 4 and 5, thereby to enable the bars 103—5 to 103—8 that are disposed under the cover 102—R, to be set up and locked in position prior to the insertion or mounting of the key K. In practice it is contemplated that but one key K will be afforded for each man, and this will be put in place by the timekeeper after the start time has been set up or stored, and before the storage slide S is inserted into the finish time slot 55—F for the final computing and recording operation.

When all of the elements of a storage slide S have been set up as above described, the settings may be verified by the worker, and to enable this to be done, the tops of the bars 103 are numbered at 103—V, Fig. 5, so that the number corresponding to the set position of each bar 103 is visible through a window or slot 120, Fig. 4, formed in the related covers 102—R and 102—L. This verification is simplified by affording identifying legends 121 on the covers along one edge of the slot 120. Similarly, the man's number 106—S is afforded on the top of the cover 102—L, while the man's number 106—K is also afforded on the forward end of the key K so as to be visible when the key is in position in the slide S or in the rack 107, Fig. 31, and these two numbers afford a convenient means for verifying the setting up operations and for assuring that the key K and the slide S are properly associated and are stored in the proper compartment 108 of the storage rack 107.

*Start time block locking means*

The start time block 64 is, of course, settable longitudinally in the guideway defined by the walls 101—R and 101—W so as to be representative of the start time, but it should be noted that the start time block 64 is normally locked against such shifting and is unlatched for setting movement by cooperation with latch releasing means on the start time set-up bar 60 when the storage slide S is put into position in the start time slot 55—S. Thus, as shown in Figs. 5, 12 and 15, the opposite side walls 101—R and 101—W have inwardly facing notches 130 formed therein for engagement by a pair of latch levers 131 mounted in a recess within the start time block 64, as shown in Fig. 15. The latch levers 131 are centrally pivoted on a common pivot 132 and have outwardly extending teeth 131—T at their upper ends for outward movement into engagement with the notches 130 under the action of a spring 133 that is connected between the lower ends of the two levers 131. These lower ends are normally located relatively close together, but are adapted to be separated by means of a pointed cam element 134 that is extended from the forward end of the start time set-up bar 60. Thus as the slide S is inserted into the start time slot 55—S, Fig. 1, the start time block 64 which is initially set by the timekeeper in the rear end of the guideway, will move toward the forward end of the start time set-up bar 60, Fig. 17, and the cam element 134 will enter the clearance opening in the start time block 64, Fig. 15, and will release the latch levers 131. After such release, the start time block 64 will come into full engagement with the forward end of the set-up bar 60 and in continued rearward movement of the slide S into its fully inserted position, the start time block 64 will be moved forwardly in the guideway by the start time set-up bar 60, until slide S is fully inserted in the start time slot 55—S, at which point movement of the start time block 64 in and with relation to the slide S will stop, and the start time block 64 will thus be set in some more forward relative position in the slide S, as shown in Fig. 17. In this setting movement the frictional retarding action of a pair of spring friction devices 135, Fig. 15, on the sides of the start time block 64 must be overcome, and then upon reversal of the movement in withdrawal of the slide S, these friction devices 135 hold the start time block 64 in a set position while the cam element 134 is withdrawn and the latch levers 131 are rendered effective.

The start time block 64 is thus set in a position on the slide S which is representative of the start time, so that in this set position, the block 64 constitutes a stored mechanical representation of the start time, in respect to the job to which the slide S is for the moment assigned.

*Start time slot full-insertion means*

To insure accurate setting of the start time block 64, means are provided for preventing withdrawal of a slide S from the start time slot 55—S until such slide has been moved through its full inserting stroke. Such full stroke means are illustrated in detail in Figs. 19, 19A and 20. Thus as shown in Figs. 17, 19, 19A and 26, a mounting shaft 122 is extended transversely beneath the shelf 275—S and this shaft 122 rides at its opposite ends in horizontal slots 122—S, Fig. 26, in the side plates 252 and 254. On the shaft 122 so as to be disposed about midway between the sides of the start time slot 55—S, a generally U-shaped attaching lever 123 is loosely pivoted, and means are provided whereby this attaching lever 123 is locked to the rear end of a slide S as it is inserted into the slot 55—S and is maintained in this locked relation while the slide S is moved into its fully inserted relation and is again withdrawn.

Figure 19:
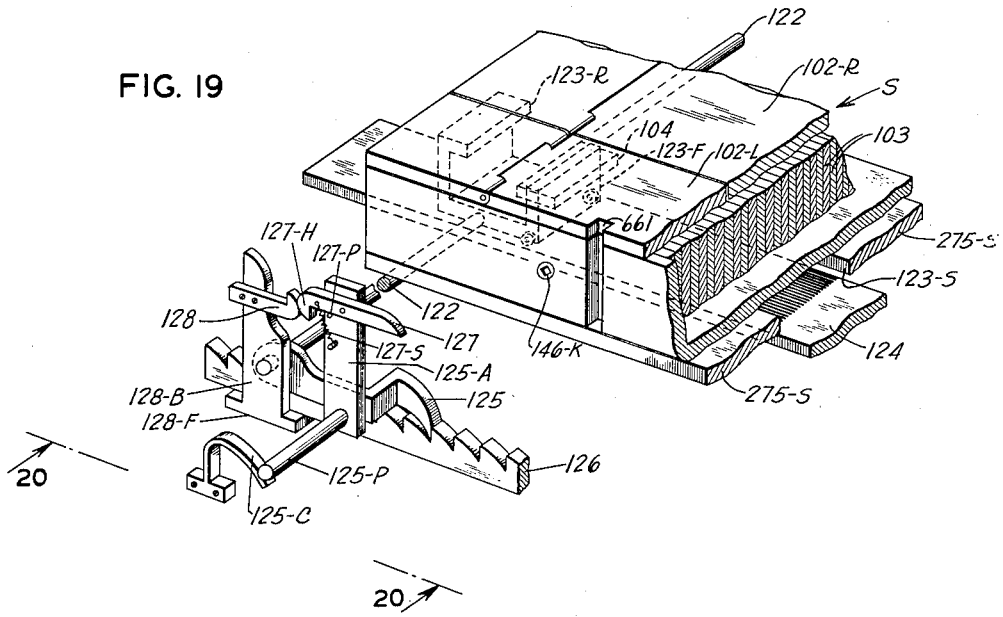
Fig. 19 is a perspective view of the full-insertion means afforded to insure correct setting up of the start time.
Figure 19A:
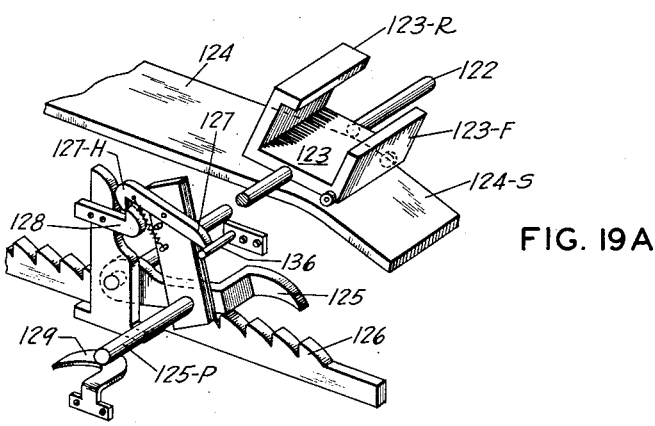
Fig. 19A is a perspective view of the full-insertion means in a latched position.
Figure 20:
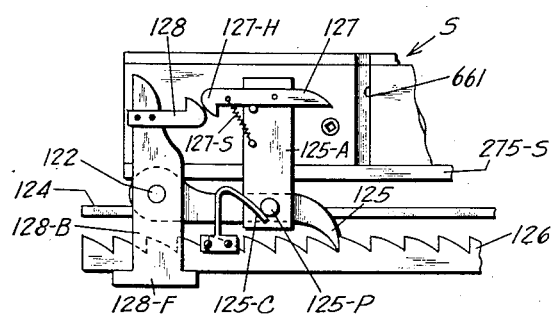
Fig. 20 is a longitudinal vertical section taken along the line 20—20 of Fig. 19 and showing the full-insertion means.

Thus, the lever 123 is arranged when it is in its forward position to lie in an angular relation, as shown in Fig. 19A, on the downwardly sloped forward end 124—S of a stationary guide plate 124, and in this relation one arm 123—R at the rear end of the lever 123 extends upwardly through a slot 123—S in the shelf 275—S so as to be disposed in a position to be engaged by the rear end of a slide S as it is inserted. The hook-shaped forward end 123—F of the lever 123 at this time is disposed below the upper face of the shelf 275—S. When a slide S is inserted into the start time slot 55—S, its rear end engages the arm 123—R to thereby move the lever 123, and the shaft 122 on which it is mounted, in a rearward direction. This moves the lever 123 off of the angular forward end portion 124—S and onto the horizontal portion of the guide plate 124 thereby to rock the lever 123 to the position shown in Fig. 19 wherein the hook portion 123—F engages a recess 104 in the lower face of the slide S. This locks the lever 123 and the shaft 122 to the slide S, and means are afforded in association with the shaft 122 to prevent withdrawal of the slide S until after full insertion thereof.

Thus on each end of the shaft 122 a full stroke ratchet mechanism is provided, but one of such ratchet mechanisms being shown in detail. Each such mechanism includes a pawl 125 pivoted on and extending forwardly from the shaft 122 and arranged so that its forward end tends by gravity to engage the upwardly extending, rearwardly facing teeth of a stationarily mounted ratchet bar 126. As a slide S is moved rearwardly, each pawl 125 rides tooth-by-tooth along its ratchet bar 126 so as to be in position at all times to prevent appreciable forward or withdrawing movement of the slide S. However, when the rear or home position of the slide S is reached, a laterally projecting pin 125—P on the pawl 125 rides up on a stationary resilient cam member 125—C to thereby lift the pawl 125 out of engagement with respect to the ratchet bar 126, and means are provided for latching the pawl 125 in such raised or released position and for maintaining such latched or raised position until the slide S is fully withdrawn. Thus an arm 125—A extends rigidly in an upward direction from the pawl 125 near the free end thereof, and a latch lever 127 is centrally pivoted near the upper end thereof. A spring 127—S urges the latch lever 127 counterclockwise, Figs. 19 and 20, to a normal position determined by a pin 127—P, and when the pawl 125 is lifted by the cam 125—C, the hook-shaped rear end 127—H of the latch lever rides over a relatively stationary hook-shaped keeper 128 to latch the pawl 125 in its released position. The keeper 128 is carried on an upright block 128—B that is fixed on the shaft 122, the block 128—B having a lateral bottom flange 128—F riding along the flat lower face of the ratchet bar 126 to maintain the block 128—B in its upright position. Hence, when the pawl 125 is latched in its released position the slide S may be withdrawn, and at the end of the withdrawing movement, the latch 127 is released and the pawl 125 returns to its lower or effective position. Thus as shown in Fig. 19A, an overhanging stationary guide cam 129 is engaged by the pin 125—P to hold the pawl 125 in its elevated position during the very last portion of the forward movement during which the forwardly extending tail portion of the latch 127 rides under a stationary pin 136, thereby to release the latch. While the latch 127 is thus released, the pin 125—P rides off of the forward end of the cam 129, thereby to enable the pawl 125 to return to its effective position. Then in the next rearward movement of the assembly the pin 125—P rides under the overhanging cam 129. With the full stroke mechanism thus afforded, proper setting of the start time block 64 of the slide S in the start time slot 55—S is assured.

With respect to the functioning of the start time block 64 in the final computing and recording operation, it is necessary that the slide S be fully inserted into the finish time slot 55—F in order to cause subtraction of the full start time amount, and in attaining this action, the rear face 138 of the right side wall 101—R, Fig. 28, cooperates with an interlocking system which operates as will hereinafter be described to prevent the recording operation until several critical conditions are detected, including full insertion of the slide S in the finish time slot 55—F.

*Single-use safety mechanism*

Another safety or protection means has been associated with the slide S to limit its use to but a single recording operation, and this may be termed a single-use safety mechanism 140 which is mounted in the left rear corner of the slide S within a hollow rear portion of the rear end of the side wall 101—L. Thus as shown in Fig. 34, the mechanism 140 is shown in perspective and in a somewhat exaggerated manner as comprising a locking plate 145 that is pivotally supported on a horizontal shaft 146 for spring-urged movement in a counterclockwise direction by a spring 147 toward an effective or safety position. When the storage slide S is issued to a worker, the locking plate 145 is latched in an ineffective position by a pivoted latch 148, one arm 148—F of which has a roller 149 thereon that may be disposed beneath a shoulder 150 on the locking plate 145. The latch 148 has a release arm 148—A upon which a spring 151 acts to urge the latch 148 to its effective position.

When the slide S is in the last portion of its inserting stroke the release arm 148—A engages a stationary arm 153, Figs. 23 and 34, disposed in the machine R so as to enter a small opening in the rear end of the wall 101—L, and this releases the latch 148 and permits the locking plate 145 to rock counterclockwise to the position shown in Fig. 34, wherein a downwardly projecting finger 145—F on the plate 145 is extended through an opening 154 in the bottom of the side wall 101—L so as to rest on top of a stop lug 155 that is stationarily located in the machine. Hence, when the slide S is withdrawn or moved forwardly for but a short distance after the desired recording operation, the finger 145—F will drop down in front of the lug 155 so that the slide S can not again be moved rearwardly to its home position. The plate 145 is locked in this effective position by a keeper bar 156 which is slidable horizontally on mounting pins 157 and is urged forwardly by a spring 158. The keeper 156 has a rounded right hand end portion 156—R which is formed by a bent-up bar portion 156—B and while the plate 145 is in its latched or ineffective position, the vertical bar portion is engaged with a roller 160 carried on a rearwardly extended arm 145—R of the plate 145. The roller 160 thus holds the keeper 156 in a rearward position, and upon release of the latch 148, the roller 160 moves down onto the curved surface 156—R so as to allow slight forward movement of the keeper 156. When, however, the slide S is withdrawn from the finish time slot 55—F so as to allow the finger 145—F to drop off of the abutment 155, the keeper 156 advances still further so as to dispose a flat bottom surface thereof over the roller 160 and thereby lock the plate 145 in its effective position until such time as the keeper 156 is released. Such release is effected by the timekeeper by turning the shaft 146 which has a key slot 146—K therein. The shaft 146 has a restoring plate 165 fixed thereto by a set screw 166, and this plate 165 has a downwardly projecting arm 165—L thereon that is arranged, in a clockwise rotation of the plate 165, to engage a roller 167 fixed on a forwardly projecting arm 156—F of the keeper bar 156. This forces the keeper bar 156 rearwardly to a released relation, and after such release, a tooth 165—T on the plate 165 engages a lug 169 on the plate 145 to rock the same clockwise to its ineffective position wherein the latch 148 becomes effective to hold the plate 145 in its set position.

The printing means generally

When a storage slide S is inserted into the finish time slot 55—F, it is effective to set up printing means for printing the items of reference data 75—3 to 75—8 and the start time 75—9, and in addition, the inserting movement of the slide S is effective to cause subtraction of the start time from the finish time so as to compute the elapsed time and the related earnings and burden amounts, and to set up printing means for printing the elapsed time 75—11 and the computed earnings amount 75—12 and burden amount 75—13. In the recording operation, the finish time 75—10 which is set up by the machine R as a machine indication, the date 75—1, which is manually set up each day, and the consecutive number 75—2, which is automatically advanced in each machine cycle, are also printed or recorded simultaneously with the items of data hereinabove set forth.

The printing station

Figure 16:
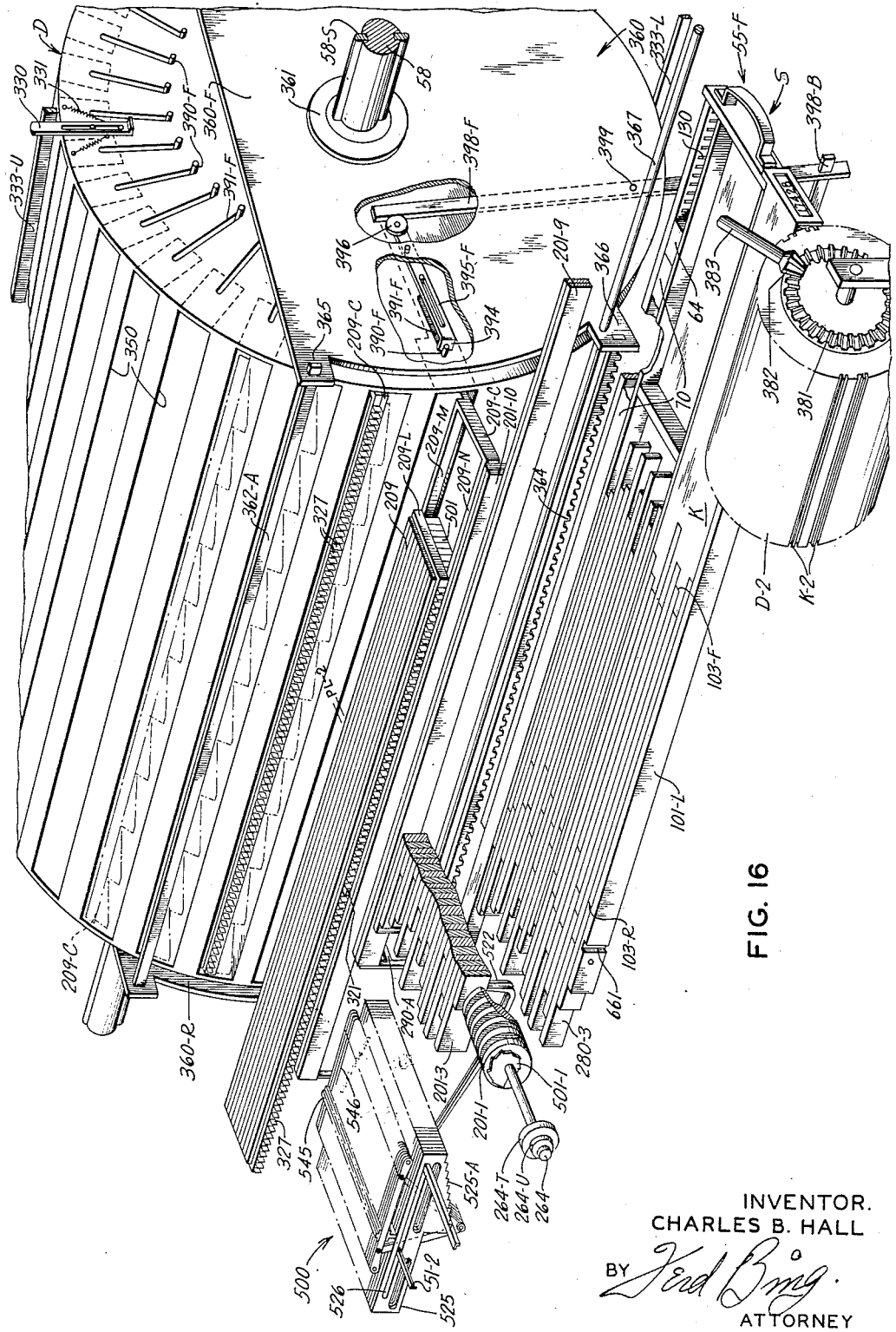
Fig. 16 is a perspective view from the left front of the computing and recording machine and showing the type bar carrier or drum, the type elements and a storage slide in cooperating position in the finish time control station.
Figures 21, 22:
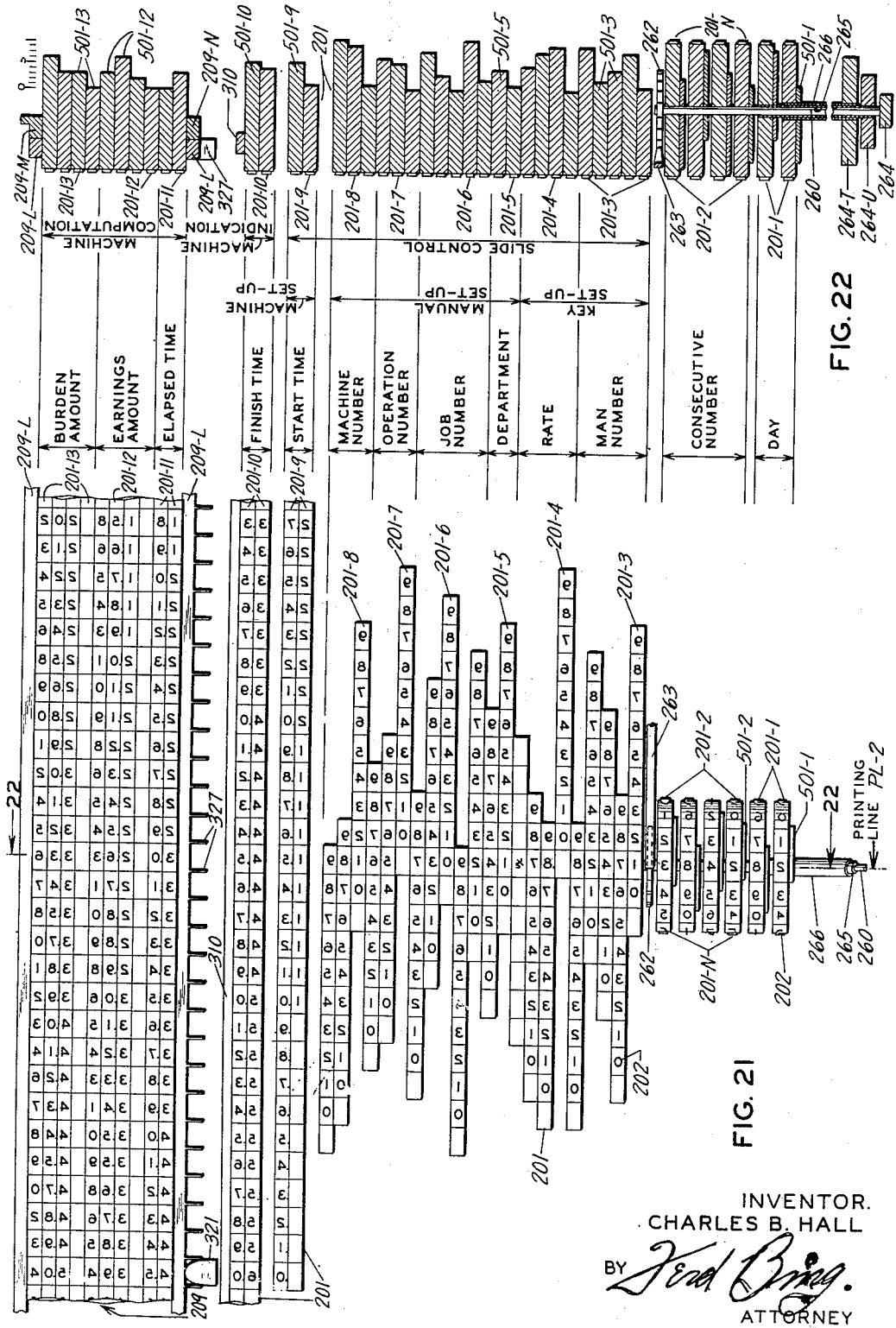
Fig. 21 is a top plan view of the printing elements positioned at the printing line.
Fig. 22 is a vertical cross sectional view taken along the line 22—22 of Figs. 21 and 27 and showing the type elements at the printing line.
Figure 26:
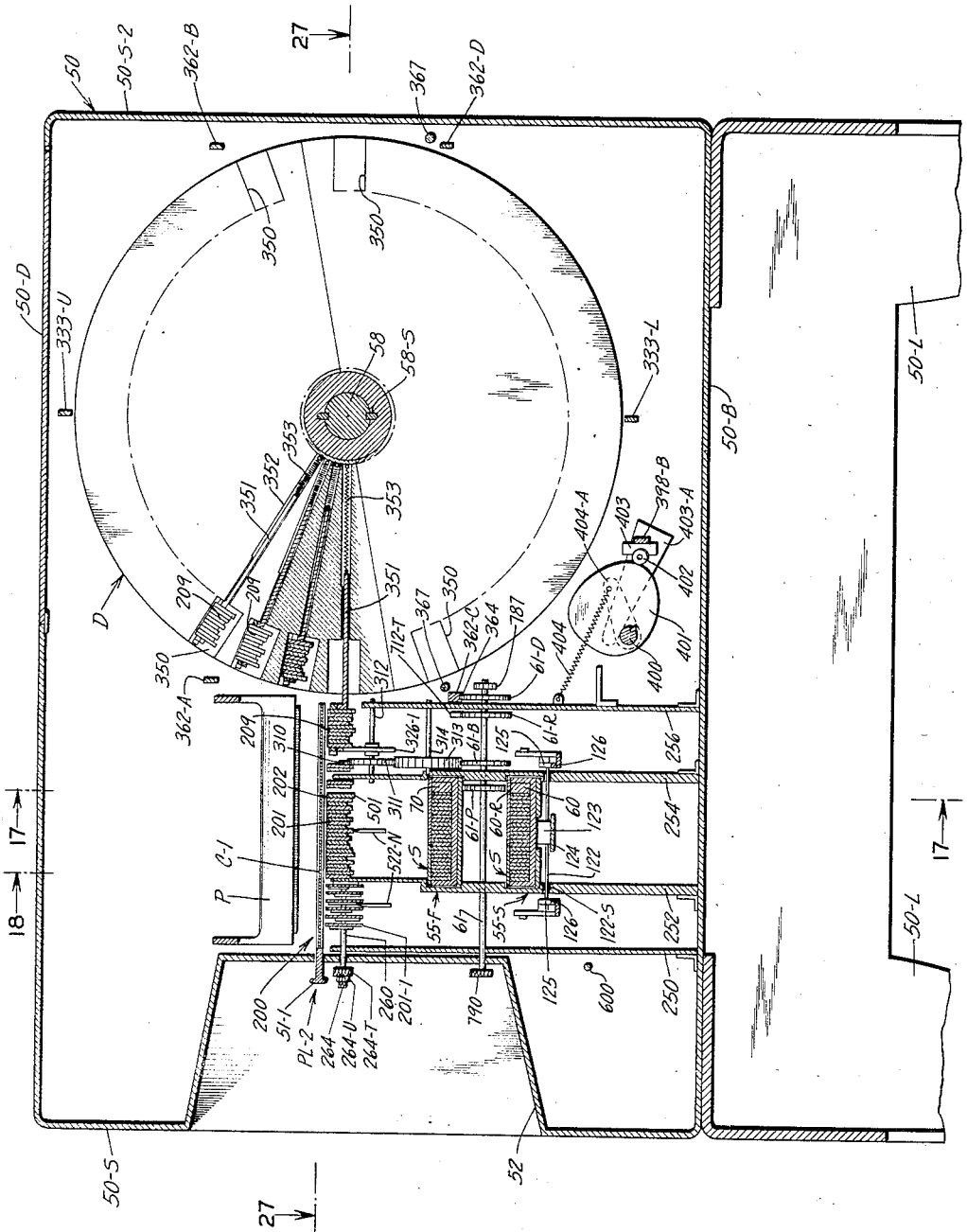
Fig. 26 is a vertical cross sectional view taken at the printing line, along the line 26—26 of Fig. 27.
Figure 27:
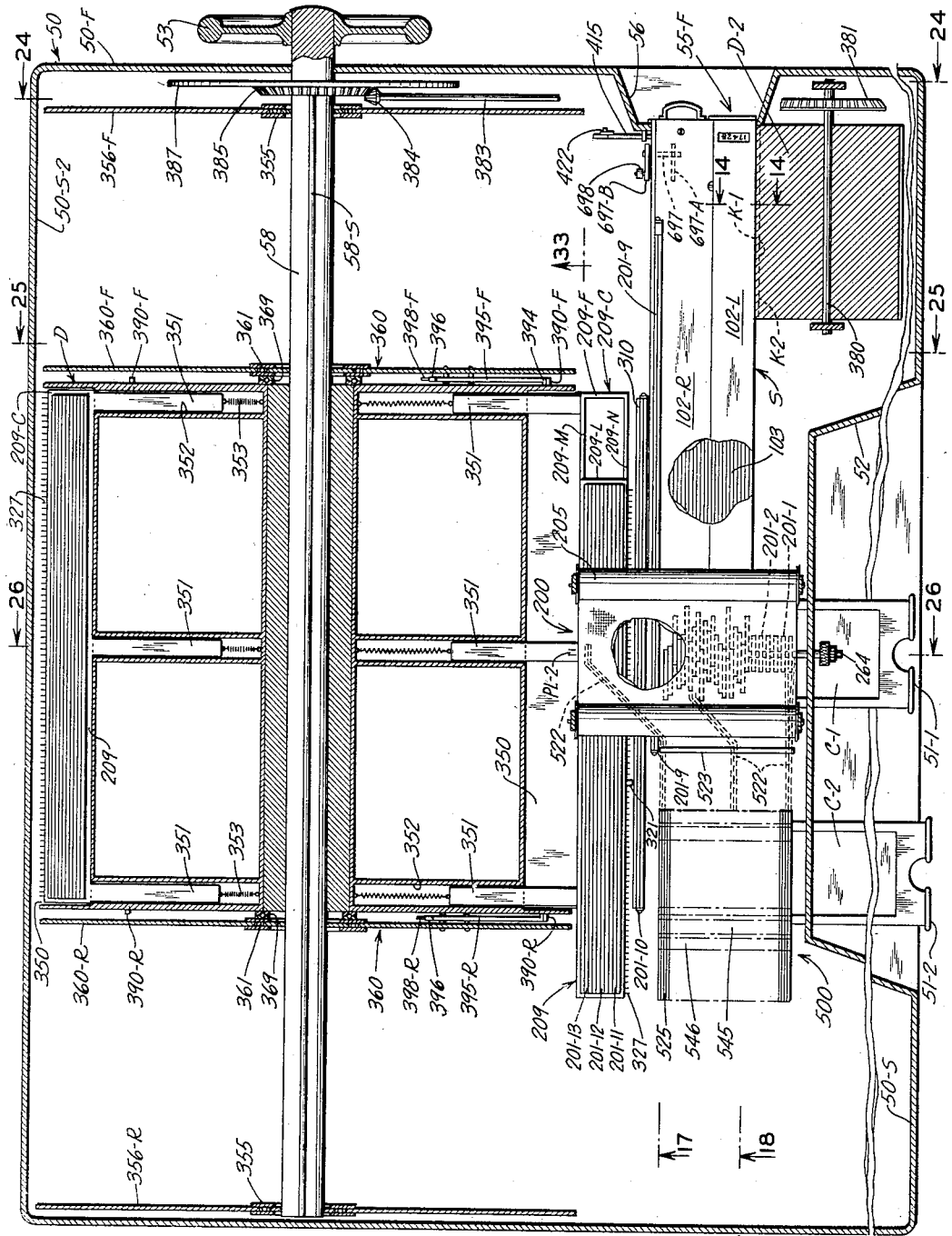
Fig. 27 is a horizontal cross sectional view taken substantially in the horizontal printing plane along the line 27—27 of Figs. 17 and 24 to 26.

The printing means for printing all such data are disposed at the printing station 200 which is located within the housing 50 between the recessed panel 52 and the drum D, as will be evident in Figs. 16, 26 and 27, and at this printing station 200, a plurality of upwardly facing settable type elements 201, Figs. 16, 21 and 27, are disposed so as to be movable transversely of a printing line PL—2, Figs. 21 and 27, which printing line PL—2 is so disposed as to lie beneath the printed card receiver 51—1 so as to be in a vertical plane with the printing line PL of a card C—1 that is held by the receiver 51—1. The settable type elements 201 are of different forms, and are supported and set in different ways as will be described in detail hereinafter, but it should be noted that at the printing line PL—2, all of the type elements 201 are disposed beneath an inked ribbon 204, Fig. 17, running between ribbon feed spools 205, and the card C—1 in the card receiver 51—1 is adapted to be pressed into printing cooperation with the set type at the printing line PL—2 by a stamper type platen P which is pivoted on a supporting shaft 206 as will be described presently.

The type elements

The different characteristic forms of the several type elements 201 are shown in Figs. 16, 21, 22, and 27, and it will be observed that two manually settable type wheels 201—1 are afforded at the printing line PL—2 for printing the date 75—1, and that a consecutive numbering machine 201—N having four type wheels 201—2 is disposed at the printing line PL—2 adjacent to the date printing wheels 201—1 for printing the consecutive number of the card 75—2. The type elements for printing the data 75—3 to 75—8 are of similar form, and as will be evident in Figs. 18, 21 and 27, these type elements are in the form of horizontally slidable type bars. These type bars are allocated in appropriate groups to the printing of the various items of identification or reference data 75—3 to 75—8, indicated in Fig. 21 by the use of a corresponding suffix, in respect to each such group. These type bars 201—3 to 201—8 are individually set up by the data-representing abutment plates 103 as a storage slide S is moved into the finish time slot 55—F, and these type bars therefore have type characters and spaces formed thereon which correspond in arrangement with the set up positions of the abutment plates 103 of the slide S. Thus, each type bar 201—3 to 201—8 has eleven character spaces 202 formed along its upper face, the left hand or rear space, Fig. 21, being blank, the next space to the right having a "zero" type character therein, and the next nine spaces forwardly or to the right having the type characters 1 to 9 inclusive formed in succession therein.

The start time 75—9 is printed from a pair of relatively long type bars 201—9 that are formed or secured together so that the start time may be digitally represented thereon in hours and tenths of hours. Thus the units type characters are formed in appropriate spaces on one type bar 201—9, while the tenths type characters are formed on the other such bar, and it should be noted that the lowest digits are at the rear, or left hand ends of these bars as shown in Fig. 21.

Similarly, finish time 75—10 is printed by a pair of type bars 201—10 which are relatively long and are fixed together for setting movement in unison. The finish time is also represented in hours and tenths of hours, the type characters for the units and tenths being formed respectively on the two bars so that the lowest figures are at the forward ends of these bars. This is the reverse of the arrangement on the start time type bars 201—9.

As will hereinafter be described in detail, the type elements 201—1 to 201—10 are settably disposed at printing position 200 at all times, but with respect to the printing elements 201—11 to 201—13 for printing the elapsed time, and the related earnings amount and burden amount, a plurality of sets 209, Figs. 16, 23, 26 and 27, of such printing elements 201—11 to 201—13 are provided on the drum D so that these sets 209 may be selectively brought into an operative relation at printing position 200 by rotative positioning of the drum D, Figs. 16 and 27, by the operating wheel 53 and by lateral shifting of the selected set 209 into printing position by actuation of the setting handle H, Figs. 1 and 24. The mounting and setting arrangements of the sets 209 of type bars will be described hereinafter, but it should be noted that the two type bars 201—11 pertaining to elapsed time in each such set 209 are identical in the several sets, while the type bars 201—12 and 201—13 of the respective sets 209 are different in that these type bars constitute mathematical extensions of the elapsed time at different regular and overtime rates of pay, the extensions within each set 209 being at the same rate of pay whereas each set 209 is for a different rate of pay. In Fig. 21 of the drawings the set 209 that is shown is the one that is based on a pay rate of $0.875 per hour and a burden rate of $1.12 per hour.

The settable type elements 201, Fig. 26, are supported within the housing 50 adjacent the side wall 50—S, while the drum D is supported by its shaft 58 between such type elements 201 and the other side wall 50—S—2, and the arrangement is such that upper faces 202 of the type elements which define the horizontal plane in which the card C—1 is supported are disposed just slightly above a horizontal plane passing through the axis of the drum shaft 58. This arrangement enables any selected one of the type sets 209 to be brought into the horizontal position on the left side of the drum D, and then to be shifted laterally into position beside the other type bars 201, beneath the ribbon 204 and the platen P, Figs. 16 and 27.

The mounting and setting of the type elements 201

A mounting frame structure is provided for the various type elements 201 and the related driving, set-up and control means, and such frame structure as shown in Fig. 26 comprises four vertically disposed plates 250, 252, 254 and 256, fixed to the bottom wall 50—B of the housing 50 and extending upwardly in parallel relation to the side wall 50—S. The left side frame plate 250 is disposed quite close to the panel 52, while the right side plate 256 is disposed relatively close to the adjacent or left hand side of the drum D, and the intermediate plates 252 and 254 are disposed at spaced points between the plates 250 and 256. The arrangement is such that the space between the upper edges of the plates 250 and 252 will accommodate the type wheels 201—1 and 201—2, while the space between the upper edges of the intermediate plates 252 and 254 will accommodate the type bars 201—3 to 201—8 as well as the start time type bars 201—9, all of these type bars 201—3 to 201—9 being set by the related abutment means of the storage slide S. On the other side of the upper edge of the plate 254, or in other words at the right thereof in Fig. 26, the finish time type bars 201—10 are supported, and between these finish time type bars 201—10 and the upper edge of the other side frame plate 256, space is afforded into which the type bars 201—11 to 201—13 of any selected set 209 may be moved for computation and printing purposes.

The type wheels

The type wheels 201—1 for printing the date, and the numbering machine type wheels 201—2 are supported on a shaft 260, Figs. 21, 22 and 26, which extends between the two plates 250 and 252, and adjacent to the plate 252, the shaft is fixed to the operating ratchet wheel 262, Figs. 21 and 22, of the numbering machine 201—N, it being recognized that conventional carry-over means are embodied in the numbering machine to produce the normal numbering machine cycle in response to the actuation of the ratchet wheel 262 by an advancing pawl 263.

It is of course necessary that the numbering machine 201—N be advanced by one number in each machine cycle; and in the present embodiment this is accomplished in the course of the release or outward movement of the printed card receiver 51—1. Thus as shown in Figs. 35 and 36, the ratchet wheel 262 has a retaining pawl 263—2 acting thereon, and means are provided for conditioning the advancing pawl 263 each time the printed card receiver 51—1 is moved into its inner or active position. For this purpose the pawl 263 is pivotally supported on the lower end of a lever 240, the mid-point of which is supported on a pivot 241 below and outwardly of one side member of the receiver 51—1. The upper end of the lever 240 has a cam surface 240—C formed thereon in position for engagement by a cam roller 243 mounted on the adjacent side member of the receiver 51—1. A spring 244 acts on the lever 240 to urge the same toward the cam roller 243, the extent of such movement being determined by a stop pin 245. Hence, as the receiver 51—1 is moved inwardly, the cam roller 243 will actuate the lever 240 and the pawl 263 to the conditioned relation of Fig. 35; and then when the card receiver 51—1 is withdrawn or moved outwardly, the lever 240 will be rocked by its spring 244 to advance the ratchet wheel 262 through one tooth-space, thus to set the numbering machine 201—N to the next higher number.

The shaft 260 has a re-set knob 264 on its outer end, and outside of the panel 52, for resetting the numbering machine. The shaft 260 also has a pair of concentric sleeves 265 and 266 mounted on its outer end portion for supporting the date type wheels 201—1. Thus the units order date wheel is fixed on the inner end of the inner sleeve 265, Fig. 22, while the tens order wheel is fixed on the inner end of the outer sleeve 266. The outer ends of the sleeves 265 and 266 have setting knobs 264—U and 264—T fixed thereon in accessible positions between the knob 264 and the panel 52, so that the date wheels 201—1 may readily be set.

Descriptive type bars

The settable type bars 201—3 to 201—8 are similarly supported between the plates 252 and 254, Fig. 26, by means shown in Fig. 18. Thus each such type bar as 201—3, has a longitudinal slot 268 formed therein and a relatively rigid support bar 270 is extended through the slots 268 of the several type bars 201 immediately below the printing line PL—2 so as to afford rigid support for the bars against the downward printing force of the platen P. The opposite ends of the support bar 270 are anchored in the plates 252 and 254. The forward ends of the type bars 201 are supported by rigid extension plates 201—E, Fig. 18, which ride in the guide slots of a transverse comb bar 271 extended between the plates 252 and 254; and the type bars 201 are individually urged in a forward direction by springs 272 extended between the forward ends of the extensions 201—E and an anchor bar assembly 273 which is carried transversely between the plates 252 and 254.

Start and finish time slots

Figure 24:
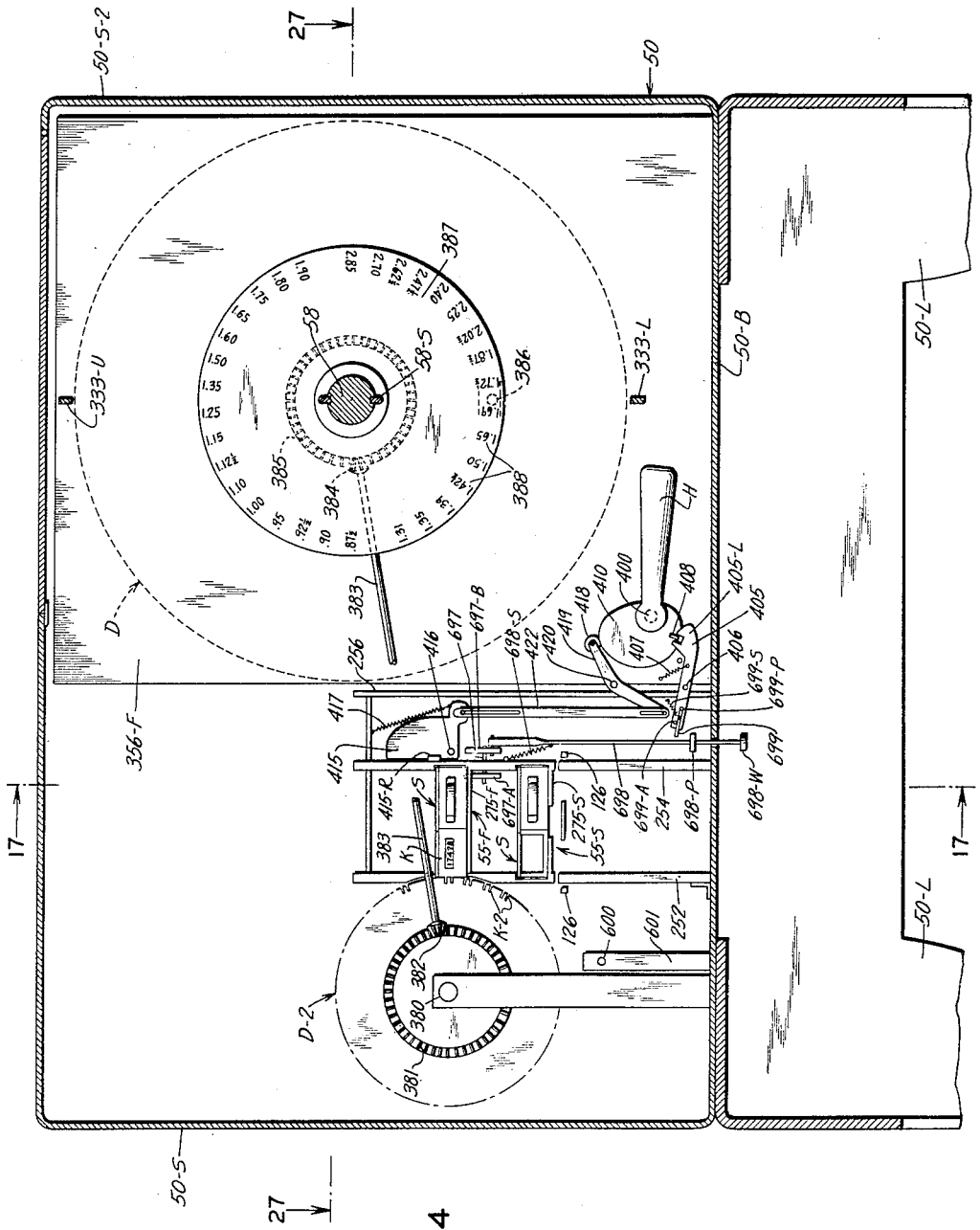
Fig. 24 is a vertical cross sectional view taken approximately along the line 24—24 of Fig. 27.
Figure 25:
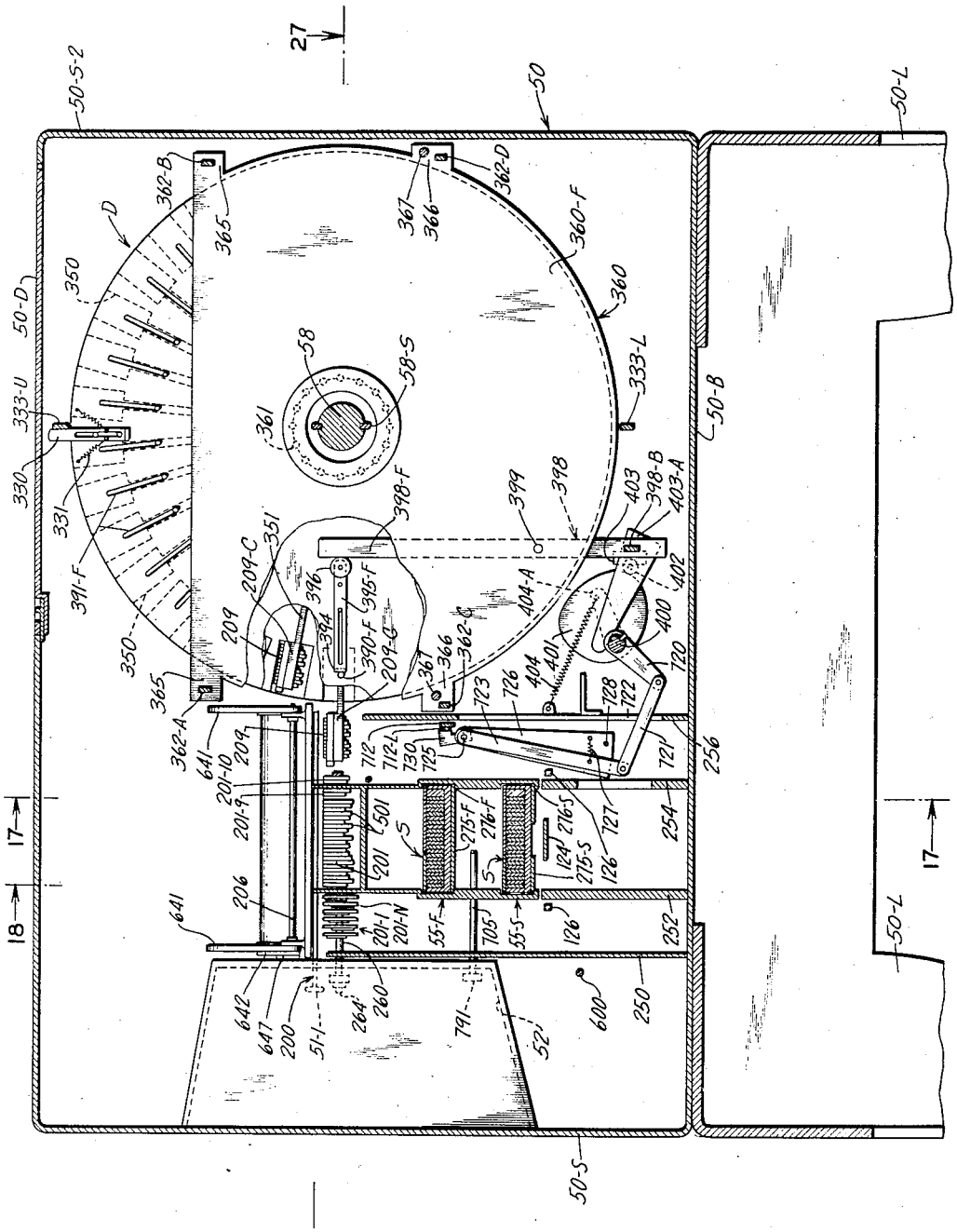
Fig. 25 is a vertical cross sectional view taken along the line 25—25 of Fig. 27 and showing the front end of the type element carrier or drum.

The respective type bars 201—3 to 201—8 are of course set by the abutment plates 103 of the storage slide S as such slide is moved rearwardly into its home position in the finish time slot 55—F, and as will be evident in Figs. 24 to 26, the space between the intermediate frame plates 252 and 254 is utilized to afford both the start time slot 55—S and the finish time slot 55—F. Thus the start time slot 55—S is arranged so that it is aligned with a longitudinally slotted horizontal support plate or shelf 275—S, which has its edges positioned in opposed horizontal clearance grooves 276—S formed in the adjacent faces of the plates 252 and 254, and when a storage slide S is inserted into the start time slot 55—S, it moves into position on the shelf 275—S. Similarly, a shelf 275—F is afforded in clearance grooves 276—F opposite the finish time slot 55—F, and a slide S inserted into the slot 55—F is moved into position on the shelf 275—F.

Descriptive control bars

When a slide S is so inserted into the finish time slot 55—F, the respective abutment bars or plates 103—3 to 103—8 are each disposed in the same vertical plane with the corresponding type bar 201—3 to 201—8; and means are provided for affording an actuating connection between the related abutment plates 103 of the slide S and the type bars 201 so that the inserting movement of a slide S to its rearward or home position in the finish time slot 55—F will impart differential setting movement to the related type bars 201.

Thus, as shown in Figs. 16, 18 and 26, a plurality of slidable control bars 280—3 to 280—8 are supported for horizontal sliding movement in slots 279 on a cross bar 281, Fig. 18, that is extended between the frame plates 252 and 254. These bars 280 are aligned with the positions occupied by the related abutment plates 103 of a slide S in the finish time slot 55—F, and are individually urged forward by springs 282 connected between the rear ends of the bars 280 and a spring anchor plate 283 carried on the rear end of the shelf 275—F. The rear ends of the respective control bars 280 are connected to the forward ends of the related type bars 201 by tie rods 285—3 to 285—8 so that these tie rods not only serve as supports for the rear ends of the control bars 280, but also serve to transmit setting movement from the control bars 280 to the respective type bars 201.

*The start time control or computing bar*

The start time type bars 201—9 are also set by the slide S as it is inserted into the finish time slot 55—F, and for this purpose the start time control bar 70 is slidably supported in alignment with the location of the start time block 64 of a slide S in the finish time slot 55—F. For this purpose the start time control bar 70, Fig. 17, has a longitudinal slot 287 formed therein and the stationary guide bar 281 that is supported between the frame plates 252 and 254, extends through the slot 287. At its rear end, the start time control bar 70 has a vertical tie rod 290 fixed thereto, and the downwardly projecting end thereof is arranged to slidably ride upon a stationary guide rod 291 which is mounted in brackets 292 fixed to the left side of the vertical plate 254.

*Start time type bar*

The tie rod 290 extends upwardly, Fig. 17, and has its upper end fixed rigidly to the rear end of the start time type bar 201—9, it being noted that an intermediate portion of the tie rod 290 is slidably supported on another horizontal guide rod 291—A, also mounted in brackets 292—A on the left side of the vertical plate 254. At its forward end the relatively long start time type bar 201—9 has a downwardly extended arm 294 which rides slidably on a similar guide rod 291—B supported by brackets 292—B mounted on the left side of the vertical plate 254. The start time type bars 201—9 have a longitudinal slot 298 formed therein and the rigid cross bar 270 extends through this slot 298 at the printing position. A relatively long spring 300 extends forwardly from the tie rod 290 to an anchoring cross bar 301 so as to constantly urge the start time control bar 70 in a forward direction.

*Start time set-up bar*

The start time set-up bar 60 is supported in the proper relation, Fig. 17, to the start time slot 55—S by a cross bar 281—A which extends transversely through a longitudinal slot 287—A in the start time set-up bar, and a downwardly projecting arm 294—A at the rear end of the start time set-up bar 60 is slidably supported on a horizontal guide rod 291—C that is mounted in brackets 292—C on the left side of the vertical plate 254. A spring 300—A extended forwardly from the arm 294—A is connected to an anchoring bar 301—A so as to urge the start time set-up bar 60 forwardly against the time controlled rearward actuating movements imparted thereto by the shaft 61, Figs. 17, 23 and 26, it being noted that the start time set-up bar 60 has a rack 60—R formed along its upper edge which is engaged with a pinion 61—P fixed on the time controlled shaft 61.

*Finish time type bars*

The finish time type bars 201—10 are mounted just to the right of the frame plate 254, Figs. 21, 23, 26 and 27, by an arrangement of guide rods and arms similar to the guide rods 291 and arms 294, indicated by numbers with the suffix "D," the rods and arms being supported on rigid brackets 292—D secured on the right side of the plate 254. Along the right side of the type bars 201—10 a rack 310, Figs. 23 and 26, is fixed so that the rack 310 and the two type bars 201—10 move as a unit. The rack 310 faces downwardly and is meshed with a pinion 311 which is carried by a stub shaft 312 supported firmly from the plate 254, and since the pinion 311 is disposed substantially beneath the printing line PL—2, the pinion 311 acts to afford an adequate reaction for the platen P and makes the provision of a support bar such as the bar 270 unnecessary at this point. The pinion 311 meshes with an idler pinion 313 on stub shaft 314 which in turn meshes with pinion 61—B on the time controlled shaft 61, and hence the finish time type bars 201—10 are advanced forwardly in the operation of the machine in synchronism with the rearward movements of the start time set-up bar 60.

*Extension type bars*

As hereinbefore pointed out, and as will be described in detail hereinafter, the drum D, Fig. 23, is advanced in a forward direction in timed relation to the forward movement of the finish time type bars 201—10, and the several sets 209 of elapsed time and extension type bars 201—11 to 201—13 are adapted to be brought into position adjacent to the printing position 200 by rotative setting of the drum D. The selected set 209 is then shifted laterally, and radially of the drum D, into position beneath the platen P, Fig. 26, and when so positioned the type bars 201—11 to 201—13 may be shifted rearwardly on a carrier or frame 209—C, Figs. 23 and 27, to a position wherein the elapsed time and the related extension amounts are set up at the printing line PL—2. Thus each frame 209—C comprises an inner bar 209—M and a parallel outer bar 209—N connected at their forward ends by a forward cross bar 209—F, and at their rear ends by a cross bar 209—R, Fig. 23, of a U-shaped form to afford clearance for data representing shanks that extend downwardly from the type elements 201—11 to 201—13 as will hereinafter appear.

The bars 209—M and 209—N afford slideways along which the set 209 of type bar elements 201—11 to 201—13 may be shifted in a rearward direction, and to cooperate with these guideways the set 209 has a rectangular locking frame 209—L secured about the several type bars 201—11 to 201—13, so that the side members of the frame 209—L ride on the respective bars 209—M and 209—N.

Each set 209 is normally positioned in its most forward position on the slideways 209—M and 209—N, and in a computing operation is first moved rearwardly along the slideways of the carrier and is then returned in a forward direction to such normal position as will hereinafter be described. Thus, since the drum D is advanced forwardly at a timed rate, it will be clear that when the type set 209 is in its normal position on its carrier, the type characters 202 on the type bars 201—11 at the printing line PL—2 will correspond to the instant time. Hence after the set 209 has been so located at the printing position, the type bars thereof are shifted rearwardly from the present time position a distance equal to the difference between the zero time position and the start time position and therefore in an amount equal to the start time, thereby to set the type bars 201—11 in a position representing elapsed time, Figs. 16, 23 and 27. This rearward shifting movement of such type bars 201—11 thus constitutes what may be termed a computing operation, or more precisely, a subtracting operation.

*Elapsed time computing means*

This is accomplished by effecting an operating connection between the start time control bar 70 and the set 209 of type bars at the printing station 200, so that when the start time control bar 70 is shifted rearwardly by a start time block 64 of the slide S in the finish time slot 55—F, the subtracting operation will be performed. Thus as shown in Fig. 23, the tie rod 290 has a lateral extension arm 290—A extended beneath the type bars 201—10, and then upwardly on the opposite side of the type bars 201—10 to support a rigid bracket 320. This bracket has a vertical latching or connecting bar 321 fixed on its forward end, and a roller 322 on the lower end of the bar 321 rides on, and is supported on, a rigid horizontal guide or supporting plate 325. Along the adjacent or left hand side of the locking frame 209—L, a plurality of spaced narrow teeth 327 are provided, the spacing being such as to provide one space for each incremental time position that may be assumed by the drum D. When a type set 209 is shifted laterally out of the drum D, these teeth move toward the upper end portion of the connecting bar 321, and the adjacent edge of the upper portion of the bar 321 is shaped to a point which will assure movement of an adjacent pair of teeth 327 into position on opposite front and rear faces of the bar 321. The left hand portion of the bar 321 is however of such a width as to entirely fill the space between two such teeth, and hence an accurate inter-relation of the bar 321 with the teeth 327 is assured. Thus when the start time control bar 70 moves rearwardly, an accurate subtracting action will be obtained, and the forward or return movement of the start time control bar 70 will act to fully return the type set 209 to its normal position on its carrier 209—C. Thus the type bar set 209 is locked to the start time control bar 70 in such a relation that as the start time block 64 of the slide S in slot 55—F, Fig. 17, moves the start time control bar 70 rearwardly, the control bar 70, Fig. 23, not only sets up the start time type bars 201—9 to the stored start time, but also subtracts such start time from the present time, as indicated by the drum D position, so as to thereby set the selected set of elapsed time type bars 201—11 to print the elasped time. In this same operation the related earnings amount 201—12 and burden amount 201—13 are set up, so that upon completion of the insertion of the slide S in the finish time slot 55—F, the type elements 201—1 to 201—13 are completely set up so that by operation of the platen P, as will be hereinafter described, the complete record C—1 may be produced.

When a type set 209 is shifted radially into position beneath the platen P, the outer guide rail 209—N of the carrier 209—C is shifted into position over a supporting roller 326—1 that is mounted immediately beneath the printing line PL—2 on the stationary shaft 312 that extends between the frame plates 254 and 256, Fig. 26. This assures adequate support for the overhanging or free edge of the carrier at the printing line.

It will be recognized that when the set 209 of type bars is shifted rearwardly on the carrier in the course of a computing operation, the rear end portion of the set 209 will assume an overhanging relation at its rear end, and as shown in Figs. 17 and 18A, means are afforded for supporting the rear end of the set under such circumstances. Thus a pair of rollers 326—2 are mounted on opposite ends of a horizontal shaft 328 in position to engage the lower faces of the side members of the locking frame 209—L, and this shaft 328 is supported in an upwardly projecting mounting fork 328—F, Fig. 18A. The fork 328—F is mounted by means of guide pins 328—G in horizontal guide slots 329—G formed in a frame plate 329—P so that the rollers 326—2 may be shifted from rear to front along the frame plate as required by the time controlled movements of the drum D. The frame plate 329—P is disposed substantially midway between the planes of the frame plates 254 and 256, but to the rear of such plates 254 and 256. The arrangement is such that the rollers 326—2 are at all times maintained in position for supporting cooperation with the rearwardly projected end portion of a set 209 of type members when such support is needed. The means for effecting such positioning of the rollers 326—2 will be described hereinafter in connection with the description of the movements of the drum D.

*The drum D*

The drum D, Figs. 16 and 23 to 27, as embodied in the present machine, makes provision for computing the earnings amount 75—12 and the burden amount 75—13 at sixteen different regular pay rates and at sixteen different overtime rates that are based on the represented regular pay rates, and hence thirty-two sets 209 of extension type bars 201—11 to 201—13 are mounted about the periphery of the drum D so that they may be brought selectively into the desired operative relation at printing station 200. It is contemplated that during the regular working day the sets 209 allocated to overtime rates will not be used, and that during the overtime hours of the day, the regular rate sets 209 will not be used, and as will be described presently, means are afforded for confining or regulating the use of the regular and overtime sets 209 in accordance with such plan.

The regular rate sets 209 are therefore arranged in an arcuate row about one-half of the periphery of the drum D, Fig. 26, while the overtime sets 209 are similarly disposed about the other side of the drum D, and the same general order of arrangement is followed in the two groups. Between the two groups it is desirable to afford spaces so as to facilitate control of the drum D, and hence the periphery of the drum D is in the present instance divided into thirty-four spaces, so that the sixteen regular sets 209 may be disposed in one group, with one such space at each end of the group, to space the same from the group of overtime sets 209 that are disposed in the other sixteen of such spaces.

Regular and overtime setting means

As hereinbefore pointed out, the rotative adjustment or setting of the drum D is controlled or limited so that during the regular working day, only the type sets 209 relating to regular pay rates may be brought into printing position, and conversely, during the overtime periods, only the overtime type sets 209 may be brought to the printing position 208. For this purpose a pair of stop plungers 330, Figs. 16 and 25, are mounted at corresponding points at opposite ends of the drum D, and these plungers 330 have pin and slot mountings and are urged to projecting positions by springs 331. When the plungers 330 are in their effective positions they are arranged to strike upper and lower stop bars 333—U and 333—L that are stationarily mounted parallel to the drum axis and in a vertical plane passing through the drum D axis. When the plungers 330 are on the left side of the upper stop bar 333—U, Fig. 25, the drum D is confined to adjustment through one-half of its full rotative range, while by locating the plungers 330 on the other or right side of the upper stop bar 333—U, the drum D is confined to adjustment through the other half of its range. The requisite setting of the plungers 330 on one side or the other of the bar 333—U to set the machine for regular or overtime computation and recording may be easily effected by the timekeeper by opening an access door 50—D, Fig. 1, that is afforded in the top of the casing 50 over the drum D.

The type carrier or drum D

As shown in Figs. 16 and 23 to 27, there is a longitudinal extended slot 350 formed so as to extend radially into the drum D at each such space in which an extension type bar set 209 is to be mounted, and such slot 350 is of such a size that a set 209 of type may be moved radially of the drum D into such slot, and three supporting arms 351, Fig. 27, attached to type bar carrier or frame 209—C, are provided so as to extend from the bar 209—M of each set. These arms 351 are slidably guided in radial guide slots 352 formed in the drum D so as to open into each such slot 350, and springs 353 within the guide slots 352 act on the arms 351 to normally draw the set 209 into its housed or protected relation within the related slot 350.

The shaft 58 is rotatably supported at its front and rear ends by bearings 355 carried in front and rear vertical frame plates 356—F and 356—R, and forwardly of the frame plate 356—F, the shaft extends through the front wall 50—F of the casing 50. Within the casing 50 the drum D is splined onto the shaft 58 by splines 58—S so that the drum D may be rotatively set to the desired position by the hand wheel 53, Figs. 1 and 27, and yet may be advanced forwardly along the shaft 58 at a definite time rate. Such axial advancing movement is attained by an operating cage 360, Figs. 16, 23, 25 and 27, which includes front and rear end plates 360—F and 360—R suspended on the shaft 58 by bearings 361 just in front and just to the rear of the drum D so that the plates may move longitudinally on the shaft but are not subject to rotation with such shaft. The plates 360—F and 360—R are connected by four tie bars 362—A, 362—B, 362—C and 362—D, Figs. 16, 23 and 25, that extend along the sides of the drum D between extending connecting ears 365 and 366 that are afforded on the plates 360—F and 360—R. The ears 366 are also arranged to slidably embrace a pair of stationary guide rods 367, Figs. 23 and 25, that extend between the frame plates 356—F and 356—R parallel to the axis of the shaft 58. These rods 367 thus hold the cage 360 against rotative displacement relative to the axis of the drum shaft 58.

The cage 360 has thrust bearings 369, Fig. 27, acting between its plates 360—F and 360—R and the front and rear ends of the drum D, so that by moving the cage 360, the drum D may be similarly shifted axially along the shaft 58. This shifting movement is derived from the time controlled shaft 61, Fig. 23 and 26, which has a pinion 61—D fixed thereon and meshed at its upper edge with a downwardly facing rack 364 formed along the lower edge of the tie rod 362—C of the cage 360.

As the drum D is moved rearwardly in the course of a zeroizing or initial setting operation, one of the ears 366 on the rear frame plate 360—R of the cage 360 engages a projecting arm 372 that is formed on the lower end of the shiftable fork 328—F so as to shift the fork 328—F and the rollers 326—2 to a rearward position. When the timed forward advancing movement of the drum D is started, a pair of springs 373 acting on the fork 328—F serve to urge the fork 328—F forwardly as the forward movement of the drum D progresses, and such movement of the fork 328—F continues to the limit defined by the forward end of the upper slot 329—G, Fig. 17. This most forward position of the supporting rollers 326—2 enables these rollers to support the rear end of the type set 209 in all instances where the elapsed time and earnings computations would cause excessive rearward displacement of the type bars relative to their mounting carrier.

Rate verification means

As hereinbefore pointed out the storage slide S is arranged to have extending rate-indicating ridges or ribs K—1 afforded thereon by the key K, Figs. 12 and 13, thereby to afford means for cooperation with a part of the machine to assure setting of the drum D to the proper rate. Such ridges or ribs K—1 are adapted for cooperation with sets of complemental grooves K—2 formed longitudinally about the periphery of an interlocking drum D—2, Figs. 14, 16, 24 and 27. This interlocking drum D—2 is supported within the casing 50 at the left hand side of the finish time slot 55—F, the requisite support being afforded by a shaft 380, Fig. 27. The drum D—2 has a bevel gear 381, Figs. 16 and 24, fixed at its forward end and engaged by a bevel gear 382 fixed on one end of a drive shaft 383. A bevel gear 384 on the other end of the drive shaft 383 meshes with a bevel gear 385 on the shaft 58, and the arrangement is such that the drum D—2 is rotated on a one-to-one relation with the main drum D. The arrangement of the grooves K—2 on the drum D—2 is such that when a particular pay rate is selected by rotation of the drum D, a set of grooves K—2 on the drum D—2 corresponding with and mechanically representative of this same pay rate will be put into position at the left hand side of the finish time slot 55—F. Hence, unless the drum D has been positioned to correspond with the pay rate represented by the ribs K—1 of the man's key K of the slide S that is to be inserted in the "Out" or finish time slot 55—F, it will be impossible to insert the slide S, Figs. 14, 16 and 24. This insures computation and recording of the money amounts at the correct rate. To aid in attaining accurate setting of the drum D, a spring detent plunger 386, Fig. 24, is provided on the inner face of the front wall 50—F for engagement with positioning recesses afforded at annularly spaced points in the face of a disk 387 secured on the shaft 58. The disk 387 has sets of figures 388 on its forward face corresponding to the various pay rates, and the figure 388 corresponding to the rate of the type set 209 at printing position is visible through a window 389, Fig. 1, in the front wall 50—F, thereby to facilitate setting of the drum D.

Extension type bars positioning means

After the drum D is set to any selected rotative position, it is necessary to project the selected type set 209 radially of the drum D and into printing position, and this is effected by means carried on the cage 360 and operable by the handle H. Thus, as will be evident in Figs. 16, 25 and 27, each carrier or frame 209—C has a pin 390—F extended forwardly from the forward supporting arm 351 and through a radial slot 391—F formed in the forward end of the drum D. A similar pin 390—R extends through a similar radial slot 391—R from the rear supporting arm, so that these two pins may be engaged to force the carrier or frame 209—C into printing position. When a particular type set 209 is in a position opposite printing station 200, the pins 390—F and 390—R thereof are disposed to the left of ears 394 formed at the left ends of horizontally shiftable actuating slides 395—F and 395—R. These slides are mounted by pin and slot supports on the rear face of the plate 360—F and the front face of the plate 360—R, and the slides 395—F and 395—R have cam rollers 396 at their right hand ends by means of which the slides may be moved to the left. For this purpose a relatively large bail 398 having a front arm 398—F, a rear arm 398—R and a lower cross bar 398—B, is provided.

The lower cross bar 398—B is extended beneath the drum D, while the arms 398—F and 398—R are extended upwardly along opposite ends of the drum D and to the left of the shaft 58. Intermediate their ends, the arms 398—F and 398—R are pivoted, as at 399, to the front and rear plates 360—F and 360—R, and the arrangement is such that the side edges of the upper portions of the arms 398—F and 398—R are engaged by the rollers 396. Hence by imparting counterclockwise movement to the bail 398, the slides 395—F and 395—R may be actuated so as to project the selected type set 209 into printing position. To impart such rocking movement to the bail 398, the handle H, Figs. 1 and 24, is fixed on a horizontal rock shaft 400 and on this rock shaft a cam 401, Figs. 25 and 26, is splined for rotation with the shaft 400 while permitting longitudinal movement along the shaft. This cam 401 engages a cam roller 402 mounted in a bracket 403 fixed on the cross bar 398—B at the midpoint thereof. The bracket 403 has arms 403—A extended onto opposite sides of the cam 401 so as to move the cam 401 axially along the rock shaft 400 as the drum cage 360 moves along the shaft 58. This assures balanced actuation of the bail 398 in any axial position of the drum D.

When the handle H is turned 90° clockwise from its normal vertical position to the horizontal position of Fig. 24, the cam 401 imparts the desired counterclockwise rotation to the bail 398, while the rock shaft 400 is urged in a return direction by a spring 404, Fig. 25, which gives counterclockwise bias to the arm 404—A fixed to the shaft 400 adjacent to rear end of the shaft, and a latch lever 405 is effective to latch the shaft 400 in its actuated position, as shown in Fig. 24. Thus the lever 405 is centrally pivoted at 406, and a spring 407 acting on the right hand end thereof urges a latch tooth 405—L of the lever upwardly to engage a tooth 408 that is provided on a cam 410 secured to the shaft 400 just rearwardly of the front wall 50—F.

Finish time slot blocking means

The cam 410, Fig. 24, is utilized to operate a safety interlock which prevents insertion of the slide S into the finish time slot 55—F until the handle H has been operated to project the selected type set 209 into printing position. Thus a blocking plate 415 is pivoted at 416 on the inner face of the front wall 50—F and just to the right of the finish time slot 55—F, and a spring 417 acts to urge the blocking plate 415 counterclockwise into a blocking position across the finish time slot 55—F, thus to block insertion of a slide S into this slot. When the handle H is operated to its latched position, the cam 410 acts on cam roller 418 that is fixed on one end of a lever 419. This lever is centrally pivoted at 420 and is urged by a spring 421 so that the roller 418 is held against the top of the cam 410. A link 422 connects the other or left end, Fig. 24, of the lever 419 to the blocking plate 415 so that when the lever 419 is rocked counterclockwise, the blocking plate will be rocked clockwise to its ineffective position. As will hereinafter be described, the latch lever 405 is released at the end of the withdrawing movement of the slide S, and since the blocking plate 415 might in such an instance strike a rear portion of the slide S, a roller 415—R is preferably provided on the blocking plate 415 to engage the slide S under such circumstances while permitting completion of the slide withdrawing movement. Preferably the link 422 has pin and slot connections at its ends to simplify the operation of the parts.

The punching mechanism 500

In order that the punched record C—2 may be produced concurrently with the printed record C—1, the punching mechanism 500 is also set up under joint control of the storage slide S and the time controlled mechanism of the machine R. This is accomplished in the present instance by affording data-representing abutments in association with the various type elements 201—1 to 201—13 so that the sensing means of the punching mechanism 500 may sense such abutments after set-up of the type elements 201 to effect a corresponding set-up of the punching mechanism.

The punching mechanism 500 as herein shown is in all major respects the same as the punching means that is illustrated in the Thomas J. Watson Patent No. 2,312,137, patented February 23, 1943, and reference may be had to such prior patent for details of structure and operation not specifically illustrated or described herein. In general it may be said that the punching mechanism 500 herein differs primarily from the aforesaid Watson disclosure in the specific form of the data sensing fingers identified as 122 in such Watson patent, in the relative location of the set-up abutments designated as 95 by Watson, in the remote location of the one revolution clutch means for driving the main cam shaft of the punching means, in the specific timing, and in the elimination of the time actuated control wheels and the re-set means for such wheels. Specifically, in Figs. 16, 18 and 27, it will be observed that the punching mechanism 500 is located within the machine housing to the rear and somewhat to the left of the printing station 200 so as to dispose the data sensing elements 522 thereof adjacent to the printing line PL—2 and these elements 522 are arranged for cooperation with downwardly facing data representing shoulders 501, Fig. 22, that are provided on the respective printing elements 201. The arrangement is such that each abutment or shoulder 501 that faces down at the printing line PL—2 is, by its vertical position, representative of the numerical value or other setting of the type element 201 with which such shoulder 501 is associated.

The punching mechanism 500 is operated by a main cam shaft 548, Fig. 28, and the mechanism has a plurality of horizontally shiftable punch setting slides 525, Figs. 16 and 18, allocated to the several orders or card columns. These slides 525 have a slot 526 therein through which the card receiver 51—2 extends. Each slide 525, Fig. 18, serves as a punch carrier or guide for a punch 545 that is carried slidably on a punch operating bar 546, and in the longitudinal setting movement of the related slide 525, the punch 545 is set to the desired index position. The slides 525 are restored to normal position by means including individual restoring arms 536, that are associated with a restoring rocker 534, and as disclosed in said Watson patent, spring means 537 act between the rocker 534 and the individual arms 536 so that upon clockwise displacement of the rocker 534, the arms 536 individually urge the slides 525 to the right for differential setting of the punches 545. The movements of the rocker 534 are controlled by means including a cam 530 on the cam shaft 548. This setting movement of the slides 525 is controlled by sensing arms 522 which are pivoted intermediate their ends on a horizontal supporting shaft 523, and the left hand ends of these arms 522 may thus be set at different levels so as to be selectively aligned with step-like abutment shoulders 525—A formed on the individual slides 525 so as to face to the right as viewed in Fig. 18. A restoring bail 521 is mounted on the shaft 523 and is arranged for actuation by means including a cam 520 fixed on the main cam shaft 548 to restore the sensing fingers 522 to their inactive positions after the punches 545 and the slides 525 have been restored, and in a sensing operation the bail 521 rocks clockwise from the position shown in Fig. 18. In such movement, individual springs 524 acting between the bail and the respective sensing fingers 522, move the sensing fingers 522 counterclockwise so as to engage the upwardly extended sensing noses 522—N, upwardly into engagement with the aligned data or digit representing abutments 501. This sets the left hand ends of the levers 522 at differential levels to control the horizontal setting movement of the slides 525, and as shown in the timing diagram of Fig. 32, this setting movement is then started. After the punches have been set, a punch operating means including a cam 550, fixed on the main cam shaft 548, a lever 551, a bail 552, operating links 553 and 554 and arms 555 and 556, are effective as described in said Watson patent to actuate and strip the punches 545. The punches are then retracted, the slides 525 are restored, and the sensing fingers 522 are restored, in the sequence and at the times indicated in the timing diagram of Fig. 32, it being noted that the timing is somewhat different than in the aforesaid Watson patent since in the present arrangement the time operated printing wheels of the Watson arrangement are not needed and the cycle therefore does not need to allow for an extended re-set period for such means.

The abutment shoulders 501 take different forms on the different type elements 201, and in association with the respective type wheels 201—1 and 201—2, these shoulders are afforded by stepped disks 501—1 and 501—2 that are fixed on the left hand sides of the respective type wheels, as shown in Figs. 16, 21 and 22. As to the type bars 201—3 to 201—13, the abutments 501 are afforded by downwardly extended shanks or formed portions carried on the individual type bars and disposed beneath each type character space 202. Thus as shown in Figs. 18, 22 and 26, each descriptive type bar 201—3 to 201—8 has a series of abutments 501 disposed at ten different but equally spaced levels, the highest level being represntative of zero and the lowest level being representative of 9. The most left hand space on this bar 201 is a blank space, and beneath this space the abutment 501 is disposed at the zero level so as to assure filling of the various card fields with preceding zeros in every instance. Beneath the zero position or space, and beneath the various digital type character spaces the abutments 501 are disposed at the levels corresponding to the digital value of the respective type characters 202.

On the start time type bars 201—9 the range of movement is of course sufficient to cover the entire working day, and as shown in Figs. 17 and 22 with respect to the tenths of an hour type bar, or right hand bar, the abutments 501 are arranged in nine sets each, stepped from left to right, from the zero level to the nine level, and one of zero level only, and in respect to the units or left hand type bar of this group, nine relatively long abutments are provided which are each of a length equal to the length of one shoulder of such sets. These long abutments, from left to right in Fig. 17, are disposed in turn at the zero level and then at the different levels from 1 to 8. Also, one short abutment representative of the 9 digit is provided. Here again the values represented by the respective abutments correspond with the digital values of the type characters 202 in the spaces immediately above such abutments.

This arrangement or plan, in which the digital value of each type face is represented by a shank 501 disposed immediately below such type and at a height or level representative of this same digit, is used of course on the other type bars 201—10 to 201—13, so that through the entire set of printing elements, whether they are in the form of short or long type bars, or in the form of type wheels, the digital value of any type character 202 at the printing line PL—2 may be determined by sensing the level of the abutment 501 that faces downwardly immediately beneath each type character 202 at the printing line.

It should be observed that the total card field that is employed in the card C—2 is considerably narrower than the total line length along the printing line PL of the printed card C—1, and hence the sensing levers 522 to the right of their pivot shaft 523 are fanned, as shown in Fig. 27, at constantly increasing angles with respect to the axis of the shaft, thereby to dispose the respective sensing noses 522—N beneath and in a position for sensing cooperation with the abutments 501 of the related type elements 201.

*The main machine drive*

In the present machine, the printing and punching means are rendered operative after the storage slide S has been inserted into its rearmost or home position in the finish time slot 55—F, and this is done by drive means that include a main drive shaft 600 that extends from front to rear in the machine near the left side wall 50—S and just to the left of the frame plate 250. The shaft 600 is supported at spaced points, as shown in Fig. 28 by bearing columns 601 extended upwardly from the bottom wall 50—B of the housing 50, and near its rear end a driving sleeve 602 is mounted on the shaft 600 for free rotation thereon. A main drive motor 603, Fig. 29, has a worm and worm wheel connection 604 with the sleeve 602 so as to constantly rotate the drive sleeve 602, Figs. 28 and 29, at a speed such that the sleeve will complete a full revolution in a relatively short period, such for example as about six seconds or less. At the rear end of the sleeve 602, Fig. 28, a one-revolution clutch 605 is afforded whereby the sleeve 602 may be connected to the shaft 600 to drive the shaft 600 for a single revolution.

*One cycle control*

The clutch 605, as shown in Fig. 28, is of the construction illustrated in the aforesaid Watson patent, and it includes a quick-pickup driving ratchet wheel 606 fixed on the sleeve 602, and a driven disk 607 fixed on the shaft 600 immediately adjacent the rear side of the ratchet wheel 606. A clutch dog 608 pivoted on the disk 607 has a spring 609 acting thereon to urge the toothed leading end of the dog 608 into clutching engagement with the teeth of the ratchet wheel 606. The other or trailing end of the dog 608 has a shoulder 608—S thereon which in rotative movement of the driven clutch element or disk 607 is adapted to engage a pivoted stop lever 612 to cause disengagement of the clutch dog. The stop lever 612 is urged to effective position by a spring 613. A release rocker 615 fixed on one end of a rock shaft 616 has a three-armed latch 618 pivoted thereto, and one arm 618—A thereof has a hooked engagement with the stop lever 612 whereby upon rocking movement of the release rocker 615, the stop lever 612 may be withdrawn, to thereby allow the clutch to engage. A spring 619 acting on the arm 618—C urges the latch 618 toward an engaged relation, and means are afforded for releasing the latch 618 from the stop lever 612 promptly after engagement of the clutch to thereby condition the stop lever for terminating the cycle of clutch engagement.

Thus the latch 618 has its third arm 618—B arranged to strike a stationary pin 622 as soon as the clutch dog 608 has been engaged, and this disengages the hooked arm 618-A from the stop lever 612 so that the stop lever 612 returns at once to its effective position to thereby be conditioned to disengage the clutch dog 608 at the end of the one cycle operation thereof. A conventional positioning lever 624 is associated with the driven disk 607 to prevent overthrow of the driven member. Upon return or counterclockwise movement of the release rocker 615, the latch 618 is re-engaged with the stop lever 612 so as to be conditioned for the next operation.

*Platen operation*

The drive shaft 600 has driving connections extended therefrom for driving the various machine elements through a machine cycle in timed relation in each one revolution cycle of the shaft 600. Thus, for driving the stamper platen P, a cam shaft 625, disposed above and transversely with respect to the shaft 600, is driven from the shaft 600 in a one-to-one relation by meshed helical gears 626 and 627 fixed respectively on the shafts 600 and 625. This shaft 625 has a single lobe, sharp drop cam 628 fixed thereon, and a transmitting lever 630 pivoted intermediate its ends on a horizontal pivot 631, has a roller 632 on its lower end engaging the cam 628, a spring 633 acting on the lever 630 to maintain such engagement. At its upper end the lever 630 has a pin and slot connection with a horizontal slide 635 which is in turn guided by pin and slot supports 636. On the slide 635 a driving pawl 637 is pivoted at 638, and a spring 639 urges the pawl 637 to an effective downwardly projecting position determined by a stationary stop pin 640 on the slide 635. The pawl 637 is arranged to operate a platen actuating rocker 642 that is pivoted on the same shaft 206 upon which supporting arms 641 of the platen P are mounted. The rocker 642 is urged counterclockwise by a spring 643 to a normal position determined by a stop pin 644, and in this position an upwardly extended tooth 645 on the rocker lies forwardly and in the path of the pawl 637 so that in forward movement of the slide 635, the pawl 637 will rock the rocker clockwise against the force of the spring 643 and as the pawl 637 moves over the top of the tooth 645, the rocker will be released for rapid return movement to its normal position by its spring 643. This rapid return movement is utilized to drive the platen P, and to enable this to be done, a light spring 646 acting downwardly on a forward extension of a lever 647 fixed on the platen-supporting shaft 206, rocks the platen structure in a clockwise or return direction. This acts to urge the rearwardly projecting end of the lever 647 into contact with an eccentrically disposed pin 649 on the rocker 642, and the relation is such that with the parts in their normal positions the platen P is slightly elevated. As the lobe on the cam 628 causes the slide 635 to move forwardly, the pawl 637 will tension, and then release the spring-biased rocker 642. The platen P will retract with the tensioning movement of the rocker, and will then be driven with a hammer blow to effect the desired impression. The platen P then returns to its normal, raised position, and as the roller 632 drops off the cam lobe 628, the pawl 637 will ride back over the rounded adjacent edge of the tooth 645 so as to be conditioned for the next operation.

*Punching operation*

The punching mechanism 500 is also operated through a cycle when the main drive shaft 600 is rotated through its one revolution cycle. This is accomplished by helical gears 650 acting to drive a horizontal stub shaft 651, on which is fixed a gear 652 which meshes with a gear 653 on the main cam shaft 548 of the punching mechanism. This gearing is arranged to drive the cam shaft 548 in the proper direction and in a one-to-one relation with respect to the main shaft 600.

The main drive shaft 600 is also arranged, at substantially the end of its cycle, to release latching elements that are associated with various components that enter into proper operation of the machine.

Release of slide S

Figure 32:
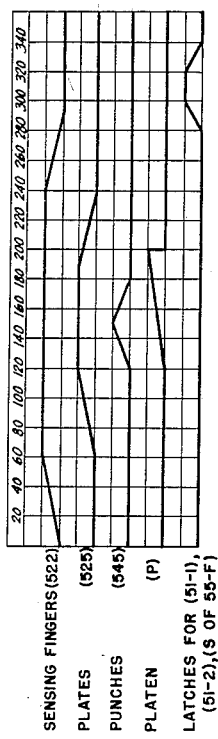
Fig. 32 is a time chart indicating the timing of various elements of the machine.

Thus a latch means which serves to hold the storage slide S in the "Out" or finish time slot 55—F, is released at the time indicated in Fig. 32, and as shown in Fig. 28, this latch means is in the form of a latch lever 662 centrally pivoted on a horizontal pivot shaft 663. The upper end portion of the lever 662 is adapted to be cammed to the left by the left rear edge of the slide S in the finish time slot 55—F as the slide S approaches its home or fully inserted relation, and as the home position is reached, a spring 664 acting on the lever moves the upper side edge portion of the lever into the locking slot 661 in the left side wall of the slide S. The latch lever 662 has a release link 665 pivoted to its lower end, and this link extends to the left and has a longitudinal slot 666 in its left end portion which slidably embraces the shaft 600. On the shaft 600 adjacent the link 665, a cam 667 is fixed and a roller 668 on the link 665 engages the cam 667. This cam has a dwell surface throughout most of its periphery and a lobe 667—L thereon is arranged to actuate the link 665 and release the latch lever 662 momentarily at the time indicated in Fig. 32. During such short release period, springs 282 and 300, Figs. 17 and 18, of the descriptive control bars 280—3 to 280—8 and the start time control bar 70, respectively, are effective to shift the slide S in a forward direction in the finish time slot 55—F, so as to prevent re-latching of the latch lever 662 with the locking slot 661 of the slide S.

Card receiver release

The two card receivers 51—1 and 51—2 are individually spring biased in an outward direction by springs 670 and 671 respectively that are shown diagrammatically in Fig. 28, and each such card receiver has a vertically movable latch means. Thus vertical latch slides 673—1 and 673—2, Fig. 28, are mounted on pin and slot mountings adjacent the rear edges of the respective card receivers 51—1 and 51—2. These slides have overhanging latch teeth 674—1 and 674—2 thereon which when moved downwardly are arranged to engage latch slots in the adjacent rear rails of the respective receivers. The slides 673—1 and 673—2 are urged downwardly by springs 675—1 and 675—2, and the teeth of these slides normally ride on the upper faces of the rear rails of the receivers. When the receivers are in their fully inserted positions, the latches become engaged with the slots, and the receivers are held in fixed positions.

Similar releasing means are provided for the two slides 673—1 and 673—2. Thus releasing links 676—1 and 676—2 are pivoted to the lower ends of the respective slides 673—1 and 673—2, and guide slots 679—1 and 679—2 in the lower ends of these links 676—1 and 676—2 embrace the main shaft 600. Cams 677—1 and 677—2 on the shaft 600 are engaged on their upper edges by cam rollers 678—1 and 678—2 on the links 676—1 and 676—2, and single lobes 677—1—L and 677—2—L on the respective cams 677—1 and 677—2 are arranged to release the latches 673—1 and 673—2 at the time indicated in Fig. 32. The card receivers 51—1 and 51—2 are thus released and are spring biased to extended or outward positions at the end of the machine cycle.

Initiation of one-cycle drive

The initiation of a machine cycle is in the present machine rendered dependent upon the prior conditioning of all of the component parts of the machine. Thus it will be recalled that a storage slide S can not be inserted into the finish time slit 55—F until the selected type set 209 has been moved into printing position, for until this is done, the finish time slot 55—F is blocked by the plate 415. Moreover, the slide S can not be inserted, even then, unless the proper type set 209 has been selected, for unless this selection is correct, the key ribs K—1 of the key K in the slide S being inserted into the finish time slot 55—F will not match the key slots K—2 of the drum D—2. Further conditioning interlocks are also afforded to assure proper loading of the card receivers 51—1 and 51—2, as well as full insertion of the slide S in the finish time slot 55—F, and until all these conditions are satisfied, the record producing cycle of the machine can not be initiated.

Thus an interlocking bar 680, Figs. 23 and 28, is mounted beneath the two card receivers 51—1 and 51—2 and is urged in a forward direction by a spring 681 toward the path of the slide S in the finish time slot 55—F to a normal forward position determined by engagement of a lug 680—L on the bar 680 with a stationary lug 682. When the bar 680 is in this normal position, a pair of vertically movable latch slides 683—1 and 683—2 are normally effective by virtue of springs 684—1 and 684—2 to latch the bar 680 against rearward movement. The latch slide 683—1 is disposed beneath the rear edge of the card receiver 51—1 and a laterally extended tooth 685—1 on the lower end of the slide 683—1 is adapted to engage a notch 686—1 formed in the lower edge of the bar 680, this notch being aligned with the tooth 685—1 when the bar 680 is in its normal position. At its upper end the slide 683—1 is pivoted to the right hand end of a card lever 688—1, the other end of which is stationarily pivoted, and this card lever 688—1 is arranged at such a slope that as a card C—1 in the card receiver 51—1 is moved into position, the leading edge of the card, adjacent the rear side edge of the receiver will engage the card lever 688—1 and thus release the latch 683—1. The latch 683—2 is similarly arranged with respect to the card receiver 51—2, and similar parts are designated by the same reference characters with the suffix "2."

When both latches 683—1 and 683—2 have been released by proper mounting of cards C—1 and C—2 in the machine, the bar 680 may be shifted rearwardly by the slide S in the finish time slot 55—F as the right rear end 138 of side wall 101—R of the slide S engages the forward end of the bar 680 in the terminal portion of the slide inserting movement. When this occurs, the rearward actuation of the bar 680 is effective to cause engagement of the one revolution clutch 605. Thus a cam roller 690 fixed on the bar 680 engages a lateral cam surface 691 on a lever 692. The lever 692 is pivoted at one end on a fixed pivot 692—P, while at its other or rear end, the lever is pivoted by a pin and slot connection 692—S to a horizontal slide 693. The slide 693 is supported on guide pins 693—P, and is urged to the left by a spring 694. At its left end, the slide 693 is connected by a pin and slot connection 695 to the upper end of a lever 696 which is fixed at its lower end to the release rocker 615 of the clutch 605. Thus when the slide 693 is moved to the right, the clutch 605 is caused to engage so as to drive the machine through its recording cycle in which the two complete records C—1 and C—2 are produced.

*Release of selected extension type bars set 209*

When a recording cycle of the machine has been completed, and as the slide S is finally withdrawn from the finish time slot 55—F, means are effective to release the latch lever 405 so that the set 209 of type that has been disposed at the printing position may return to its retracted position within the drum D. Thus, as shown in Figs. 23, 24 and 28, a transverse rock shaft 697 is mounted beneath and to one side of the slot 55—F and a cam-like arm 697—A is fixed thereon to normally project upwardly into the most forward portion of the slot 55—F and in the path of a slide S that is to be inserted. When a slide S is inserted, the arm 697—A is forced to a horizontal or rearwardly projecting position as shown in Fig. 23, and this correspondingly rocks the shaft 697. Another arm 697—B is fixed on the shaft 697 and this arm has a downwardly extended link 698 pivoted thereto. The lower end of the link 698 is slidably guided in a guide opening formed in the bottom wall 50—B of the housing, and a spring 698—S tending to pull the link 698 in an upward direction serves to urge the levers 697—A, 697—B and the shaft 697 toward a normal position determined by a stop washer 698—W on the link 698 beneath the bottom wall 50—B of the housing. On the link 698 above the bottom wall of the housing, an actuating plate or washer 698—P is fixed so that in an upward movement of the link 698 from the position shown in Fig. 24, the washer 698—P will engage a one-way pawl 699 mounted on the adjacent or left hand end of the latch lever 405. The one-way pawl 699 has its right hand end pivoted at 699—P on the lever 405, and a spring 699—S acts on the pawl to urge it in a clockwise direction to a normal position determined by a pin 699—A fixed on the lever 405. Thus when the slide S is withdrawn from the finish time slot 55—F, the rear end of the slide S will ride off of the arm 697—A thereby to allow the spring 698—S to draw the link 698 upwardly. In such movement the plate 698—P will engage the pawl 699 to thereby release the latch lever 405. This occurs after the withdrawal movement of the slide S has allowed the start time control bar 70 to return to its forward or normal position, thus to return the type set 209 to its normal forward position on its carrier 209—C, and hence when the shaft 400 is unlatched as aforesaid, the type set 209 may move through its return stroke and back into its retracted position within its mounting recess 350 in the drum D.

It should be observed that in the next machine cycle, the shaft 400 will be latched by the latch lever 405 prior to the insertion of the slide S into the finish time slot 55—F, but when the slide S is thus inserted, it will not be effective to release the latch lever 405 since the plate 698—P will pass freely by the one-way pawl 699.

*The time drive and related mechanism*

The time shaft 61 is driven in a step-by-step manner so as to be indexed through a predetermined angle every one-tenth of an hour, and the drive means for accomplishing this includes a program device for stopping the shaft 61 during rest or non-working periods, and it also includes an impulse suspension means so that an advancing impulse that would normally be effective during a recording operation is stored so as to become effective on the time shaft 61 only after completion of the recording operation. Thus as shown in Fig. 23, a synchronous motor 700 is effective through reduction gearing 701—A, 701—B and 701—C to drive a transverse cam shaft 705 at a constant speed of ten revolutions per hour. The cam shaft 705 has a quick-pickup one revolution clutch 706 thereon and this clutch has a driving member in the form of a ratchet wheel 706—A fixed to the shaft 705. The clutch 706 has a driven member in the form of a disk 706—B freely rotatable on the shaft 705, and a clutch dog 706—D fixed on the disk 706—B is normally urged to an effective position by a spring 706—E so as to engage the dog 706—D to a driven engagement with the ratchet wheel 706—A. The disk 706—B has a single lobe, sharp drop cam 707 fixed thereto and this cam is engaged by a roller on the lower end of a lever 708. This lever 708 is centrally pivoted at 709, and a spring 710 acting on the lever keeps the cam follower in engagement with the cam. At its upper end the lever 708 has a relatively long horizontal pawl 712 pivoted thereto so as to extend to the rear, or left, as viewed in Fig. 23. At its left or rear end, the pawl 712 has a tooth 712—T which engages the upper edge of a ratchet wheel 61—R fixed on the time shaft 61. A spring 712—S urges the pawl 712 into engagement with the ratchet wheel 61—R. In the course of rotation of the cam shaft 705, the cam 707 rocks the lever 708 counterclockwise, Fig. 23, and the tooth 712—T rides over the teeth of the ratchet wheel 61—R, which at this time is held against reverse movement by a detent 712—D, Fig. 33. When the follower 708 rides off of the sharp drop of the cam 707, the spring 710 draws the pawl 712 forwardly so as to advance the time shaft 61 through the desired angle. In the event that the pawl 712 is thus operated when a recording operation is taking place, means are effective as will now be described to suspend the shaft-actuating operation thereof, until the recording cycle has been completed.

*Time impulse suspension means*

As herein shown, such suspension means are rendered effective at the time when the selected type set 209 is projected into its operative position at the printing line. Thus, as shown in Fig. 25, an operating arm 720 is extended downwardly from and is fixed to the shaft 400 in the forward one-fourth of the length of this shaft, and a link 721 is extended to the left from the lower end of the arm 720 and through a clearance slot 722 in the frame plate 256. The other end of the link 721 is pivoted to the lower end of a lever 723, the upper end of which is supported in a freely rotatable relation on the forward end of a rock shaft 725 that is located horizontally just below and to the left of the pawl 712 as shown in Figs. 23 and 25. Another arm 726 is fixed on the shaft 725 adjacent to the lever 723, and a spring 727 acting between the arm 726 and the lever 723 urges the arm 726 in a clockwise direction with respect to the lever 723, such movement being limited in certain instances by a pin 728 on the arm 726. The relation of the arm 726 and the lever 723 thus constitutes a yielding lost-motion connection that is effective, when the shaft 400 is rocked to its latched position, to impart yielding rotative force to the rock shaft 725 in a clockwise direction. This yielding actuation of the shaft 725 is utilized by affording a detent arm 730 that is fixed to a rear portion of the shaft 725 so as to project in an upward direction from the shaft 725. Thus the upper end of the arm 730 is adapted to move toward the adjacent side of the pawl 712. A lug 712—L on the side of the pawl 712 is adapted to engage the rear side face of the detent arm 730 when the detent arm is in its effective position.

The detent arm 730 is of course urged to such effective position by a yielding force that is afforded by the yielding lost-motion 723—726 at the time when the shaft 400 is rocked to its latched position. Thus the setting of the shaft 400 at any time in the cycle of the cam shaft 705 will cause the detent arm 730 to be yieldingly urged to its effective position, and the rearward conditioning movement of the pawl 712 will merely be effective through the tapered rear surface of the lug 712—L to tilt the detent arm 730, but if and when the lug 712—L moves past the detent arm 730 and to the rear thereof, the detent arm 730 will then snap into position forwardly of the lug 712—L, and will prevent forward or actuating movement of the pawl 712 until the recording operation has been completed and the slide S has been removed from the finish time slot 55—F so as to unlatch the setting shaft 400. Thus shifting of the time shaft 61 and the related elements during a recording operation is avoided, and yet, the stored time impulse is applied after completion of the recording operation so as to preserve accuracy in the machine operation. When the rock shaft 400 returns in a counterclockwise direction to its normal position, the link 721 rocks the lever 723 in a counterclockwise direction, thus to release the spring tension on the detent arm 730, and when the lever 723 strikes the pin 728, the arm 726 is positively rocked so as to positively withdraw the detent arm 730 to its retracted position.

*Program device*

Figure 30:
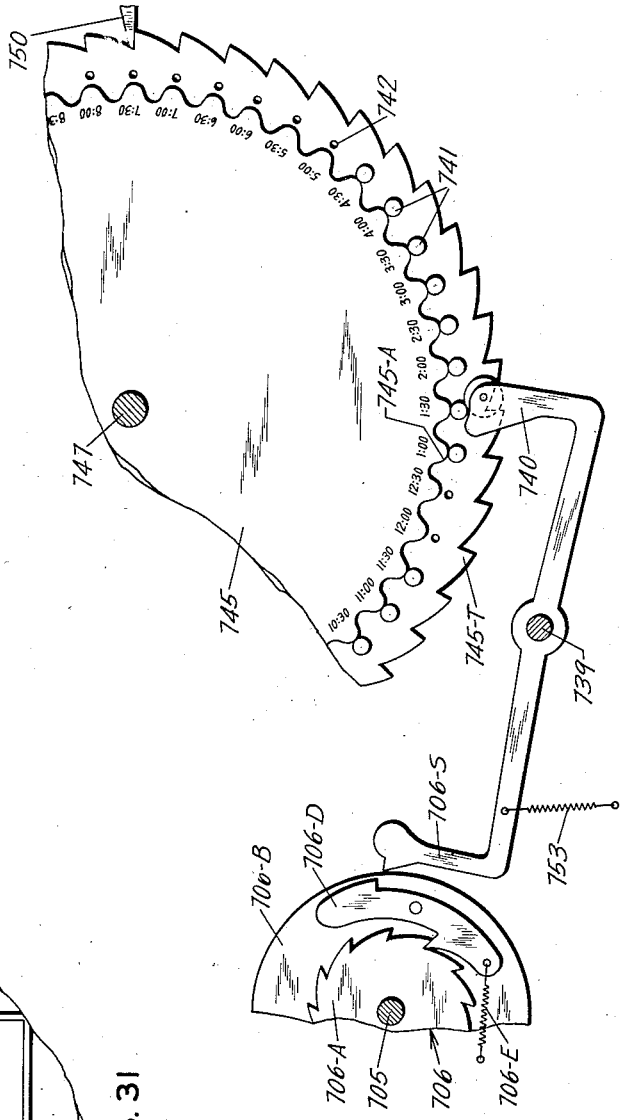
Fig. 30 is a diagrammatic vertical sectional view showing the program means and its associated clutch, partly broken away, and the mechanism for omitting non-working time.

The program means for suspending operation of the time shaft 61 during rest or other non-working periods is shown in Figs. 23 and 30, and as shown herein, this means is settably effective to accomplish such suspension for any one-half hour period during the day. Such suspension is effected by disconnecting the clutch 706, and for this purpose a stop lever 706—S is pivoted at 739 so that when it is rocked counterclockwise from the position shown in Fig. 23, the left hand end thereof will be moved into the path of the hooked trailing end of the clutch dog 706—D to thereby cause the dog to be disengaged. This of course will prevent operation of the cam 707 and the pawl 712. The forward or right hand end of the stop lever 706—S has an upwardly extended follower head 740 that is adapted to engage pins 741 that may be placed in pin holes 742 at selected positions or intervals, about one face of a program disk 745. Time markings may, of course, be provided on the disk 745 to facilitate such setting of the pins 741 to any desired program. The program disk 745 is rotatably mounted on a horizontal stub shaft 747, and has ratchet teeth 745—T formed about its outer edge. A detent 748 engages the teeth 745—T and holds the program disk 745 against reverse movement, while an advancing pawl 750 carried on one end of a rocker 751, is effective to advance the disk 745 one pin-space each time the rocker 751 is operated. The pawl 750 is held against the teeth 745—T by a spring 750—S. When a pin 741 is disposed opposite the follower head 740, the stop lever 706—S is held in the ineffective position against the force of a spring 753, but when a space 742 which does not have a pin 741 therein is moved into position opposite the follower head 740, the follower head moves inwardly of the disk 745, into engagement with one of a series of abutments 745—A. When this occurs, the stop lever 706—S is disposed in its effective relation.

The rocker 751 is operated through a rocking stroke once each half hour, and this drive is taken from the constantly driven cam shaft 705. Thus the cam shaft 705 has a single lobe, sharp drop cam 755 fixed thereon and a cam roller 756—R on one end of a centrally pivoted lever 756 is held against the cam 755 by a spring 757. The other end of the lever 756 has a pawl 758 pivoted thereto, and this pawl 758 has a tooth 758—T on its free end that is held by a spring 759 in engagement with a ten-toothed ratchet wheel 760. This ratchet wheel 760 has a detent 761 acting thereon, and the wheel 760 is fixed on a cross shaft 762. A two-lobed, sharp drop cam 765 is also fixed on the shaft 762 and a cam roller 767 on the other, or rear end, of the rocker 751 is held against the lower edge of the cam 765 by a spring 768. This affords the desired drive for advancing the program disk 745 through one pin space every half hour.

*Restoration to zero*

When the various time-controlled elements of the machine are to be restored to zero, as for example at the end of the working day, this is done by imparting reverse rotation to the time shaft 61. For this purpose, a release lever 780 is extended through a slot 781 in the rear wall of the housing 50 and is pivoted at 782, as shown in Fig. 33, so that the forward end of the lever is disposed over the pawl 712 and the detent 712—D. From the lever 780, a hook element 780—A is extended under the pawl 712 and a hook element 780—B is extended under the detent 712—D. A spring 783 acting on the forward end portion of the lever 780 normally holds the release lever 780 in its ineffective position. However, by depressing the exposed rear end of the lever 780, the pawl 712 and the detent 712—D may be released so as to free the time shaft 61 for reverse or zero-setting movement.

Such zero-setting movement may be imparted to the shaft 61 by a hand wheel 785, Fig. 33, which is disposed outside of the rear wall of the housing 50. This hand wheel is connected by a shaft 786 and bevel gearing 787 to the time shaft 61.

The release lever 780 is also used when the time setting of the time shaft 61 is to be corrected, or when the program device setting is to be adjusted. Thus after releasing the pawl 712 and the detent 712—D, the time shaft 61 may be rotated to accurately re-set the same, and this may be accomplished by a service knob 790 fixed on the extended end of the time shaft 61, outside the recess panel 52.

Also, when the pawl 712 and the detent 712—D are released, the cam shaft 705 may be freely rotated by a similar service knob 791, to set the program disk 745 to any desired position of adjustment, in which it conforms with the time position of the drum D.

*Operation of the machine*

At the end of each regular or overtime work period, the time-operated elements of the machine are restored to their zero positions so as to condition the mechanism for use in the succeeding work period, and at this same time the machine is set for computation at either regular or overtime rates for the next work period, and the date setting is changed if this is required.

Thus in restoring the machine to zero, the timekeeper operates the release lever 780 so as to release the actuating pawl 712 and the retaining pawl 712—D that are effective in the time controlled drive of the time shaft 61, and this enables the shaft to be rotated in a reverse direction by the hand wheel 785. Such reverse rotation of the time shaft 61 moves the start time set-up bar 60 in a forward return direction, and at the same time moves the finish time type bars 201—10 and the drum D in a rearward return direction.

In the event that the date must be changed for the next work period, this may be accomplished by operation of the setting knobs 264—T and 264—U. Similarly, the numbering machine 201—N may be re-set to zero or to any desired starting number at this time by operation of the re-set knob 264.

The setting of the machine for computation at either regular or overtime rates is accomplished after the top door 59—D of the casing has been opened, the plungers 330 being retracted while the drum D is rotated to locate the plungers 330 on either one side or the other of the upper stop bar 333—U.

The aforesaid re-setting of the machine to zero is accomplished during the non-working intermediate period between working periods, and it will be recalled that the program means are operating at this time, and at the end of the idle period will automatically set the time drive into operation to start the time controlled advancing movements of the drum D, the start time set-up bar 60 and the finish time type bars 201—10. Thus the drum D and the finish time type bars 201—10 will start their step-by-step forward movements, and the start time set-up bar 60 will begin its step-by-step rearward movements.

Prior to the time when the next work period is to start, the timekeeper must prepare one storage slide for each workman, and such prepared storage slides S are stored in the related rack sections 108—1 so as to be ready for the registration and storing of the start time after the work period has started. In respect to the slide S that is to be issued to the workman at the start of the new work period, it will be assumed that many such slides S were used on the preceding day for the same jobs, so that the abutments 103—5 to 103—8 are in the proper set positions, and that the key K is in position. Thus the only preparatory operations necessary in respect to such a slide S are the re-setting of the start time block 64 to its initial or most rearward position, and the re-setting of the single-use safety means 140 that includes the finger 145—F. The re-setting of the finger 145—F is accomplished by use of a key that is inserted in the slot 146—K. The re-setting of the start time block 64 is accomplished by opening of the lid 102—R, and upon release of the locking levers 131, the block 64 is moved to its rear position where it is locked as soon as the locking levers 131 are freed. In the event a job has been completed coincident with the close of the previous work period, it is assumed that during the performance of the previous job the timekeeper will have completed the preparation of the alternate slide for a new job assignment, in which case in addition to the above setting operations the abutment bars 105—3 to 105—8 will have been set in positions representative of the department number, job number, operation number and machine number, or other descriptive data related to the job, and this fully prepared slide will be available in section 108—2 for transfer to section 108—1 of the storage rack 107.

When a prepared slide S is handed to the workman to whom it is allocated at the beginning of the work period, he takes such slide and inserts the same into the start time slot 55—S to properly set the start time block 64 to a position on the slide that is representative of the start time, which is of course the instant time as represented by the position of the start time set-up bar 60 in the machine. In such a registering operation the full-stroke means, Figs. 17, 19, 19A and 20, that includes the pawls 125 and the ratchet bars 126 is effective to insure full insertion of the slide S into its most rearward or home position. In the course of such insertion of the slide S into the start time slot 55—S, the key-like projecting cam element 134 on the forward end of the start time set-up bar 60 first passes into the block 64 so as to release the locking levers 131, and when the block 64 engages the forward end of the bar 60, the block 64 will be held against further rearward movement as the rearward inserting movement of the slide S is completed. This produces a relative movement of the block 64 on the slide S, and when the slide S reaches its home position, the block 64 will be disposed in a position on the slide that is representative of instant time. Upon reversal of the movement of the slide S, the friction devices 135 hold the block 64 in position while the locking levers 131 are permitted to resume their locking engagement with notches 130.

The slide S is then returned to the timekeeper who places the slide in section 108—1 of the storage rack 107. In the event that the first slide assigned for the day is one which was not carried over from the previous day in its fully set up form, the timekeeper at this time will set up the abutment bars 103—3 and 103—4 by placing the man's rate key K, removed from section 108—3 of rack 107, in position in the slide S. This is accomplished by opening the lid section 102—L, placing the key K in position with the bars 103—3 and 103—4 in contact with the abutment shoulders of the key K, and thereafter closing and locking the lid section 102—L.

While the workman is engaged in the performance of the job to which the slide S in the rack section 108—1 has been allocated, the timekeeper sets up the other or alternate slide S for the next job to which this workman is to be assigned. Thus the alternate slide S is taken from the rack section 108—2, and the single-use means is reset, the lid 102—R is opened and the start time block 64 is put in its initial position as hereinabove described. The abutments 103—5 to 103—8 are then set in positions representative of the department number, job number, operation number, machine number or other descriptive data related to the new job. The lid section 102—R is then closed, so that the teeth 102—T serve to lock the abutments 103—5 to 103—8 in such set positions, and the timekeeper may verify the setting by observing the legends 121 through the window 120 in the lid 102—R. The alternate slide S as thus fully prepared for its next use, is then returned to the rack section 108—2.

When the workman completes the job upon which he has been working, he returns to the timekeeper for the finish time registration and the related computing and recording operations, and in this connection it may be observed that the slides S pertaining to the finished job and to the new job are preferably inserted simultaneously into the appropriate slots of the machine to avoid loss of time credit that might be caused by successive insertion of the slides. Moreover, the actual slide inserting operation may be performed either by the workman or by the timekeeper.

Prior to such registration, however, the machine must be conditioned so as to insure computation of the earnings amount at the correct pay rate, and to provide record cards at the printing and punching stations. Thus a card C—1 is placed in the printed card receiver 51—1, and a tabulating card C—2 is placed in the punched card receiver 51—2, and these two receivers are moved inwardly until the retaining latches 674—1 and 674—2 become engaged with the respective receivers to hold the same in their inserted positions. As the printed card receiver 51—1 is thus inserted, the cam 243 carried thereby acts to cock or tension the advancing means which are to advance the numbering machine 201—N at the end of the cycle, this operation of the numbering machine actually taking place when the receiver 51—1 is released for outward movement.

In the insertion of the receivers 51—1 and 51—2, the leading or right hand end edges of the cards C—1 and C—2 act respectively on the card levers 688—1 and 688—2 to depress the respective vertical latch slides 683—1 and 683—2, and hence if there is a card in both of the card receivers, the operation of the slides 683—1 and 683—2 will free the interlocking bar 680 for operation in initiating a recording cycle as will hereinafter be explained.

As a further conditioning operation the pay rate is set by turning of the operating wheel 53. This rotates the drum D, and the rotation is stopped when the proper rate indication is visible through the window 269 in the front wall 50—F. In such rotative setting of the drum D, the type set 209 that pertains to such set or selected pay rate is disposed adjacent to the printing station, and the drum D—2 is correspondingly positioned so that the key grooves K—2 disposed at the side of the finish time slot 55—F are physically representative of the selected pay rate.

The setting handle H is depressed as soon as the setting of the drum D has been completed, and this rocks the shaft 400 to the relation shown in Fig. 24, and the rock shaft 400 is latched in this position by the latch arm 405. The cam 401 is thus rendered effective on the bail 398, Fig. 25, which in turn acts through the slide arms 395—F and 395—R to project the selected carrier 209—C from the drum D and into position beneath the platen P.

When the rock shaft 400 is thus removed to its set and latched position, the blocking plate 415 is shifted out of the finish time slot 55—F, Fig. 24, and the time impulse suspension means, which includes the arm or pawl 730, is rendered effective by the related and yieldingly applied rocking of the shaft 725, Fig. 25.

As the selected type set 209 is moved horizontally into its set position, the pair of teeth 327 on the locking frame 209—L that are then disposed at the printing line PL—2 are moved into embracing relation with the subtracting arm 321 which is carried on the control and computing bar 70, Fig. 23. When such engagement has been effected, any rearward or forward return movements of the bar 70 will be transmitted to the type set 209 so as to move the same longitudinally on its carrier 209—C. The machine is thus fully conditioned for the computing, recording and other operations that are now to be performed.

The two slides S are then inserted simultaneously into the appropriate slots of the machine, the newly assigned slide S being inserted into the start time slot 55—S so as to set up the new start time as previously described, while the originally assigned slide S, which now has the key K therein, is inserted into the finish time slot 55—F to cooperate with the mechanism of the machine in performing the required computing operations and setting up and controlling operation of the recording means.

As the slide S is inserted into the finish time slot 55—F, the rate setting of the drum D is verified by the matching of the key ridges K—1 of the key K with the rate-representing key grooves K—2 of the drum D—2. This of course insures computation of earnings and related money amounts at the proper rate.

The initial inserting movement of the slide S in the finish time slot 55—F, also actuates the lever 697—A to condition the latch-releasing link 698 that is to act on the lever 405 to unlatch the rock shaft 400 at the end of the machine operation, and as will hereinafter appear, such unlatching of the shaft 400 takes place only after the selected type set 209 has been returned forwardly to its normal relation to its carrier 209—C.

As the inserting movement of the slide S in the finish time slot 55—F progresses, the abutment plates 103—3 to 103—8 engage and impart differential stting movements to the descriptive control bars 260—3 to 260—8, thereby to set the connected descriptive type bars 201—3 to 201—8 to positions corresponding to the numerical descriptive data that has been set up and stored in the slide S.

In this same inserting movement of the slide S into the finish time slot 55—F, the start time block 64 of the slide S engages the start time control bar 70 so as to shift the connected start time type bars 201—9 rearwardly to a set position that corresponds to the start time represented by such start time block 64. The bar 70 is also connected through the arm 321 to the selected type set 209, so that the type set 209 is shifted rearwardly through a subtracting stroke the length of which is representative of the stored start time. In other words, the type set 209 at the start of the subtracting stroke has type characters disposed at the printing line PL—2 for printing the instant time and the earnings for the period between zero time and such instant time, and by moving the type set in a subtracting direction through a distance corresponding or related to the time difference between zero time and the stored start time, the type set 209 is shifted and set so that elapsed time and related earnings are represented by the type at the printing line PL—2.

Thus at the end of the rearward inserting movement of the slide S into the finish time slot, all of the type elements are set up in proper positions for recording all of the required data on the card C—1, and the related data representing shoulders 501 are of course in corresponding set positions so as to be conditioned for control of the punching operations that are to be performed on the card C—2. Before proceeding to a description of these recording operations it should be observed that near the end of the slide inserting operation the latch 148 of the single-use safety mechanism 140 engages and is tripped by the stationary arm 153 so that the finger 145—F is spring urged downwardly onto the top of the stationary lug 155. Hence the finger 145—F is in position to move to its projecting safety position as soon as withdrawal of the slide S is started. Also, at the end of the slide inserting movement, the retaining latch 662 engages the slot 661 in the edge of the slide S so as to retain the slide S in this position until the recording operations have been completed. At the very end of the inserting movement of the slide S, the right rear edge 138 of the slide contacts the forward end of the interlocking bar 680, and when the two latches 685—1 and 685—2 have been properly released by insertion of the required record cards at the recording positions, the completion of the rearward slide movement causes the interlocking bar 680 to initiate the one revolution cycle of engagement of the clutch 605. This will of course cause the main cam shaft 606 to rotate through a one revolution cycle during which the recording operations will take place in the timed relation shown in the timing chart of Fig. 32.

Thus, as will be evident in Fig. 28 of the drawings, the platen operating cam 628 is driven so as to act through the lever 639 to operate the driving pawl 637. This retracts and then releases the platen-driving rocker 642 so as to drive the platen P through a printing stroke in which the various items represented by the set-up type elements are printed so as to produce the complete record C—1 as shown in Fig. 2.

The punching mechanism 500 is also operated through a cycle since its main cam shaft 548 is driven from the shaft 600. Thus the sensing fingers 522 of the punching mechanism sense the data representing shoulders 501 that have been set concurrently with the setting of the various type elements 201, so that the punch setting slides 525 are correspondingly set and the punches 545 operated to produce a complete punched record C-2 as shown in Fig. 3.

After the actual printing and punching operations have been performed, and near the end of the rotative cycle of the shaft 600, cams 677—1 and 677—2 are effective to release the latch slides 673—1 and 673—2, thereby to permit the card receivers 51—1 and 51—2 to move to their projected positions for removal of the completed record cards C-1 and C-2 therefrom. As the printed card receiver 51—1 moves outwardly, the lever 240 is released so as to impart an advancing movement to the numbering machine 201—N and set the same to the next higher number. At this time, the cam 667 acts to release the latch lever 662 which has held the slide S in its home position in the finish time slot 55—F during the recording operation.

The slide S is thus urged and moved forwardly by the action of the return springs associated with the bar 70 and the control bars 280, and at the very beginning of such forward movement, the finger 145—F of the single-use safety mechanism 140 drops off in front of the lug 155 and is locked in this relation by the locking slide 156. This prevents a second use of the slide S until it has been reconditioned by the timekeeper.

The various control bars 280 and the connected type bars 201—3 to 201—8 return of course to their normal positions, and the same is true with respect to the control bar 70 and the connected start time type bars 201—9. The selected type set 209, of course, still has its teeth 327 engaged with the subtracting arm 321 which moves with the control bar 70, and hence the type set 209 is returned in a forward direction to its normal position on its carrier 209—C.

The interlocking bar 680 moves forward as the withdrawal of the slide S starts, from the finish time slot 55—F, and when the notches 686—1 and 686—2 move into alignment with the latch teeth 685—1 and 685—2, these teeth engage such notches and are in condition for the next machine operation.

The spring induced forward movement of the slide S does not fully discharge the slide from the finish time slot 55—F, so that the worker must manually perform the final removing operation. As this is done, the arm 697—A is released so that the link 698 is effective to release the latch lever 405. This permits the spring 404 to return the shaft 400 to its normal position, and hence the type carrier 209—C at printing position is retracted by its springs 353 into its housed relation in the drum D. The return of the shaft 400 serves of course to return the blocking plate 415 to its blocking position in the finish time slot 55—F, and the time impulse suspension means is rendered ineffective so that in the event that a time impulse has been effective to condition the pawl 712, the pawl will now be released and will act to impart the desired indexing movement to the time shaft 61.

The completed record cards C—1 and C—2 are then removed from the machine, as is the new slide S which has been in position in the start time slot 55—S, and the two slides and the punched card C—2 are handed to the timekeeper while the printed card C—1 is retained by the workman to serve as a receipt. It is contemplated that such printed card C—1 will be checked by the workman, particularly as to elapsed time and related earnings, thus to eliminate the necessity for subsequent verification of the information that is duplicated in the punched card C—2.

The timekeeper then transfers the key K to the new slide S and then places this slide in the rack section 108—1, while the old slide is placed in rack section 108—2 to be re-set for a new work assignment as the timekeeper has time available for such work. The punched card C—2 is stored by the timekeeper for later transfer to the accounting department.

At the close of a working period the workmen merely perform the finish time recording operation, and do not perform a simultaneous start time recording operation as hereinbefore described, and after all of the finish time recording operations have been completed, the timekeeper performs a series of storing and conditioning operations in respect to the various slides S.

Thus as to completed jobs, the new slide for the next assignment is transferred from rack section 108—2 to rack section 108—1, the key K is removed from the old slide, and the old slide and the key K are placed respectively in rack sections 108—2 and 108—3. As to unfinished jobs, the old slide is re-conditioned by restoring the single-use safety mechanism 140 and returning the start time block 64 to its normal or initial position. Such slide S is then stored in rack section 108—1. At this time, the collected cards C—2 are transferred as documents of original entry to the accounting or auditing department so as to be immediately available, in their complete form, for all accounting and control purposes.

*Summary*

From the foregoing description it will be apparent that the present invention affords an elapsed time and earnings computing and recording machine that eliminates the usual delay in availability of complete time and earnings records, and therefore, by reason of the immediate availability of such records, serves to increase the value and potential usefulness of such time and earnings records. Thus the present invention enables payroll accounting practices to be materially simplified through the elimination of a series of conventional computing, recording and verifying operations, presently performed manually or semi-manually, consecutively and subsequently to the finish time registration, such computing, recording and verifying operations being accomplished in the present invention, mechanically, simultaneously and entirely concurrent with the setting of the machine for the finish time registration, thus effecting an important saving in clerical costs, eliminating the peak loads normally encountered by reason of such subsequent conventional operations and materially advancing the completion date of payrolls and accounting records. Moreover, it will be evident that under the present invention, the amount of added detail that may be furnished automatically on each record, coupled with the immediate availability of such records after completion of the work, enables wider and more effective use to be made of such records for cost, payroll and related accounting and control purposes.

Thus, either the punched record, or the printed record, may be used as a document of original entry, and in either case, the document is produced instantly at the time of the finish time registration. In each case it is important to note that while the descriptive data and the man number and the pay rate pertaining to each record may be quite different, all of this information as well as the start time are set up in independent storage devices that are allocated to each man and job, so that when a finish time registration is to be made in respect to the particular man and job to which a storage device has been assigned, the operation is relatively simple and may be quickly and easily performed under the partial control of such storage device. This of course enables the finished time registrations to be performed in rapid succession where this is required.

Where the machine of the present invention is utilized to produce both printed and punched records the advantage is of marked importance since the printed record may be issued immediately to the workman as a work receipt, with the result that the immediate inspection of the printed record by the workman serves as a verification of that record as well as the punched record which carries identical accounting and payroll data representations, eliminating the necessity for later payroll and cost adjustments.

The present invention serves of course to enable start time to be stored in respect to each job in individual storage devices that are allocated to each man, and such storage devices are so constructed and arranged as to enable other pertinent data to be stored in each such storage device. The arrangement under the present invention is such that the machine cooperates with the storage devices to compute elapsed time as well as the earnings amount at any one of a number of regular and overtime pay rates. Such elapsed time and earnings computations take place concurrently with the setting of the machine by the storage device for recording of the start time and other data stored in the storage device so that when the elapsed time and earnings have been computed, they may be recorded concurrently with such start time and related data to produce a complete time and earnings record of wide applicability to accounting and control purposes.

It will also be apparent that the present invention enables mechanism, capable of computing and recording earnings amounts at any one of a large number of regular and overtime rates, to be safely utilized, since it provides for verification of the wage rate to be used in a computation before the computing and recording may be performed. Moreover, the presence of the blank records in the machine is verified, and correct operation of the various setting mechanisms is assured as a condition precedent to the operation of the machine.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In an elapsed time computer and recorder, means affording a finish time control station into which a supplemental control member, allocated to a particular man and job and bearing physical abutments positionally representing a start time and one or more identifying members, is adapted to be inserted, a printing station having a platen and a plurality of individually settable main printing members each having a series of numerical type faces adapted to be moved in a predetermined direction from normal positions to set positions by the abutments on such a supplemental control member to represent such identifying numbers at a printing line in said printing station, a frame movable past and in a direction opposite to said predetermined direction and transverse of said printing line, means for advancing said frame in said opposite direction from a zero position in step-by-step movements applied to said frame at predetermined small increments of time so that said frame by its position is representative of current time, a plurality of carriers mounted on said frame and respectively allocated to a plurality of different pay rates and supported for shifting movement laterally of said directions from an inoperative position disposed out of the path of said platen into an operative position beneath said platen, adjusting means for said frame for setting any selected one of said carriers in a set position substantially in the plane of said printing line, supplemental printing means on each carrier shiftable from a normal position on such carrier in said predetermined direction when said carrier is in its operative position, said supplemental printing means having a plurality of lines of type characters allocated in succession to said time increments from a zero time through a predetermined number of hours constituting at least a full working day, each of said lines of type including type for printing the time increment to which the line is allocated and for printing the amount represented by such time increment times the pay rate to which the supplemental printing means and its carrier are allocated, a start time control element movable from a normal position in said predetermined direction through a range at least equal to the extent of setting movement of said supplemental printing means, said start time control element being positioned for engagement by the start time abutment of such a supplemental control member as such supplemental control member is inserted into said finish time control station to thereby move said start time control element through a subtracting stroke the extent of which is determined by the setting of said start time abutment, normally disengaged latch means for connecting the supplemental printing means that is in said set position to said start time control element during said subtracting stroke to thereby set the connected supplemental printing means to represent elapsed time, a start time type member movable in said predetermined direction by said start time control element from a normal zero position to a position to print the start time represented by the start time abutment of such a supplemental control member, single cycle drive means for operating said platen, and a control means operable by such a supplemental control member when such supplemental control member has been fully inserted into said finish time control station to initiate a cycle of said drive means.

2. In an elapsed time computer and recorder, means affording a finish time control station into which a supplemental control member, allocated to a particular man and job and bearing physical abutments positionally representing a start time and one or more identifying numbers, is adapted to be inserted, a printing station having a platen and a plurality of individually settable main printing members each having a series of numerical type faces adapted to be moved in a predetermined direction from normal positions to set positions by the abutments on such a supplemental control member to represent such identifying numbers at a printing line in said printing station, a drum mounted for rotation and longitudinal advancing movement on an axis disposed parallel to said predetermined direction and transverse of said printing line, means for advancing said drum along its axis in a direction opposite to said predetermined direction from a zero position in step-by-step movements applied to said drum at predetermined small increments of time so that said drum by its position along said axis is representative of current time, a plurality of elongated carriers mounted on said drum parallel to said axis and respectively allocated to a plurality of different pay rates and supported on said drum for shifting movement radially with respect to said axis from an inoperative position disposed out of the path of said platen into an operative position beneath said platen, adjusting means for said drum for rotating said drum to set any selected one of said carriers in a set position substantially in the plane of said printing line, supplemental printing means on each carrier shiftable from a normal position longitudinally on such carrier in said predetermined direction when said carrier is in its operative position, said supplemental printing means having a plurality of lines of type characters allocated in succession to said time increments from a zero time through a predetermined number of hours constituting at least a full working day, each of said lines of type including type for printing the time increment to which the line is allocated and for printing the amount represented by such time increment times the pay rate to which the supplemental printing means and its carrier are allocated, a start time control element movable from a normal position in said predetermined direction through a range at least equal to the extent of setting movement of said supplemental printing means, said start time control element being positioned for engagement by the start time abutment of such a supplemental control member as such supplemental control member is inserted into said finish time control station to thereby move said start time control element through a subtracting stroke the extent of which is determined by the setting of said start time abutment, normally disengaged latch means for connecting the supplemental printing means that is in said set position to said start time control element during said subtracting stroke to thereby set the connected supplemental printing means to represent elapsed time, a start time type member movable in said predetermined direction by said start time control element from a normal zero position to a position to print the start time represented by the start time abutment of such a supplemental control member, a single cycle drive means for operating said platen, and a means operable when such supplemental control member has been fully inserted into said finish time control station to initiate a cycle of said drive means.

3. In an elapsed time computer and recorder, means affording a finish time control station into which a supplemental control member, allocated to a particular man and job and bearing physical abutments positionally representing a start time and one or more identifying numbers, is adapted to be inserted, a representing station having a plurality of individually settable main representing members each having a series of numerical data representing abutments and adapted to be moved in a predetermined direction from normal positions to set positions by the abutments on such a supplemental control member to represent such identifying numbers at a representing lines in said representing station, a drum mounted for rotation and longitudinal advancing movement on an axis disposed parallel to said predetermined direction and transverse of said representing line, means for advancing said drum along its axis in a direction opposite to said predetermined direction from a zero position in step-by-step movements applied to said drum at predetermined small increments of time so that said drum by its position along said axis is representative of current time, a plurality of elongated carriers mounted on said drum parallel to said axis and respectively allocated to a plurality of different pay rates and supported on said drums for shifting movement radially with respect to said axis from an inner inoperative position into an outer operative position, adjusting means for said drum for rotating said drum to set any selected one of said carriers in a set position substantially in the plane of said representing line, supplemental representing means on each carrier shiftable from a normal position longitudinally on such carrier in said predetermined direction when said carrier is in its operative position, said supplemental representing means having a plurality of lines of representing abutments allocated in succession to said time increments from a zero time through a predetermined number of hours constituting at least a full working day, each of said lines including abutments for representing the time increment to which the line is allocated and for representing the amount determined by such time increment times the pay rate to which the supplemental representing means and its carrier are allocated, a start time control element movable from a normal position in said predetermined direction through a range at least equal to the extent of setting movement of said supplemental representing means, said start time control element being positioned for engagement by the start time abutment of such a supplemental control member as such supplemental control member is inserted into said finish time control station to thereby move said start time control element through a subtracting stroke the extent of which is determined by the setting of said start time abutment, normally disengaged latch means for connecting the supplemental representing means that is in said set position to said start time control element during said subtracting stroke to thereby set the connected supplemental representing means to represent elapsd time, a start time representing means movable in said predetermined direction by said start time control element from a normal zero position to a position to represent the start time represented by the start time abutment of such a supplemental control member, and means operable under control of the representing means thus set to record the represented numerical data.

4. In an elapsed time computer and recorder, means affording a finish time control station into which a supplemental control member allocated to a particualr man and job and bearing physical abutments positionally representing a start time and one or more identifying numbers is adapted to be inserted, a printing station having a platen and a plurality of individually settable main printing members each having a series of numerical type faces adapted to be moved in a predetermined direction from normal positions to set positions by the abutments on such a supplemental control member to represent such identifying numbers at a printing line in said printing station, a frame movable past and in a direction opposite to said predetermined direction and transverse of said printing line, means for advancing said frame in said opposite direction from a zero position in step-by-step movements applied to said frame at predetermined small increments of time so that said frame by its position is representative of current time, a plurality of carriers mounted on said frame and respectively allocated to a plurality of different pay rates and supported for shifting movement laterally of said directions from an inoperative position disposed out of the path of said platen into an operative position beneath said platen, adjusting means for said frame for setting any selected one of said carriers in a set position substantially in the plane of said printing line, supplemental printing means on each carrier shiftable from a normal position on such carrier in said predetermined direction when said carrier is in its operative position, said supplemental printing means having a plurality of lines of type characters allocated in succession to said time increments from a zero time through a predetermined number of hours constituting at least a full working day, each of said lines of type including type for printing the time increment to which the line is allocated and for printing the amount represented by such time increment times the pay rate to which the supplemental printing means and its carrier are allocated, a start time type member, means operable by the start time abutment of such a supplemental control member to set said start time type member to a corresponding start time printing position and simultaneously to move the supplemental printing means that are in set position in a reverse direction to a printing position corresponding to the elapsed time between present time and said start time, and means for operating said platen when such printing means have thus been set.

5. In an elapsed time and earnings computing and recording mechanism, time operated means constantly representative of present time, a plurality of computing means allocated respectively to a plurality of different pay rates and respectively operable to compute and physically represent elapsed time and earnings amounts at the pay rates to which they are respectively allocated, means for selecting any one of said computing means for a computing operation, first and second recording stations at which record sheets may be disposed for recording operations thereon, a control station at which any one of a plurality of storage and control devices, each allocated to a different man and each bearing physical representations of start time, pay rate, man number and other related accounting data, may be placed in a control relation, means effective in accordance with the start time representations of such a control device placed in such control relation to operate the selected computing means to compute and physically represent the elapsed time and the related earnings amount at the pay rate to which the selected computing means is allocated, and recording means at the two record stations operable to record on record sheets at the respective recording stations the data represented by the physical representations afforded by the selected computing means and by the control device that is in said control relation.

6. In an elapsed time and earnings computing mechanism, time operated means constantly representative of present time, a plurality of computing means allocated respectively to a plurality of different pay rates and respectively operable to compute and physically represent elapsed time and earnings amounts at the pay rates to which they are respectively allocated, means for selecting any one of said computing means for a computing operation, a recording station at which a record sheet may be disposed for a recording operation thereon, a plurality of storage and control devices adapted selectively to be placed in a control relation to said mechanism and each allocated to a different man and each bearing physical representations of start time, pay rate, man number and other related accounting control data, means effective in accordance with the start time representations of a control device placed in such control relation to operate the selected computing means to compute and physically represent the elapsed time and the related earnings amount at the pay rate to which the selected computing means is allocated, and recording means operable to record on a record sheet the data represented by the physical representations afforded by the selected computing means and by the control device that is in said control relation.

7. In an elapsed time and earnings computing mechanism, time operated means constantly representative of present time, a plurality of computing members allocated respectively to a plurality of different pay rates, each member having representations at equally spaced positions of the elapsed time between zero time and any time increment throughout a working day, and each member having computed and related earnings amounts represented opposite each represented time increment, time controlled means for moving said members in an advancing direction, means for selecting any one of said computing means for a computing operation, a recording station at which a record sheet may be disposed for a recording operation thereon, a plurality of storage and control devices adapted selectively to be moved into a control position and each allocated to a different man and each bearing physical representations of start time, pay rate, man number and other related accounting control data, means effective in accordance with the start time representations of a control device as it is moved into such control relation to move the selected computing member in a direction opposite to said advancing direction to compute and physically represent the elapsed time and the related earnings amount at the pay rate to which the selected computing member is allocated, and recording means operable to record on a record sheet the data represented by the physical representations afforded by the selected computing member and by the control device that is in said control relation.

8. In an elapsed time computer and recorder, means affording a start time slot and a finish time slot into either of which any one of a large number of separate storage and control slides, each having a normally locked and settable start time abutment and a plurality of other pre-set data representing abutments, may be inserted in a predetermined inserting direction to a home position, clock mechanism advanced in a step-by-step manner at predetermined small time increments, a start time set-up member disposed in alignment with said start time slot and advanced by said clock mechanism into said start time slot in a direction opposite and parallel to said inserting direction and in position to unlock and set the start time abutment of a storage and control slide inserted to said home position in said start time slot, a start time control member mounted in said finish time slot in position for engagement and actuation by the set and locked start time abutment of such a storage and control slide as such slide is inserted into said finish time slot to said home position, said start time control member being normally spring-urged in said opposite direction and being actuated by a set and locked start time abutment through a subtracting stroke in said inserting direction to a set position representative of the start time as represented by the set and locked start time abutment, elapsed time and earnings computing mechanism normally actuated in a forward direction by said clock mechanism and normally positioned thereby to represent present time and the related earnings amounts from a predetermined zero time to the present time, subtracting means operated by said start time control member during said subtracting stroke thereof to impart reverse movement to said elapsed time and earnings computing mechanism to dispose the same in a final representing position representative of the time elapsed between present time and the start time to which the start time control member is set, recording means operable in accordance with such final representing position of said elapsed time and earnings computing mechanism to record the elapsed time and earnings amounts, and means governed by the pre-set data representing abutments of the storage slide for concurrently recording the related data represented on the storage and control slide.

9. In an elapsed time computer and recorder, means affording a finish time slot into which any one of a large number of separate storage and control slides, each having a start time abutment set to represent start time and a plurality of other pre-set data representing abutments, may be inserted in a predetermined inserting direction to a home position, clock mechanism advanced in a step-by-step manner at predetermined small time increments, a start time control member mounted in said finish time slot in position for engagement and actuation by the start time abutment of such a storage and control slide as such slide is inserted into said finish time slot to said home position, said start time control member being normally spring-urged in a forward direction opposite to said inserting direction and being actuated by a start time abutment through a subtracting stroke in said inserting direction to a set position representative of the start time as represented by the start time abutment, elapsed time and earnings computing mechanism normally actuated in said forward direction by said clock mechanism and normally positioned thereby to represent present time and the related earnings amounts from a predetermined zero time to the present time, subtracting means operated by said start time control member during said subtracting stroke thereof to impart reverse movement to said elapsed time and earnings computing mechanism to dispose the same in a final representing position representative of the time elapsed between present time and the start time to which the start time control member is set, recording means operable in accordance with such final representing position of said elapsed time and earnings computing mechanism to record the elapsed time and earnings amounts, and means governed by the pre-set data representing abutments of the storage slide for concurrently recording the related data represented on the storage and control slide.

10. In an elapsed time and earnings computing and recording machine, clock mechanism, a recording station having settable recording elements adapted to record data on a record disposed at such station, a control station for reception in a control position of any one of a plurality of individual storage and control devices each allocated to a particular workman and each bearing physical representations of the man number and pay rate of the workman to which it is allocated and of the start time and other accounting data related to a particular job, order number or the like, finish time control means actuated by said clock mechanism and having means affording physical representations of finish time, computing means controlled in part by the start time representations of a storage and control device in said control position and in part by said clock mechanism for computing and representing elapsed time and controlled by the pay rate representation of such storage and control device to compute and physically represent the earnings amount at such rate and for the computed elapsed time, and means controlling said recording elements and governed by such physical representations of the computed elapsed time and earnings and by the physical representations of said finish time control means and the storage device at control position to produce at said recording station a complete time and earnings record bearing the start time, finish time, elapsed time, earnings amount, pay rate, workman identification, and related accounting data specific to the job, order, or the like.

11. In an elapsed time computing and recording machine, clock mechanism, a recording station having settable recording elements adapted to record data on a record disposed at such station, a control station for reception in a control position of any one of a plurality of individual storage and control devices each allocated to a particular workman and each bearing physical representations of the man number and pay rate of the workman to which it is allocated and of the start time and other accounting data related to a particular job, order number or the like, time actuated finish time control means actuated by said clock mechanism and having means affording physical representations of finish time, computing means controlled in part by the start time representations of a storage and control device in said control position and in part by said clock mechanism for computing and representing elapsed time and means controlling said recording elements and governed by such physical representations of the computed elapsed time and by the physical representations of said finish time control means and the storage device at control position to produce at said recording station a time record bearing the start time, finish time, elapsed time, pay rate, workman identification, and related accounting data specific to the job, order, or the like.

12. In an elapsed time and earnings computing and recording machine, means affording a finish time slot into which any one of a plurality of separate storage and control slides, each having a settable start time abutment and a plurality of other settable abutments thereon for representing start time and other data related to a particular man or job, may be selectively inserted in an inserting direction to a home position, a computing set including data representing means and allocated to a particular pay rate, a time controlled means acting on said set to shift the same in an advancing direction in a step-by-step manner to dispose the set in successive positions representative of present time, a start time control member disposed in said slot and adapted for engagement by the start time abutment of a slide as it is inserted to said home position to shift said start time control member through a subtracting stroke representative of the time between a predetermined zero time and the start time represented by the set position of the start time abutment on the slide, means operated by the said start time control member in such subtracting stroke to actuate the computing set to compute and represent elapsed time and the related earnings amount at the wage rate to which such computing set is allocated, other data representing means set up by and in accordance with the other abutment means of such slide as it is inserted to said home position, and recording means operable to record the data represented by said data representing means of said computing set and by said other data representing means.

13. In an elapsed time computing and recording machine, means affording a finish time slot into which any one of a plurality of separate storage and control slides, each having a settable start time abutment and a plurality of other settable abutments thereon for representing start time, pay rate, man number and other data related to a particular man or job, may be selectively inserted in an inserting direction to a home position, a computing member including data representing means representing the digits of successive time increments throughout a working day, a time controlled means acting on said member to shift the same in an advancing direction in a step-by-step manner to dispose the member in successive positions representative of present time, a start time control member disposed in said slot and adapted for engagement by the start time abutment of a slide as it is inserted to said home position to shift said start time control member through a subtracting stroke representative of the time between a predetermined zero time and the start time represented by the set position of the start time abutment on the slide, means operated by the said start time control member in such subtracting stroke to actuate the computing member to compute and represent elapsed time, other data representing means set up by and in accordance with the other abutment means of such slide as it is inserted to said home position, and recording means operable to record the data represented by said data representing means of said computing member and by said other data representing means.

14. In an elapsed time and earnings computing and recording mechanism, a recording station at which a record sheet may be disposed for a recording operation, time operated means constantly representative of present time, a plurality of computing means allocated respectively to a plurality of different pay rates and operable to compute and physically represent elapsed time and earnings amounts at the pay rates to which they are respectively allocated, means for selecting any one of said computing means for a computing operation, a control station at which any one of a plurality of storage and control devices, each allocated to a different man and each bearing physical representations of start time, pay rate, man number and other related accounting control data, may be placed in a control relation to the selected computing means, means effective in accordance with the start time representations of a control device placed in such control relation to operate the selected computing means to compute and physically represent the elapsed time and the related earnings amount at the pay rate to which the selected computing means is allocated, and recording means operable to record on a record sheet at said recording station the data represented by the physical representations afforded by the selected computing means and by the control device that is in said control relation.

15. In an elapsed time and earnings computing and recording mechanism, a recording station at which a record sheet may be disposed for a recording operation, time operated means constantly representative of present time, a plurality of computing means allocated respectively to a plurality of different pay rates and operable to compute and physically represent elapsed time and earnings amounts at the pay rates to which they are respectively allocated, selecting means adapted to be actuated to select any one of said computing means for a computing operation, latch means operable upon the completion of a selecting operation to latch said selecting means in its actuated condition, a control station at which any one of a plurality of storage and control devices, each allocated to a different man and each bearing physical representations of start time, pay rate, man number and other related accounting control data, may be placed in a control relation to the selected computing means, means effective in accordance with the start time representations of a control device placed in such control relation to operate the selected computing means to compute and physically represent the elapsed time and the related earnings amount at the pay rate to which the selected computing means is allocated, recording means operable to record on a record sheet at said recording station the data represented by the physical representations afforded by the selected computing means and by the control device that is in said control relation, and means operated by such a control device as it is removed from said control station to release said latch means.

16. In an elapsed time and earnings computing mechanism, time operated means constantly representative of present time, a plurality of computing means allocated respectively to a plurality of different pay rates and respectively operable to compute and physically represent elapsed time and earnings amounts at the pay rates to which they are respectively allocated, means for selecting any one of said computing means for a computing operation, a recording station at which a record sheet may be disposed for a recording operation thereon, a control station at which any one of a plurality of storage and control devices may selectively be placed in a control relation to said mechanism and each allocated to a different man and each bearing physical representations of start time, pay rate, man number and other related accounting control data, latch means operable to latch such a control device in said control relation, means effective in accordance with the start time representations of a control device placed in such control relation to operate the selected computing means to compute and physically represent the elapsed time and the related earnings amount at the pay rate to which the selected computing means is allocated, recording means operable to record on a record sheet the data represented by the physical representations afforded by the selected computing means and by the control device that is in said control relation, and means operable in timed relation to the operation of said recording means to release said latch means upon completion of a recording operation.

17. In an elapsed time and earnings computing and recording machine, means affording a finish time slot into which any one of a plurality of separate storage and control slides, each having a settable start time abutment and a plurality of other settable abutments thereon for representing start time and other data related to a particular man or job, may be selectively inserted in an inserting direction to a home position, a time controlled unit actuated in an advancing direction in a step-by-step manner to dispose the same in successive positions representative of present time, a plurality of computing sets including data representing means and each allocated to a different pay rate and carried by said unit and selectively shiftable on said unit to an effective position, a start time control member disposed in said slot and adapted for engagement by the start time abutment of a slide as it is inserted to said home position to shift said start time control member through a subtracting stroke representative of the time between a predetermined zero time and the start time represented by the set position of the start time abutment on the slide, means operated by said start time control member in such subtracting stroke to actuate the computing set that is in said effective position to compute and represent elapsed time and the related earnings amount at the wage rate to which such computing set is allocated, other data representing means set up by and in accordance with the other abutment means of such slide as it is inserted to said home position, and recording means operable to record the data represented by said data-representing means of said computing set and by said other data-representing means.

18. In an elapsed time and earnings computing and recording machine, means affording a finish time slot into which any one of a plurality of separate storage and control slides, each having settable abutments thereon for representing start time, pay rate and other data related to a particular man or job, may be selectively inserted in an inserting direction to a home position, each of said control slides being allocated to a particular pay rate and having mechanical key elements thereon representative of such rate, a time controlled unit actuated in an advancing direction in a step-by-step manner to dispose the same in successive positions representative of present time, a plurality of computing sets including data representing means and each allocated to a different pay rate and carried by said unit and selectively shiftable on said unit to an effective position, rate-representing key slot mechanism disposed in association with said finish time slot and having rate-representing key slot elements settable automatically to represent the rate allocated to the computing set that is in said effective position and for cooperation with the key elements of any slide as it is inserted into said finish time slot, said key slot mechanism being effective to block insertion of a slide unless the rate-representing key elements of the slide correspond with the rate-representing key slot elements that are in set position, a start time control member disposed in said slot and adapted for engagement by the start time abutment of a slide as it is inserted to said home position to shift said start time control member through a subtracting stroke representative of the time between a predetermined zero time and the set start time represented by the set position of the start time abutment on the slide, means operated by said start time control member in such subtracting stroke to actuate the computing set that is in said effective position to compute and represent elapsed time and the related earnings amount at the wage rate to which such computing set is allocated, other data representing means set up by and in accordance with the other abutment means of such slide as it is inserted to said home position, and recording means operable to record data represented by said data representing means of said computing set and by said other data representing means.

19. In an elapsed time and earnings computing mechanism, time operated means constantly representative of present time, a plurality of computing means allocated respectively to a plurality of different pay rates and operable to compute and physically represent elapsed time and earnings amounts at the pay rates to which they are respectively allocated, means for selecting any one of said computing means for a computing operation, a plurality of storage and control devices adapted selectively to be placed in a control relation to said mechanism and each allocated to a different man and each bearing physical representations of start time, pay rate, man number and other related accounting control data, rate verification means set by said selecting means and cooperating with the pay rate representations of any one of said devices for disabling said computing means when the pay rate representations do not correspond with the rate to which the selected computing means is allocated, means effective in accordance with the start time representations of a control device placed in such control relation to operate the selected computing means to compute and physically represent the elapsed time and the related earnings amount at the pay rate to which the selected computing means is allocated, and recording means operable to record on a record sheet the data represented by the physical representations afforded by the selected computing means and by the control device that is in said control relation.

20. In an elapsed time and earnings computing and recording mechanism, a recording station at which a record sheet may be disposed for a recording operation, time operated means constantly representative of present time, a plurality of computing means allocated respectively to a plurality of different pay rates and operable to compute and physically represent elapsed time and earnings amounts at the pay rates to which they are respectively allocated, means for selecting any one of said computing means for a computing operation, a control station at which any one of a plurality of storage and control devices, each allocated to a different man and each bearing physical representations of start time, pay rate, man number and other related accounting control data, may be placed in a control relation to said mechanism, means effective in accordance with the start time representations of a control device placed in such control relation to operate the selected computing means to compute and physically represent the elapsed time and the related earnings amount at the pay rate to which the selected computing means is allocated, rate verification means at said control station set by said selecting means and cooperating with the pay rate representations of any one of said devices for preventing operation of said computing means when the pay rate representations of a storage and control device do not correspond with the rate to which the selected computing means is allocated, and recording means operable to record on a record sheet at said recording station the data represented by the physical representations afforded by the selected computing means and by the control device that is in said control relation.

21. In an elapsed time and earnings computing and recording mechanism, a recording station at which a record sheet may be disposed for a recording operation, time operated means constantly representative of present time, a plurality of computing means allocated respectively to a plurality of different pay rates and operable to compute and physically represent elapsed time and earnings amounts at the pay rates to which they are respectively allocated, selecting means for selecting any one of said computing means for a computing operation, a control station at which any one of a plurality of storage and control devices, each allocated to a different man and each bearing physical representations of start time, pay rate, man number and other related accounting control data, may be placed in a control relation to a selected computing means, means effective in accordance with the start time representations of a control device placed in such control relation to operate the selected computing means to compute and physically represent the elapsed time and the related earnings amount at the pay rate to which the selected computing means is allocated, recording means operable to record on a record sheet at said recording station the data represented by the physical representations afforded by the selected computing means and by the control device that is in said control relation, disabling means at said control station normally effective to prevent disposal of a storage and control device in said control relation, and means operated by said selecting means as an incident to completion of a selecting operation to render said disabling means ineffective.

22. In an elapsed time and earnings computing and recording mechanism, a recording station at which a record sheet may be disposed for a recording operation, time operated means constantly representative of present time, a plurality of computing means allocated respectively to a plurality of different pay rates and operable to compute and physically represent elapsed time and earnings amounts at the pay rates to which they are respectively allocated, selecting means for selecting any one of said computing means for a computing operation, a control station affording a finish time slot into which any one of a plurality of storage and control devices, each allocated to a different man and each bearing physical representations of start time, pay rate, man number and other related accounting control data, may be inserted in a control relation to a selected computing means, means effective in accordance with the start time representations of a control device placed in such control relation to operate the selected computing means to compute and physically represent the elapsed time and the related earnings amount at the pay rate to which the selected computing means is allocated, recording means operable to record on a record sheet at said recording station the data represented by the physical representations afforded by the selected computing means and by the control device that is in said control relation, shiftable blocking means at said control station normally effective to block said finish time slot to prevent insertion of a storage and control device into such slot, and means operated by said selecting means as an incident to completion of a selecting operation to shift said blocking means to an ineffective position.

23. In an elapsed time and earnings computing and recording mechanism, a recording station at which a record sheet may be disposed for a recording operation, time operated means constantly representative of present time, a plurality of computing means allocated respectively to a plurality of different pay rates and operable to compute and physically represent elapsed time and earnings amounts at the pay rates to which they are respectively allocated, selecting means for selecting any one of said computing means for a computing operation, a control station at which any one of a plurality of storage and control devices, each allocated to a different man and each bearing physical representations of start time, pay rate, man number and other related accounting control data, may be placed in a control relation to the selected computing means, means effective in accordance with the start time representations of a control device placed in such control relation to operate the selected computing means to compute and physically represent the elapsed time and the related earnings amount at the pay rate to which the selected computing means is allocated, recording means operable to record on a record sheet at said recording station the data represented by the physical representations afforded by the selected computing means and by the control device that is in said control relation, disabling means at said control station normally effective to prevent disposal of a storage and control device in said control relation, means operated by said selecting means as an incident to completion of a selecting operation to render said disabling means ineffective, and a comparing means set for a comparing operation by each selecting operation and operable to compare the selected pay rate with the pay rate represented on such a storage and control device and to prevent operation of the machine when the compared rates do not correspond.

24. In a storage and control device for governing the operation of an elapsed time and earnings computing and recording machine in which computations may be made at any one of a plurality of wage rates, said device comprising a holder having a settable start time abutment settable to different positions representative of start time, a plurality of other abutments settable to represent other numerical data particular to a selected job or order, a first means for locking said other abutments in set positions, a plurality of further abutments settable to represent numerical data related to the worker to which the holder is allocated, a worker's key member allocated to such particular worker and locked in said holder, said key member having shoulders thereon for cooperation with said further abutments to set the same and having projecting key elements mechanically representing the worker's pay rate and adapted to cooperate with means in such a machine to insure earnings computation at the correct rate, and a second means for locking said further abutments and said key member in position in said holder.

25. In a storage and control device for governing the operation of an elapsed time and earnings computing and recording machine in which computations may be made at any one of a plurality of wage rates, said device comprising a holder having a settable start time abutment settable to different positions representative of a start time, releasable locking means normally effective to lock said start time abutment in any set position thereof, means responsive to complemental actuating means of a particular form for releasing said locking means for setting of said start time abutment, a plurality of other abutments settable to represent other numerical data particular to a selected job or order, a first means for locking said other abutments as a group in set positions, a plurality of further abutments settable to represent numerical data related to the worker to which the holder is allocated, a workers's key member allocated to such particular worker and locked in said holder, said key member having shoulders thereon for cooperation with said further abutments to set the same and having projecting key elements adapted to cooperate with means in such a machine to insure computation at the correct rate, and a second means for locking said further abutments as a group and for locking said key member in position in said holder.

26. In a storage and control device for governing the operation of an elapsed time and earnings computing and recording machine in which computations may be made at any one of a plurality of wage rates, said device comprising a holder having a settable start time abutment settable to different positions representative of a start time, releasable locking means normally effective to lock said start time abutment in any set position thereof, means responsive to complemental actuating means of a particular form for releasing said locking means for setting of said start time abutment, a plurality of other abutments settable to represent other numerical data particular to a selected job or order, a plurality of further abutments settable to represent numerical data related to the worker to which the holder is allocated, a worker's key member allocated to such particular worker and disposed removably in said holder, said key member having shoulders on one edge thereof for cooperation with said further abutments to set the same and having projecting key elements on a second edge disposed at right angles to said one edge and adapted to cooperate with means in such a machine to insure computation at the correct rate, and means for locking said other abutments and said further abutments and said key member in position in said holder.

27. In a storage control device for governing the operation of an elapsed time and earnings computing and recording machine in which computations may be made at any one of a plurality of wage rates, said device comprising a holder having a settable start time abutment settable along a predetermined path to different positions representative of a start time, normally effective locking means for fixing said start time abutment in any set position, means responsive to an operating element of predetermined configuration to release said locking means, a plurality of other abutments settable to represent other numerical data particular to a selected job or order, a first means for locking said other abutments in set positions, a plurality of further abutments settable to represent numerical data related to the worker to which the holder is allocated, a worker's key member allocated to such particular worker and locked in said holder, said key member having shoulders thereon representing the man number and pay rate and adapted for cooperation with said further abutments to set the same and said key member having projecting key elements representative of pay rate and adapted to cooperate with means in such a machine to insure earnings computation at the correct rate, and a second means for locking said further abutments and said key member in position in said holder.

28. In a storage and control device adapted to be inserted into a control position for governing the operation of an elapsed time and earnings computing and recording machine in which computations may be made at any one of a plurality of wage rates, said device comprising a holder having a settable start time abutment settable to different positions representative of start time, a plurality of other abutments settable to represent other numerical data particular to a selected job or order, a first means for locking said other abutments in set positions, a plurality of further abutments settable to represent numerical data related to the worker to which the holder is allocated, a worker's key member allocated to such particular worker and locked in said holder, said key member having shoulders thereon for cooperation with said further abutments to set the same and having projecting key elements adapted to cooperate with means in such a machine to insure computation at the correct rate, a second means for locking said further abutments and said key member in position in said holder, a normally projected arm for preventing insertion of said device into said control position, and a latch for holding said arm in an ineffective position and adapted as an incident to a first insertion of said device to release said arm for projecting movement to an effective position to thereby prevent fraudulent further use of the device by a second insertion thereof into such control position.

29. In a storage and control device adapted to be inserted into a control position for governing the operation of an elapsed time and earnings computing and recording machine in which computations may be made at any one of a plurality of wage rates, said device comprising a holder having a settable start time abutment settable to different positions representative of start time, a plurality of other abutments settable to represent other numerical data particular to a selected job or order, a first means for locking said other abutments in set positions, a plurality of further abutments settable to represent numerical data related to the worker to which the holder is allocated, a worker's key member allocated to such particular worker and locked in said holder, said key member having shoulders thereon for cooperation with said further abutments to set the same and having projecting key elements adapted to cooperate with means in such a machine to insure computation at the correct rate, a second means for locking said further abutments and said key member in position in said holder, a normally projected arm for preventing insertion of said device into said control position, a latch for holding said arm in an ineffective position and adapted as an incident to a first insertion of said device to release said arm for projecting movement to an effective position to thereby prevent fraudulent further use of the device by a second insertion thereof into such control position, and means operable by a time-keeper's key for setting said arm in its latched ineffective position.

30. In a storage and control device for governing the operation of an elapsed time and earnings computing and recording machine, a holder adapted to be inserted into a home position in such a machine and having a plurality of settable abutment members adapted to be set in differential positions representative of start time, man number, pay rate and similar and related data, and a single-use safety mechanism mounted in an enclosed position in said holder and comprising a pawl normally urged to an effective projecting position for preventing insertion of the holder into said home position, a latch for holding said pawl in an ineffective position and adapted to be released as an incident to the insertion of the holder into said home position, a lock for holding said pawl in said effective position, and key-operated means in succession to release said latch and return said pawl to said latched ineffective position.

31. A worker's key member for imparting particularity, as to man number and pay rate, to a storage and control slide that has been pre-set as to other data pertaining to a particular job, order or the like, said key member comprising a unitary body having abutments thereon positionally representative of the man number and pay rate of the man to which it is allocated, key elements on said body representative by relative size and location of the pay rate, and positioning surfaces on said body for accurately locating such body in association with such a pre-set control slide.

32. A worker's key member for imparting particularity, as to man number and pay rate, to a storage and control slide that has been pre-set as to other data pertaining to a particular job, order or the like, said key member comprising a unitary body having positionally significant means thereon representative of the man number and pay rate of the man to which it is allocated, and positioning surfaces on said body for accurately locating such body in association with such a pre-set control slide.

33. A worker's key member for imparting particularity, as to man number and pay rate and like data, to a storage and control slide that has been pre-set as to other data pertaining to a particular job, order or the like, said key member comprising a unitary body having positionally significant means thereon representative of the man number and pay rate of the man to which it is allocated, projecting key elements on said body representative, by their relative size and location, of the aforesaid pay rate, and positioning surfaces on said body for accurately locating such body in association with such a pre-set control slide.

34. In a worker's key member for detachable association with a data-representing control unit that is to be used for governing the operation of a multiple pay-rate elapsed time and earnings computing and recording machine, said key member comprising an elongated body having abutment faces on one end thereof positionally representing the man number and pay rate of the man to which the key member is allocated, and laterally projecting key elements on one side edge of said body representing the same pay rate and adapted to cooperate with key slot means in such a machine to insure computation of earnings at the represented rate.

35. In a worker's key member for operative association with a data-representing control unit that is to be used for governing the operation of a multiple pay-rate, elapsed time and earnings computing and recording machine, said key member comprising a body having positionally significant means thereon positionally representing the man number and pay rate of the man to which the key member is allocated, and projecting key elements on said body representing the same pay rate and adapted to cooperate with key slot means in such a machine to insure computation of earnings at the represented rate.

CHARLES B. HALL.

REFERENCES CITED

The following references are of record in the file of this patent:

UNITED STATES PATENTS

| Number | Name | Date |
|---|---|---|
| 1,082,506 | Duncan | Dec. 30, 1913 |
| 1,205,082 | Bryce | Nov. 14, 1916 |
| 1,221,895 | Odell | Apr. 10, 1917 |
| 1,558,743 | Merriman | Oct. 27, 1925 |
| 1,752,564 | Love | Apr. 1, 1930 |
| 1,905,288 | Hoffman | Apr. 25, 1933 |
| 2,054,811 | Goerlitz | Sept. 22, 1936 |
| 2,220,937 | Machinist | Nov. 12, 1940 |
| 2,294,739 | Connolly | Sept. 1, 1942 |
| 2,339,519 | Rembold | Jan. 18, 1944 |